(12) United States Patent
Haseba

(10) Patent No.: US 7,727,417 B2
(45) Date of Patent: *Jun. 1, 2010

(54) OPTICALLY ISOTROPIC LIQUID CRYSTAL MEDIUM AND OPTICAL DEVICE

(75) Inventor: Yasuhiro Haseba, Chiba (JP)

(73) Assignees: Chisso Corporation, Osaka (JP); Chisso Petrochemical Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/195,181

(22) Filed: Aug. 20, 2008

(65) Prior Publication Data

US 2009/0051855 A1 Feb. 26, 2009

(30) Foreign Application Priority Data

Aug. 24, 2007 (JP) .............................. 2007-218064
Jun. 27, 2008 (JP) .............................. 2008-168290

(51) Int. Cl.
C09K 19/00 (2006.01)
C09K 19/06 (2006.01)
C09K 19/52 (2006.01)
C07D 239/00 (2006.01)
G02F 1/13 (2006.01)

(52) U.S. Cl. .............................. 252/299.01; 252/299.6; 252/299.61; 252/299.62; 252/299.63; 252/299.66; 428/1.1; 430/20; 544/242; 349/1; 349/56; 546/184; 570/128

(58) Field of Classification Search ........... 252/299.01, 252/299.6, 299.61–63, 299.66; 428/1.1; 430/20; 544/242; 349/1, 56; 546/184; 568/634; 570/128

See application file for complete search history.

(56) References Cited

U.S. PATENT DOCUMENTS

2006/0006363 A1    1/2006  Heckmeier et al.
2006/0050354 A1    3/2006  Heckmeier et al.
2008/0280071 A1*  11/2008  Kikuchi et al. ................ 428/1.1
2009/0059157 A1*   3/2009  Haseba et al. ................ 349/182
2009/0065739 A1*   3/2009  Haseba et al. ........... 252/299.62

FOREIGN PATENT DOCUMENTS

| | | |
|---|---|---|
| EP | 1690917 | 8/2006 |
| JP | 2000-327632 | 11/2000 |
| JP | 2003-327966 | 11/2003 |
| JP | 2004-059772 | 2/2004 |
| JP | 2004-182949 | 7/2004 |
| JP | 2005-157109 | 6/2005 |
| JP | 2005-336477 | 12/2005 |
| JP | 2006-089622 | 4/2006 |
| JP | 2006-127707 | 5/2006 |
| JP | 2006-299084 | 11/2006 |
| WO | 2005-080529 | 9/2005 |
| WO | 2005-090520 | 9/2005 |
| WO | 2006-063662 | 6/2006 |

OTHER PUBLICATIONS

Article Titled "Polymer-Stabilized Liquid Crystal Blue Phases" jointly authored by Kikuchi et al., in Nature Materials, vol. 1, 2002, (pp. 64).

Article Titled "Large Electro-Optic Kerr Effect in Polymer-Stabilized Liquid-Crystalline Blue Phases" jointly authored by Hisakado et al., in Advanced Materials, vol. 17, 2005. (pp. 96).

Article Titled "Electro-Optic Effects of the Optically Isotropic State Induced by the Incorporative Effects of a Polymer Network and the Chirality of Liquid Crystal" jointly authored by Haseba et al., in Journal of the SID, vol. 14/6, 200. (pp. 551).

* cited by examiner

*Primary Examiner*—Geraldina Visconti
(74) *Attorney, Agent, or Firm*—J.C. Patents

(57) ABSTRACT

A liquid crystal medium is described, having a wide temperature range of a liquid crystal phase, a large optical anisotropy and a large dielectric anisotropy, and exhibiting an optically isotropic liquid crystal phase. The liquid crystal medium features including a chiral dopant and a liquid crystal compound with chloronaphthalene ring and exhibiting an optically isotropic liquid crystal phase.

50 Claims, 1 Drawing Sheet

US 7,727,417 B2

OPTICALLY ISOTROPIC LIQUID CRYSTAL MEDIUM AND OPTICAL DEVICE

CROSS-REFERENCE TO RELATED APPLICATION

This application claims the priority benefit of Japan applications serial no. 2007-218064, filed Aug. 24, 2007 and 2008-168290, filed Jun. 27, 2008. All disclosure of the Japan applications is incorporated herein by reference.

BACKGROUND OF THE INVENTION

1. Field of the Invention

The invention relates to a liquid crystal medium useful as a material for an optical device, particularly a liquid crystal medium having a wide temperature range of liquid crystal phase, a large dielectric anisotropy and a large optical anisotropy. The invention also relates to an optical device that utilizes the liquid crystal medium, particularly an optical device that can be used in a wide temperature range and driven at a low voltage and is capable of obtaining a rapid electrooptical response.

2. Description of Related Art

Liquid crystal display (LCD) devices using liquid crystal compositions are widely used for display of clocks, calculators, word processors and so on. These LCD devices utilize the optical anisotropy and dielectric anisotropy of liquid crystal compounds. The operation modes of LCD devices mainly include phase change (PC), twisted nematic (TN), super twisted nematic (STN), bistable twisted nematic (BTN), electrically controlled birefringence (ECB), optically compensated bend (OCB), in-plane switching (IPS), vertical alignment (VA) and so on, which use one or more polarizers for display purposes. Also, many studies have recently been done to the mode where an electric field is applied to an optically isotropic liquid crystal phase to induce electric birefringence (Patent Documents 1-9, Non-patent Documents 1-3).

Moreover, wavelength tuneable filters, wavefront control devices, liquid crystal lenses, aberrational correction devices, aperture control devices, optical head devices and so on that utilize the electric birefringence of a blue phase as one of the optically isotropic liquid crystal phases have been proposed (Patent Document 10-12). According to the driving mode, LCD devices can be classified into passive matrix (PM) and active matrix (AM) types. The PM type is further classified into static type, multiplex type and so on, and the AM type is classified into thin film transistor (TFT) type and metal insulator metal (MIM) type, etc.

Each of these LCD devices contains a liquid crystal composition with suitable properties. To improve the characteristics of an LCD device, it is preferred that the liquid crystal composition has suitable properties. General properties necessary for a liquid crystal compound as a component of a liquid crystal composition include: 1) chemical and physical stability, 2) a high clearing point (liquid crystal phase-isotropic phase transition temperature), 3) a low lower-limit temperature of liquid crystal phase (nematic phase, cholesteric phase, smectic phase, and optically isotropic liquid crystal phases like blue phase, etc.), 4) good compatibility with other liquid crystal compounds, 5) a suitable dielectric anisotropy, and 6) a suitable optical anisotropy. Particularly, for an optically isotropic liquid crystal phase, a liquid crystal compound being large in the dielectric anisotropy and optical anisotropy is preferred from the viewpoint of lowering the driving voltage.

When a liquid crystal composition including a liquid crystal compound with chemical and physical stability ($1^{st}$ property) is used in an LCD device, the voltage holding ratio can be improved. In addition, a liquid crystal composition including a liquid crystal compound having a high clearing point or a low lower-limit temperature of liquid crystal phase ($2^{nd}$ and $3^{rd}$ properties) can have a wide temperature range of nematic phase or optically isotropic liquid crystal phase, and therefore can be used in display devices in a wide temperature range. To exhibit better properties that are difficult to develop by a single compound, a liquid crystal compound is usually mixed with a number of other liquid crystal compounds to prepare a liquid crystal composition for use. Therefore, a liquid crystal compound used in an LCD device preferably has good compatibility with other liquid crystal compounds ($4^{th}$ property). Recently, LCD devices with superior properties, especially display performances like contrast, display capacity, response time and so on, are required. In addition, regarding the liquid crystal material used, a liquid crystal composition with a low driving voltage is required. Also, in order to drive at a low voltage an optical device that is driven in an optically isotropic liquid crystal phase, a liquid crystal compound being large in the dielectric anisotropy and the optical anisotropy is preferred.

As the optically isotropic polymer/liquid crystal composites disclosed in Patent Documents 1-3 and Non-patent Documents 1-3 are used, the voltage required to operate the device is high. Patent Documents 4-9 disclose optically isotropic liquid crystal compositions and polymer/liquid crystal composites that are expected to have an operating voltage lower than that of the above material, but the optically isotropic liquid crystal composition and polymer/liquid crystal composite containing a compound with a chloro-naphthalene moiety of this application are not mentioned therein.

[Patent Document 1] Japanese Patent Publication No. 2003-327966
[Patent Document 2] International Publication Pamphlet No. 2005/90520
[Patent Document 3] Japanese Patent Publication No. 2005-336477
[Patent Document 4] Japanese Patent Publication No. 2006-89622
[Patent Document 5] Japanese Patent Publication No. 2006-299084
[Patent Document 6] Japanese Patent Publication No. 2006-506477
[Patent Document 7] Japanese Patent Publication No. 2006-506515
[Patent Document 8] International Publication Pamphlet No. 2006/063662
[Patent Document 9] Japanese Patent Publication No. 2006-225655
[Patent Document 10] Japanese Patent Publication No. 2005-157109
[Patent Document 11] International Publication Pamphlet No. 2005/80529
[Patent Document 12] Japanese Patent Publication No. 2006-127707
[Non-patent Document 1] *Nature Materials,* 1, 64, (2002)
[Non-patent Document 2] *Adv. Mater.,* 17, 96, (2005)
[Non-patent Document 3] *Journal of the SID,* 14, 551, (2006)

SUMMARY OF THE INVENTION

Accordingly, an object of the invention is to provide a liquid crystal medium having stability to heat, light and so on, a wide temperature range of liquid crystal phase, a large optical anisotropy, a large dielectric anisotropy, and an optically isotropic liquid crystal phase. Another object is to provide a variety of optical devices including the liquid crystal medium, which can be used in a wide temperature range and have a short response time, a large contrast and a low driving voltage.

The invention provides a liquid crystal medium (liquid crystal composition or polymer/liquid crystal composite) and an optical device containing the liquid crystal medium, which are described in the following items.

The $1^{st}$ item is a liquid crystal composition that includes a compound represented by formula (1) and a chiral dopant and exhibits an optically isotropic liquid crystal phase.

—CH=CHCH$_2$F, —CH=CHCF$_3$, —(CH$_2$)$_2$—CH=CF$_2$, —CH$_2$CH=CHCF$_3$ or —CH=CHCF$_2$CF$_3$.

The $3^{rd}$ item is a liquid crystal composition of the $1^{st}$ or $2^{nd}$ item wherein $Z^1$, $Z^2$, $Z^3$, $Z^4$, $Z^5$ and $Z^6$ are each independently a single bond, —CH$_2$CH$_2$—, —CH=CH—, —C≡C—, —COO—, —CF$_2$O—, —CH$_2$O— or —OCH$_2$—.

The $4^{th}$ item is a liquid crystal composition of any of the $1^{st}$ to $3^{rd}$ items wherein the rings $A^1$, $A^2$, $A^3$, $A^4$ and $A^5$ are each independently one of formulae (RG-1)-(RG-15), $Y^1$, $Y^2$, $Y^3$ and $Y^4$ are each independently a hydrogen atom or a halogen atom, and fn1, fn2, fn3 and fn4 are each independently 0, 1, 2 or 3.

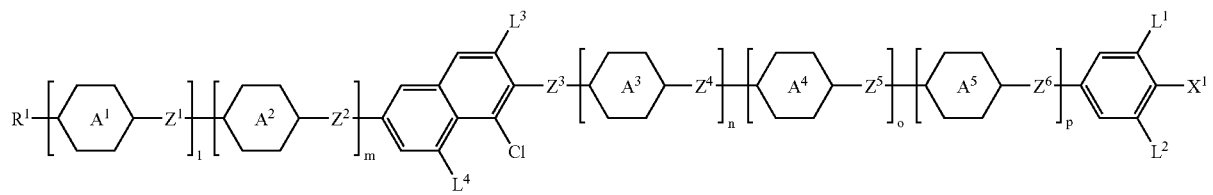

(1)

In formula (1), $R^1$ is a hydrogen atom, or $C_1$-$C_{20}$ alkyl wherein arbitrary —CH$_2$— may be replaced by —O—, —S—, —COO—, —OCO—, —CH=CH—, —CF=CF— or —C≡C— and arbitrary hydrogen atom may be replaced by a halogen atom or $C_1$-$C_3$ alkyl. The rings $A^1$, $A^2$, $A^3$, $A^4$ and $A^5$ are each independently a benzene ring, a naphthalene ring, a thiophene ring, a piperidine ring, a cyclohexene ring, a bicyclooctane ring, a tetrahydronaphthalene ring or a cyclohexane ring, wherein arbitrary hydrogen atom may be replaced by a halogen atom or alkyl, alkoxy or haloalkyl of $C_1$-$C_3$, —CH$_2$— may be replaced by —O— or —S—, and —CH= may be replaced by —N=. $Z^1$, $Z^2$, $Z^3$, $Z^4$, $Z^5$ and $Z^6$ are each independently a single bond, or $C_1$-$C_4$ alkylene, wherein arbitrary —CH$_2$— may be replaced by —O—, —S—, —COO—, —OCO—, —CSO—, —OCS—, —CH=CH—, —CF=CF— or —C≡C— and arbitrary hydrogen atom may be replaced by a halogen atom. $L^1$, $L^2$, $L^3$ and $L^4$ are each independently a hydrogen atom or a halogen atom. $X^1$ is a hydrogen atom, a halogen atom, —C≡N, —N=C=S, —C≡C—C≡N, —SF$_5$, or $C_1$-$C_{10}$ alkyl, wherein arbitrary —CH$_2$— may be replaced by —O—, —S—, —CH=CH— or —C≡C— and arbitrary hydrogen atom may be replaced by a halogen atom, l, m, n, o and p are each independently 0 or 1, and l+m+n+o+p≦4.

The $2^{nd}$ item is a liquid crystal composition of the $1^{st}$ item wherein $R^1$ is $C_1$-$C_{20}$ alkyl, $C_2$-$C_{21}$ alkenyl, $C_2$-$C_{21}$ difluoroalkenyl, $C_2$-$C_{21}$ alkynyl, $C_1$-$C_{19}$ alkoxy, $C_2$-$C_{20}$ alkenyloxy, $C_1$-$C_{19}$ alkylthio or $C_1$-$C_{19}$ alkenylthio, and $X^1$ is a hydrogen atom, a halogen atom, —C≡N, —N=C=S, —SF$_5$, —CH$_2$F, —CHF$_2$, —CF$_3$, —(CH$_2$)$_2$—F, —CF$_2$CH$_2$F, —CF$_2$CHF$_2$, —CH$_2$CF$_3$, —CF$_2$CF$_3$, —(CH$_2$)$_3$—F, —(CF$_2$)$_3$—F, —CF$_2$CHFCF$_3$, —CHFCH$_2$CF$_3$, —(CH$_2$)$_4$—F, —(CF$_2$)$_4$—F, —(CH$_2$)$_5$—F, —(CF$_2$)$_5$—F, —OCH$_2$F, —OCHF$_2$, —OCF$_3$, —O—(CH$_2$)$_2$—F, —OCF$_2$CH$_2$F, —OCF$_2$CHF$_2$, —OCH$_2$CF$_3$, —O—(CH$_2$)$_3$—F, —O—(CF$_2$)$_3$—F, —OCF$_2$CHFCF$_3$, —OCHFCF$_2$CF$_3$, —O(CH$_2$)$_4$—F, —O—(CF$_2$)$_4$—F, —O—(CH$_2$)$_5$—F, —O—(CF$_2$)$_5$—F, —CH=CHF, —CH=CF$_2$, —CF=CHF,

(RG-1)

(RG-2)

(RG-3)

(RG-4)

(RG-5)

(RG-6)

(RG-7)

(RG-8)

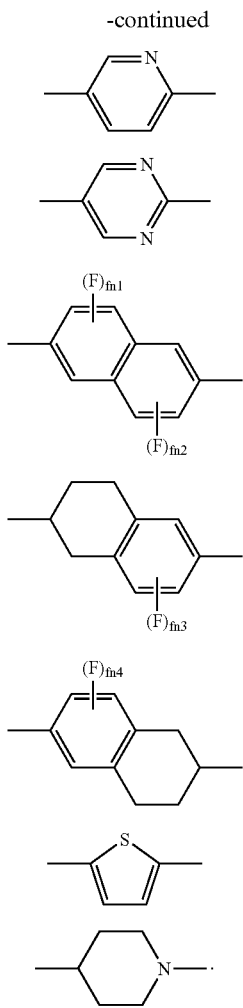
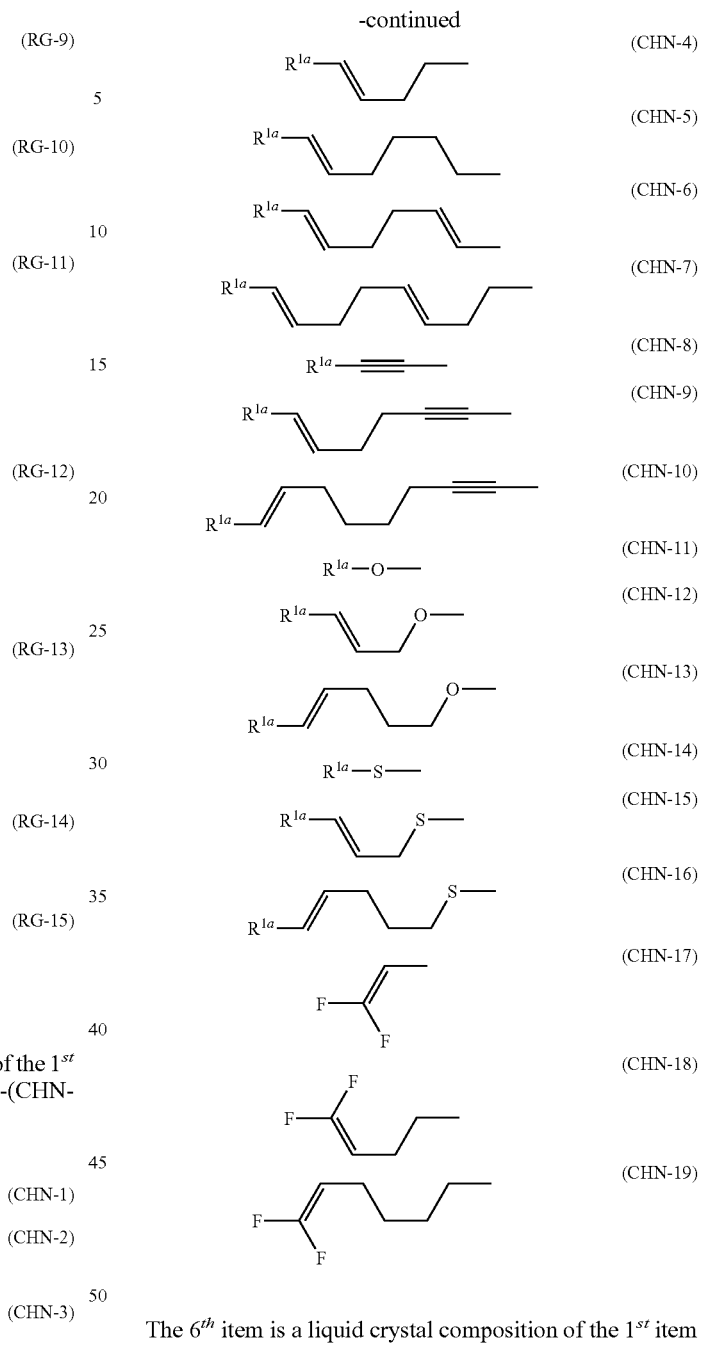
The 5th item is a liquid crystal composition of any of the 1st to 4th items wherein $R^1$ is any of formulae (CHN-1)-(CHN-19) and $R^{1a}$ is a hydrogen atom or $C_1$-$C_{20}$ alkyl.
The 6th item is a liquid crystal composition of the 1st item that includes a compound represented by one of formulae (1-1)-(1-9).
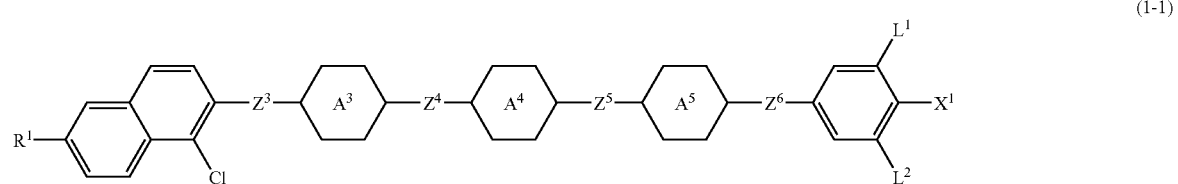
(1-1)

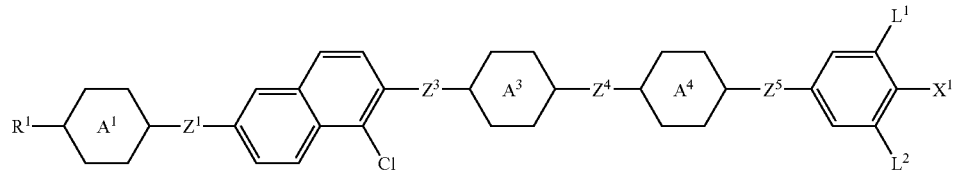 (1-2)

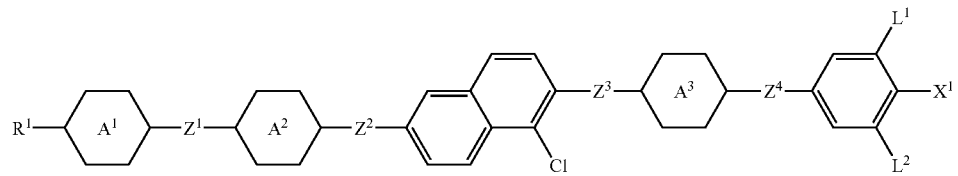 (1-3)

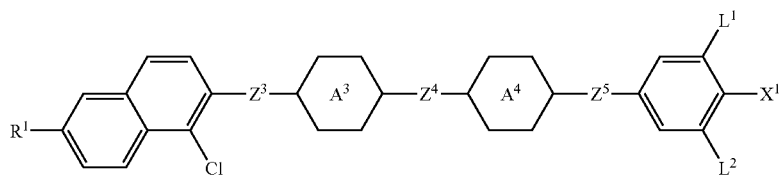 (1-4)

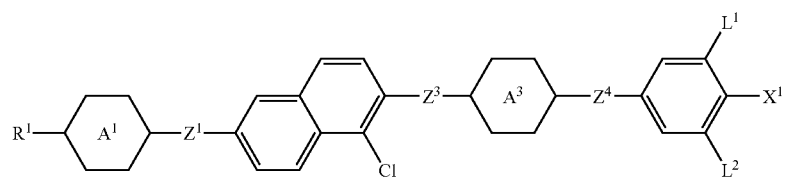 (1-5)

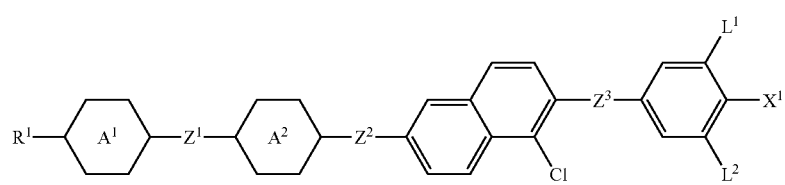 (1-6)

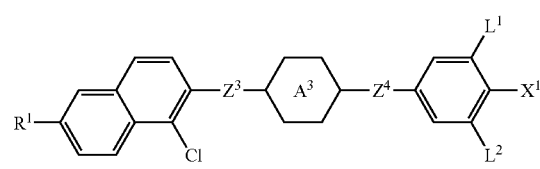 (1-7)

(1-8)

(1-9)

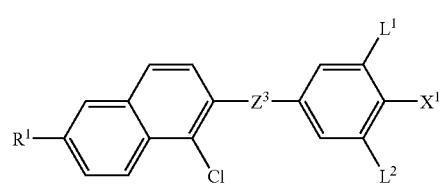

In these formulae, $R^1$ is any one of formulae (CHN-1)-(CHN-19). $R^{1a}$ is a hydrogen atom or $C_1$-$C_{20}$ alkyl. The rings $A^1$, $A^2$, $A^3$, $A^4$ and $A^5$ are each independently formula (RG-1), (RG-5), (RG-7), one of (RG-8-1)-(RG-8-5), (RG-9), (RG-10) or (RG-15). $Z^1$, $Z^2$, $Z^3$, $Z^4$, $Z^5$ and $Z^6$ are each independently a single bond, —CH$_2$CH$_2$—, —CH=CH—, —C≡C—, —COO—, —CF$_2$O—, —CH$_2$O— or —OCH$_2$—. $L^1$ and $L^2$ are each independently a hydrogen atom, a fluorine atom or a chlorine atom. $X^1$ is a fluorine atom, a chlorine atom, —C≡N, —CF$_3$, —CHF$_2$, —CH$_2$F, —OCF$_3$, —OCHF$_2$, —OCH$_2$F or —C≡C—CF$_3$.

(CHN-1)
(CHN-2)
(CHN-3)
(CHN-4)

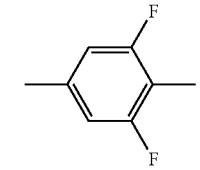

The 7th item is a liquid crystal composition of the 6th item wherein in formulae (1-1)-(1-9), at least one of $Z^1$, $Z^2$, $Z^3$, $Z^4$, $Z^5$ and $Z^6$ is —CF$_2$O—.

The 8th item is a liquid crystal composition of the 6th item wherein in formulae (1-1)-(1-9), at least one of $Z^1$, $Z^2$, $Z^3$, $Z^4$, $Z^5$ and $Z^6$ is —COO—.

The 9th item is a liquid crystal composition of any of the 6th to 8th items wherein in formulae (1-1)-(1-9), $R^1$ is any one of formulae (CHN-1)-(CHN-4) and (CHN-6)-(CHN-8) and $R^{1a}$ is a hydrogen atom or $C_1$-$C_{20}$ alkyl.

The 10th item is a liquid crystal composition of any of the 1st to 9th items that further includes at least one compound selected from the group consisting of the compounds respectively represented by formulae (2), (3) and (4).

(2)

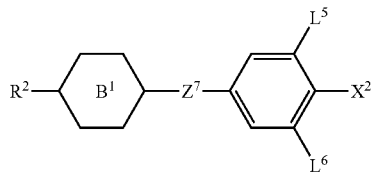

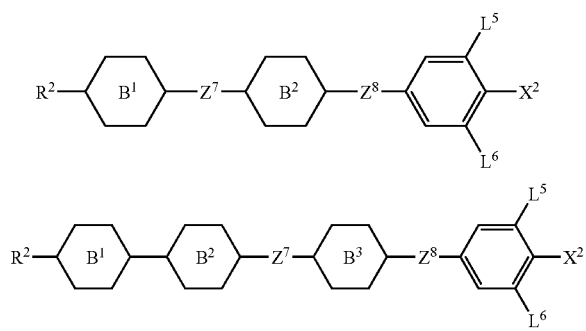

In these formulae, $R^2$ is $C_1$-$C_{10}$ alkyl or $C_2$-$C_{10}$ alkenyl, wherein arbitrary hydrogen atom of $R^2$ may be replaced by a fluorine atom and arbitrary —$CH_2$— of $R^2$ may be replaced by —O—. $X^2$ is a fluorine atom, a chlorine atom, —$OCF_3$, —$OCHF_2$, —$CF_3$, —$CHF_2$, —$CH_2F$, —$OCF_2CHF_2$ or —$OCF_2CHFCF_3$. The rings $B^1$, $B^2$ and $B^3$ are each independently 1,4-cyclohexylene, 1,3-dioxan-2,5-diyl, pyrimidin-2,5-diyl, tetrahydropyran-2,5-diyl, 1,4-phenylene, or 1,4-phenylene with arbitrary hydrogen atom being replaced by a fluorine atom. $Z^7$ and $Z^8$ are each independently —$(CH_2)_2$—, —$(CH_2)_4$—, —COO—, —$CF_2O$—, —$OCF_2$—, —CH=CH—, —C≡C—, —$CH_2O$— or a single bond. $L^5$ and $L^6$ are each independently a hydrogen atom or a fluorine atom.

The 11th item is a liquid crystal composition of any of the 1st to 9th items that further includes at least one compound selected from the group consisting of the compounds represented by formula (5).

(5)

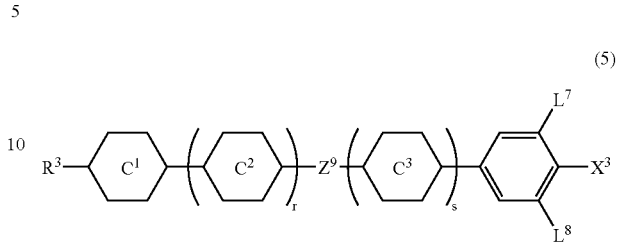

In the formulae, $R^3$ is $C_1$-$C_{10}$ alkyl or $C_2$-$C_{20}$ alkenyl, wherein arbitrary hydrogen atom of $R^3$ may be replaced by a fluorine atom and arbitrary —$CH_2$— of $R^3$ may be replaced by —O—. $X^3$ is —C≡N or —C≡C—C≡N. The rings $C^1$, $C^2$ and $C^3$ are each independently 1,4-cyclohexylene, 1,4-phenylene, 1,4-phenylene with arbitrary hydrogen atom being replaced by a fluorine atom, 1,3-dioxan-2,5-diyl, tetrahydropyran-2,5-diyl, or pyrimidin-2,5-diyl. $Z^9$ is —$(CH_2)_2$—, —COO—, —$CF_2O$—, —$OCF_2$—, —C≡C—, —$CH_2O$— or a single bond. $L^7$ and $L^8$ are each independently a hydrogen atom or a fluorine atom, and r is 1 or 2, s is 0 or 1 and r+s=0, 1 or 2.

The 12th item is a liquid crystal composition of any of the 1st to 9th items that further includes at least one compound selected from the group consisting of the compounds respectively represented by formulae (6), (7), (8), (9) and (10).

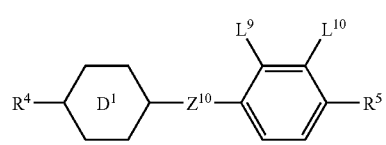

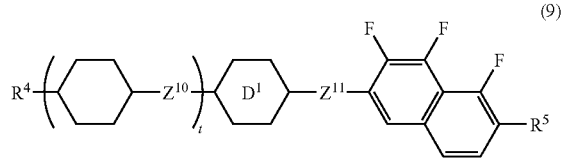

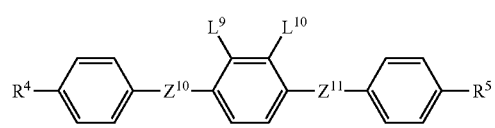

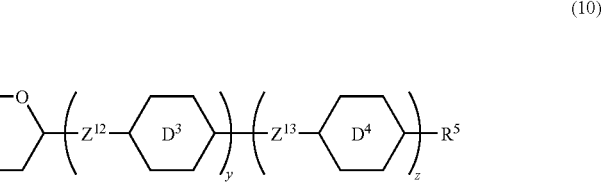

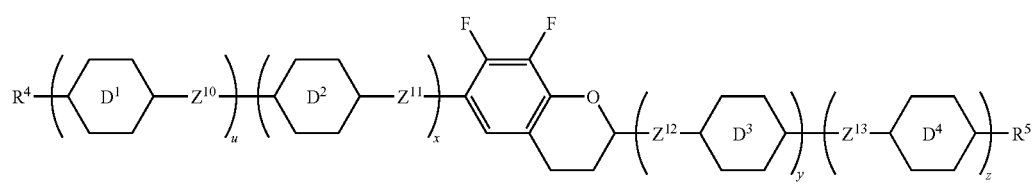

In these formulae, $R^4$ and $R^5$ are each independently $C_1$-$C_{10}$ alkyl or $C_2$-$C_{10}$ alkenyl, wherein arbitrary hydrogen atom of $R^4$ and $R^5$ may be replaced by a fluorine atom and arbitrary —$CH_2$— of $R^4$ and $R^5$ may be replaced by —O—. The rings $D^1$, $D^2$, $D^3$ and $D^4$ are each independently 1,4-cyclohexylene, 1,4-cyclohexenylene, 1,4-phenylene, 1,4-phenylene with arbitrary hydrogen atom being replaced by a fluorine atom, tetrahydropyran-2,5-diyl or decahydronaphthalen-2,6-diyl. $Z^{10}$, $Z^{11}$, $Z^{12}$ and $Z^{13}$ are each independently —$(CH_2)_2$—, —COO—, —$CH_2O$—, —$OCF_2$—, —$OCF_2(CH_2)_2$— or a single bond. $L^9$ and $L^{10}$ are each independently a fluorine atom or a chlorine atom, t, u, x, y and z are each independently 0 or 1, and u+x+y+z is equal to 1 or 2.

The 13th item is a liquid crystal composition of any of the 1st to 9th items that further includes at least one compound selected from the group consisting of the compounds respectively represented by formulae (11), (12) and (13).

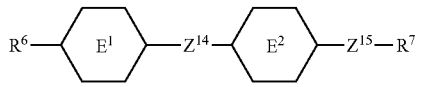
(11)

The 15th item is a liquid crystal composition of the 10th item that further includes at least one compound selected from the group consisting of the compounds respectively represented by formulae (11), (12) and (13).

The 16th item is a liquid crystal composition of the 11th item that further includes at least one compound selected from the group consisting of the compounds respectively represented by formulae (11), (12) and (13).

The 17th item is a liquid crystal composition of the 12th item that further includes at least one compound selected from the group consisting of the compounds respectively represented by formulae (11), (12) and (13).

The 18th item is a liquid crystal composition of any of the 1st to 9th item that further includes at least one compound selected from the group consisting of the compounds respectively represented by formulae (15), (16), (17) and (18).

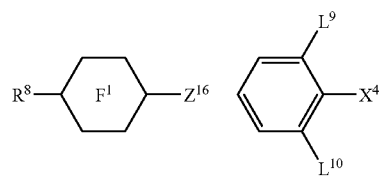
(15)

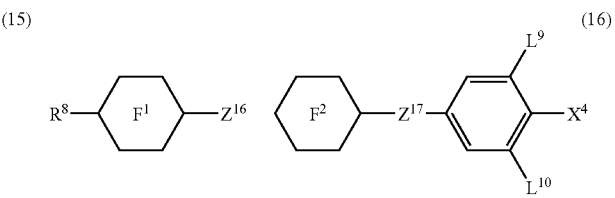
(16)

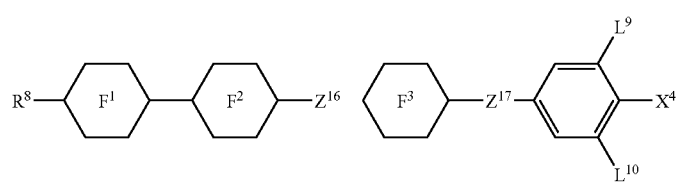
(17)

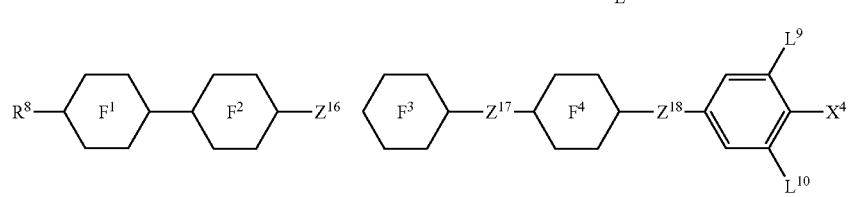
(18)

-continued

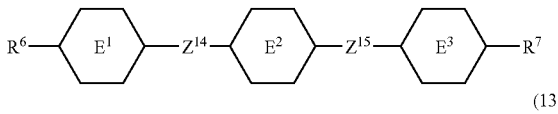
(12)

(13)

In these formulae, $R^6$ and $R^7$ are each independently $C_1$-$C_{10}$ alkyl or $C_2$-$C_{10}$ alkenyl, wherein arbitrary hydrogen atom of $R^6$ and $R^7$ may be replaced by a fluorine atom and arbitrary —$CH_2$— of $R^6$ and $R^7$ may be replaced by —O—. The rings $E^1$, $E^2$ and $E^3$ are each independently 1,4-cyclohexylene, pyrimidin-2,5-diyl, 1,4-phenylene, 2-fluoro-1,4-phenylene, 3-fluoro-1,4-phenylene or 2,5-difluoro-1,4-phenylene. $Z^{14}$ and $Z^{15}$ are each independently —C≡C—, —COO—, —(CH$_2$)$_2$—, —CH=CH— or a single bond.

The 14th item is a liquid crystal composition of the 10th item that further includes at least one compound selected from the group consisting of the compounds represented by formula (5) in the 11th item.

In these formulae, $R^8$ is $C_1$-$C_{10}$ alkyl, $C_2$-$C_{10}$ alkenyl or $C_2$-$C_{10}$ alkynyl, wherein arbitrary hydrogen atom of $R^8$ may be replaced by a fluorine atom and arbitrary —$CH_2$— of $R^8$ may be replaced by —O—. $X^4$ is a fluorine atom, a chlorine atom, —$SF_5$, —$OCF_3$, —$OCHF_2$, —$CF_3$, —$CHF_2$, —$CH_2F$, —$OCF_2CHF_2$ or —$OCF_2CHFCF_3$. The ringed $F^1$, $F^2$, $F^3$ and $F^4$ are each independently 1,4-cyclohexylene, 1,3-dioxan-2,5-diyl, pyrimidin-2,5-diyl, tetrahydropyran-2,5-diyl, 1,4-phenylene, or 1,4-phenylene with arbitrary hydrogen atom being replaced by a fluorine atom or a chlorine atom. $Z^{16}$, $Z^{17}$ and $Z^{18}$ are each independently —(CH$_2$)$_2$—, —(CH$_2$)$_4$—, —COO—, —CF$_2$O—, —OCF$_2$—, —CH=CH—, —C≡C—, —CH$_2$O— or a single bond. $L^9$ and $L^{10}$ are each independently a hydrogen atom or fluorine atom.

The 19th item is a liquid crystal composition of any of the 1st to 9th items that further includes at least one compound selected from the group consisting of the compounds represented by formula (19).

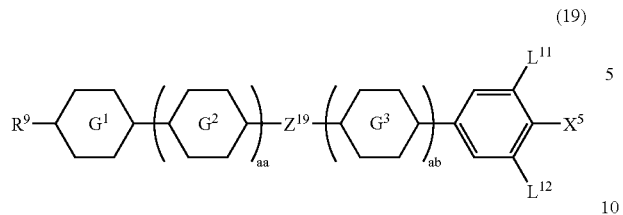

(19)

In the formula, $R^9$ is $C_1$-$C_{10}$ alkyl, $C_2$-$C_{10}$ alkenyl or $C_2$-$C_{10}$ alkynyl, wherein arbitrary hydrogen atom of $R^9$ may be replaced by a fluorine atom and arbitrary —$CH_2$— of $R^9$ may be replaced by —O—. $X^5$ is —C≡N, —N═C═S or —C≡C—C≡N. The rings $G^1$, $G^2$ and $G^3$ are each independently 1,4-cyclohexylene, 1,4-phenylene, 1,4-phenylene with arbitrary hydrogen atom being replaced by a fluorine atom or a chlorine atom, 1,3-dioxan-2,5-diyl, tetrahydropyran-2,5-diyl or pyrimidin-2,5-diyl. $Z^{19}$ is —($CH_2$)$_2$—, —COO—, —$CF_2$O—, —O$CF_2$—, —C≡C—, —$CH_2$O— or a single bond. $L^{11}$ and $L^{12}$ are each independently a hydrogen atom or a fluorine atom, aa is 0, 1 or 2, ab is 0 or 1, and aa+ab is equal to 0, 1 or 2.

The 20th item is a liquid crystal composition of any of the 1st to 19th items that further includes at least one antioxidant and/or ultraviolet absorbent.

The 21st item is a liquid crystal composition of any of the 1st to 20th items wherein the optically isotropic liquid crystal phase does not exhibit two or more colors of diffracted light.

The 22nd item is a liquid crystal composition of any of the 1st to 20th items wherein the optically isotropic liquid crystal phase exhibits two or more colors of diffracted light.

The 23rd item is a liquid crystal composition of the 21st or 22nd item that is obtained by adding a chiral dopant to a composition with a difference of 3-150° C. between the upper-limit temperature and the lower-limit temperature of co-existence of the chiral nematic phase and the isotropic phase.

The 24th item is a liquid crystal composition of the 21st or 22nd item that is obtained by adding a chiral dopant to a composition with the difference of 5-150° C. between the upper-limit temperature and the lower-limit temperature of co-existence of the chiral nematic phase and the isotropic phase.

The 25th item is a liquid crystal composition of the 21st or 22nd item that is obtained by adding a chiral dopant to a composition with the difference of 3-150° C. between the upper-limit temperature and the lower-limit temperature of co-existence of the nematic phase and the isotropic phase.

The 26th item is a liquid crystal composition of any of the 1st to 25th items wherein the weight percentage of the chiral dopant is 1-40 wt % relative to the total weight of the liquid crystal composition.

The 27th item is a liquid crystal composition of any of the 1st to 25th items wherein the weight percentage of the chiral dopant is 5-15 wt % relative to the total weight of the liquid crystal composition.

The 28th item is a liquid crystal composition of the 26th or 27th item that exhibits a chiral nematic phase at any temperature in the range of 70° C. to −20° C. and has a helical pitch of 700 nm or less for at least a part of the temperature range.

The 29th item is a liquid crystal composition of any of the 26th to 28th items wherein the chiral dopant includes at least one compound selected from the group consisting of the compounds respectively represented by formulae (K1)-(K5).

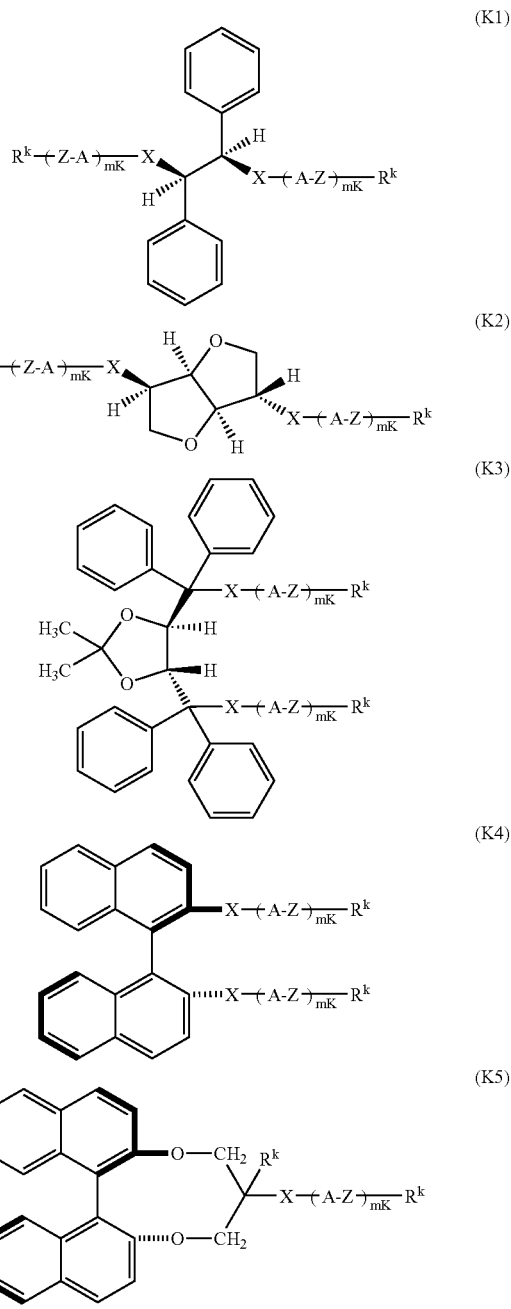

In the formulae (K1)-(K5), each $R^K$ is independently a hydrogen atom, a halogen atom, —C≡N, —N═C═O, —N═C═S, or $C_1$-$C_{20}$ alkyl wherein arbitrary —$CH_2$— may be replaced by —O—, —S—, —COO—, —OCO—, —CH═CH—, —CF═CF— or —C≡C— and arbitrary hydrogen atom may be replaced by a halogen atom. Each A is independently an aromatic or non-aromatic 3- to 8-membered ring, or a fused ring of 9 or more carbon atoms, wherein in these rings, arbitrary hydrogen atom may be replaced by a halogen atom or $C_1$-$C_3$ alkyl or haloalkyl, —$CH_2$— may be replaced by —O—, —S— or —NH—, and —CH═ may be replaced by —N═. Each Z is independently a single bond, or $C_1$-$C_8$ alkylene wherein arbitrary —$CH_2$— may be replaced by —O—, —S—, —COO—, —OCO—, —CSO—, —OCS—, —N=N—, —CH=N—, —N=CH—, —CH=CH—, —CF=CF— or —C≡C— and arbitrary hydrogen atom may be replaced by a halogen atom. X is a single bond, —COO—, —OCO—, —CH$_2$O—, —OCH$_2$—, —CF$_2$O—, —OCF$_2$— or —CH$_2$CH$_2$—. In addition, mK is an integer of 1-4.

The 30$^{th}$ item is a liquid crystal composition of any of the 26$^{th}$ to 28$^{th}$ items wherein the chiral dopant includes at least one compound selected from the group consisting of the compounds respectively represented by formulae (K2-1)-(K2-8) and (K5-1)-(K5-3).

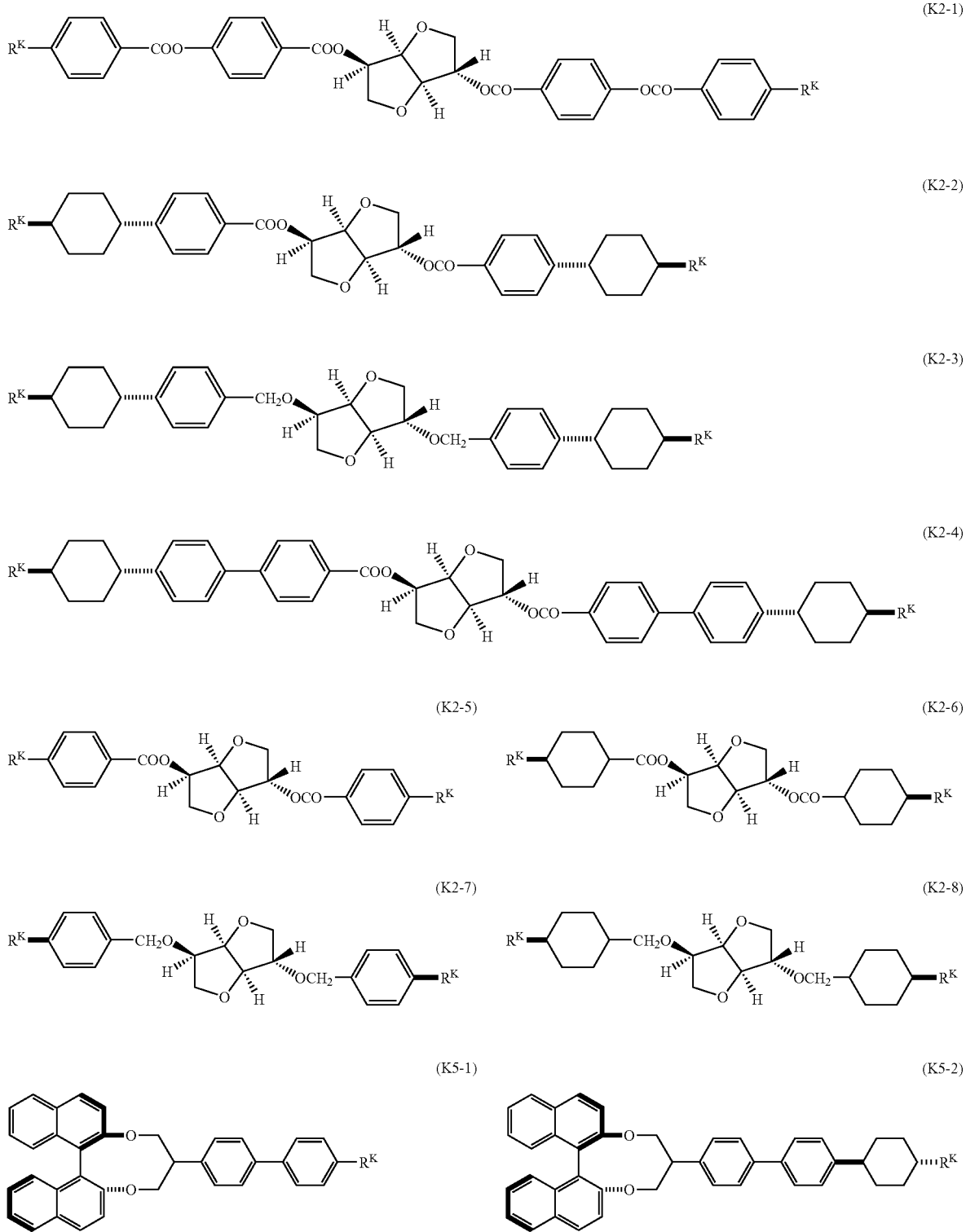

-continued

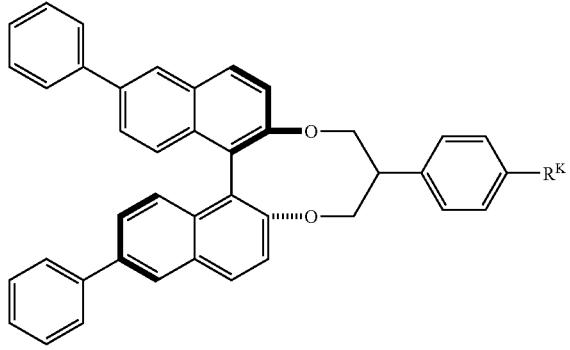

(K5-3)

In these formulae, each $R^K$ is independently $C_3$-$C_{10}$ alkyl wherein the —$CH_2$— directly bonded to the ring may be replaced by —O— and arbitrary —$CH_2$— may be replaced by —CH=CH—.

The 31$^{st}$ item is a mixture that includes a liquid crystal composition of any of the 1$^{st}$ to 30$^{th}$ items and a polymerizable monomer.

The 32$^{nd}$ item is a mixture of the 31$^{st}$ item wherein the polymerizable monomer is a photo-polymerizable monomer or a thermal-polymerizable monomer.

The 33$^{rd}$ item is a polymer/liquid crystal composite that is obtained through polymerization of the mixture of the 31$^{st}$ or 32$^{nd}$ item and is used in a device driven in an optically isotropic liquid crystal phase.

The 34$^{th}$ item is a polymer/liquid crystal composite of the 33$^{rd}$ item that is obtained through polymerization of the mixture of the 31$^{st}$ or 32$^{nd}$ item in an isotropic phase or an optically isotropic liquid crystal phase.

The 35$^{th}$ item is a polymer/liquid crystal composite of the 33$^{rd}$ item wherein the polymer contained therein has a mesogenic moiety.

The 36$^{th}$ item is a polymer/liquid crystal composite of any of the 33$^{rd}$ to 35$^{th}$ item wherein the polymer contained therein has a cross-linked structure.

The 37$^{th}$ item is a polymer/liquid crystal composite of any of the 33$^{rd}$ to 36$^{th}$ items wherein the weight percentage of the liquid crystal composition is 60-99 wt %, and that of the polymer is 1-40 wt %.

The 38$^{th}$ item is an optical device that includes a pair of substrates, electrodes disposed on a surface of one or both of the substrates, a liquid crystal medium disposed between the substrate, and electric field application means for applying an electric field on the liquid crystal medium via the electrodes. The liquid crystal medium is the liquid crystal composition of any of the 26$^{th}$ to 30$^{th}$ items, or the polymer/liquid crystal composite of any of the 33$^{rd}$ to 37$^{th}$ items.

The 39$^{th}$ item is an optical device that includes a pair of substrates with at least one thereof being transparent and one or both thereof disposed with electrodes thereon, a liquid crystal medium disposed between the substrate, a polarizer disposed on an outer side of the substrate, and electric field application means for applying an electric field on the liquid crystal medium via the electrodes. The liquid crystal medium is the liquid crystal composition of any of the 26$^{th}$ to 30$^{th}$ items, or the polymer/liquid crystal composite of any of the 33$^{rd}$ to 37$^{th}$ items.

The 40$^{th}$ item is an optical device of the 39$^{th}$ item wherein on at least one of the substrates, the electrodes are constructed in a manner that the electric field is applied in at least 2 directions.

The 41$^{st}$ item is an optical device of the 39$^{th}$ item wherein the substrates are disposed parallel to each other and on one or both of the substrates, the electrodes are constructed in a manner that the electric field is applied in at least 2 directions.

The 42$^{nd}$ item is an optical device of any of the 38$^{th}$ to 41$^{st}$ items wherein the electrodes are disposed in a matrix form to form pixel electrodes, and each pixel has an active device that is a thin film transistor (TFT).

In the invention, "liquid crystal medium" is a generic term of "liquid crystal composition" and "polymer/liquid crystal composite". In addition, an optical device refers to various devices utilizing electrooptical effect to achieve light modulation or optical switching etc., for example, display devices (LCD devices), light modulation devices used in optical communication systems, optical signal processing or various sensor systems. With respect to light modulation that utilizes a change in the refractive index of an optically isotropic liquid crystal medium caused by voltage application, the Kerr effect is known. The Kerr effect is an effect that the electric-birefringence $\Delta n(E)$ is proportional to the square of the electric field ($E^2$), and "$\Delta n(E)=K \cdot \lambda \cdot E^2$" is satisfied for a material exhibiting the Kerr effect (K=Kerr constant, $\lambda$=wavelength). Here, the electric-birefringence refers to the optical anisotropy caused by applying an electric field to the isotropic medium.

The terms used in the specification are defined as follows. "Liquid crystal compound" is a generic term of compounds having a liquid crystal phase like nematic phase or smectic phase, etc. and compounds having no liquid crystal phase but being useful as a component of a liquid crystal composition. A chiral dopant is an optically active compound, which is added to impart a desired twisted molecular arrangement to the liquid crystal composition. "LCD device" is a generic term of LCD panels and LCD modules. Sometimes, "liquid crystal compound", "liquid crystal composition" and "LCD device" are abbreviated as "compound", "composition" and "device", respectively. In addition, for example, the upper-limit temperature of a liquid crystal phase is a liquid crystal phase-isotropic phase transition temperature and is sometimes abbreviated as "clearing point" or "upper-limit temperature". The lower-limit temperature of a liquid crystal phase is sometimes abbreviated as "lower-limit temperature". A compound represented by formula (1) is sometimes abbreviated as a compound (1). This also applies to a compound represented by formula (2). In formulae (1) to (19), the symbols B, D and E etc. surrounded by hexagons respectively correspond to ring B, ring D and ring E etc. The amounts of the compounds in terms of percentages are weight percentages (wt %) relative to the total weight of the composition. A compound represented by formula (1) as a component A. A first aspect of the invention relates to a composition only including the component A, or a composition including the component A and other components which are not specifically indicated in the specification. The compound represented by formula (1) is described first.

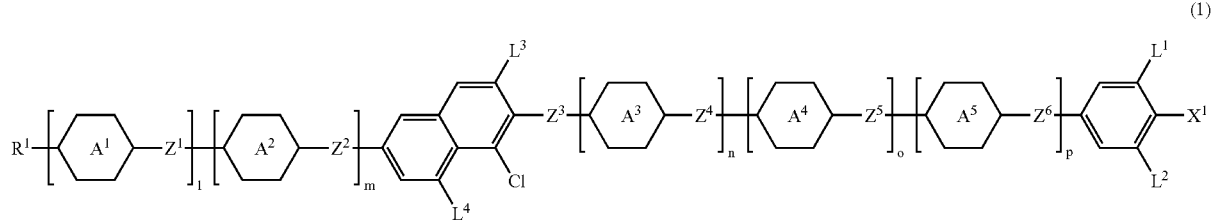

(1)

number of the same symbols, such as the rings $A^1$, $Y^1$, or B etc., are present in the same or different formulae, but they can be the same as or different from each other in both cases.

In the invention, "arbitrary" denotes both arbitrary position and arbitrary number, although it excludes the case when the number is zero. The expression "arbitrary A may be replaced by B, C or D" not only means that arbitrary A may be replaced by B, arbitrary A may be replaced by C or arbitrary A may be replaced by D, but also means that a plurality of A's may be replaced by at least two of B-D. For example, alkyl wherein arbitrary —$CH_2$— may be replaced by —O— or —CH=CH— includes alkyl, alkenyl, alkoxy, alkoxyalkyl, alkoxyalkenyl and alkenyloxyalkyl, etc. In addition, in the invention, the replacement of two contiguous —$CH_2$— by —O— to form —O—O— is not preferable. Also, the replacement of —$CH_2$— at the alkyl terminal by —O— is not preferred. The invention will be further described below. The terminal groups, rings, linking groups and so on of the compound represented by the formula (1) will also be illustrated by way of preferred examples.

The liquid crystal composition of the invention has stability to heat and light, etc., has a high upper-limit temperature and a low lower-limit temperature of an optically isotropic liquid crystal phase, and has a low driving voltage in a device driven in an optically isotropic liquid crystal phase. The polymer/liquid crystal composite of the invention has an optically isotropic liquid crystal phase, exhibits a high upper-limit temperature and s low lower-limit temperature of optically isotropic liquid crystal phase, and has a low driving voltage in a device driven in an optically isotropic liquid crystal phase. The optical device driven in an optically isotropic liquid crystal phase according to the invention has a wide temperature range for use, a short response time, a large contrast and a low driving voltage.

Figure 1:
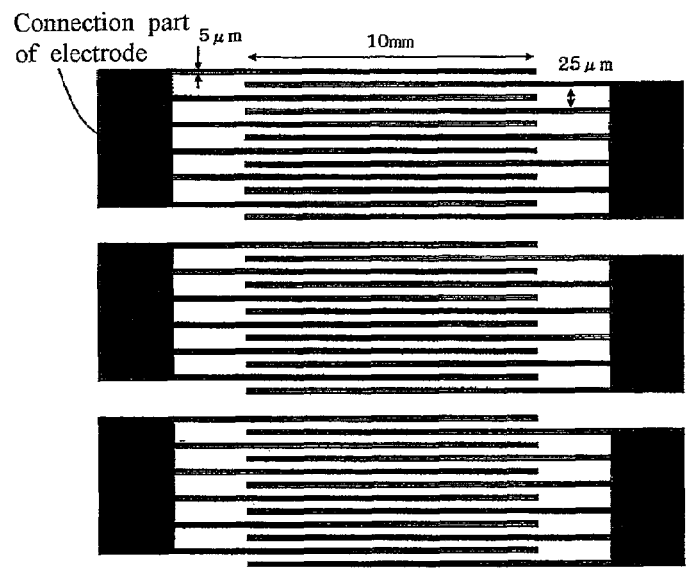
FIG. 1 shows a comb-like electrode substrate used in an embodiment of the invention.

DESCRIPTION OF THE EMBODIMENTS 1-1. Compound (1)

The liquid crystal composition having an optically isotropic liquid crystal phase according to the invention includes a compound represented by formula (1) as a component A. A In formula (1), $R^1$ is a hydrogen atom, or $C_1$-$C_{20}$ alkyl wherein arbitrary —$CH_2$— may be replaced by —O—, —S—, —COO—, —OCO—, —CH=CH—, —CF=CF— or —C≡C— and arbitrary hydrogen atom may be replaced by a halogen atom or $C_1$-$C_3$ alkyl. Examples of the group obtained by replacing arbitrary —$CH_2$— of $CH_3(CH_2)_3$— by —O—, —S— or —CH=CH— include $CH_3(CH_2)_2O$—, $CH_3$—O—$(CH_2)_2$—, $CH_3$—O—$CH_2$—O—, $CH_3(CH_2)_2S$—, $CH_2$—S—$(CH_2)_2$—, $CH_3$—S—$CH_2$—S—, $CH_2$=CH—$(CH_2)_3$—, $CH_3$—CH=CH—$(CH_2)_2$—, $CH_3$—CH=CH—$CH_2O$—, $CH_3CH_2C$≡C— and so on. Examples of the group obtained by replacing arbitrary hydrogen atom of $CH_3(CH_2)_3$—, or of a group obtained by replacing arbitrary —$CH_2$— of $CH_3(CH_2)_3$— by —O—, —C≡C— or —CH=CH—, by a halogen atom include $ClCH_2(CH_2)_3$—, $CF_2$=CH—$(CH_2)_3$—, $CH_2F(CH_2)_2O$— and $CH_2FCH_2C$≡C—.

Such $R^1$ is preferably straight rather than branched. If $R^1$ is a branched group, it is preferably optically active. A preferred steric configuration of a —CH=CH— in alkenyl depends on the position of the double bond. A trans-configuration is preferred for alkenyl having a double bond at an odd number position, such as —CH=CHCH$_3$, —CH=CHC$_2$H$_5$, —CH=CHC$_3$H$_7$, —CH=CHC$_4$H$_9$, —C$_2$H$_4$CH=CHCH$_3$ and —C$_2$H$_4$CH=CHC$_2$H$_5$. A cis-configuration is preferred for alkenyl having a double bond at an even number position, such as —CH$_2$CH=CHCH$_3$, —CH$_2$CH=CHC$_2$H$_5$ and —CH$_2$CH=CHC$_3$H$_7$. An alkenyl compound having a preferred steric configuration can have a high upper-limit temperature or a wide temperature range of liquid crystal phase. Further details are described in *Mol Cryst. Liq. Cryst.*, 1985, 131, 109 and *Mol. Cryst. Liq. Cryst.*, 1985, 131, 327.

The alkyl may be straight or branched; specific examples thereof include —CH$_3$, —C$_2$H$_5$, —C$_3$H$_7$, —C$_4$H$_9$, —C$_5$H$_{11}$, —C$_6$H$_{13}$, —C$_7$H$_{15}$, —C$_8$H$_{17}$, —C$_9$H$_{19}$, —C$_{10}$H$_{21}$, —C$_{11}$H$_{23}$, —C$_{12}$H$_{25}$, —C$_{13}$H$_{27}$, —C$_{14}$H$_{29}$ and —C$_{15}$H$_{31}$.

The alkoxy may be straight or branched; specific examples thereof include —OCH$_3$, —OC$_2$H$_5$, —OC$_3$H$_7$, —OC$_4$H$_9$, —OC$_5$H$_{11}$, —OC$_6$H$_{13}$, —OC$_7$H$_{15}$, —OC$_8$H$_{17}$, —OC$_9$H$_{19}$, —OC$_{10}$H$_{21}$, —OC$_{11}$H$_{23}$, —OC$_{12}$H$_{25}$, —OC$_{13}$H$_{27}$ and —OC$_{14}$H$_{29}$.

The alkoxyalkyl may be straight or branched; specific examples thereof include —CH$_2$OCH$_3$, —CH$_2$OC$_2$H$_5$, —CH$_2$OC$_3$H$_7$, —(CH$_2$)$_2$—OCH$_3$, —(CH$_2$)$_2$—OC$_2$H$_5$, —(CH$_2$)$_2$—OC$_3$H$_7$, —(CH$_2$)$_3$—OCH$_3$, —(CH$_2$)$_4$—OCH$_3$ and —(CH$_2$)$_5$—OCH$_3$.

The alkenyl may be straight or branched; specific examples thereof include —CH=CH$_2$, —CH=CHCH$_3$, —CH$_2$CH=CH$_2$, —CH=CHC$_2$H$_5$, —CH$_2$CH=CHCH$_3$, —(CH$_2$)$_2$—CH=CH$_2$, —CH=CHC$_3$H$_7$, —CH$_2$CH=CHC$_2$H$_5$, —(CH$_2$)$_2$—CH=CHCH$_3$ and —(CH$_2$)$_3$—CH=CH$_2$.

The alkenyloxy may be straight or branched; specific examples thereof include —OCH$_2$CH=CH$_2$, —OCH$_2$CH=CHCH$_3$ and —OCH$_2$CH=CHC$_2$H$_5$.

The alkynyl may be straight or branched; specific examples thereof include —C≡CH, —C≡CCH$_3$, —CH$_2$C≡CH, —C≡CC$_2$H$_5$, —CH$_2$C≡CCH$_3$, —(CH$_2$)$_2$—C≡CH, —C≡CC$_3$H$_7$, —CH$_2$C≡CC$_2$H$_5$, —(CH$_2$)$_2$—C≡CCH$_3$ and —C≡C(CH$_2$)$_5$.

The structures of formulae (CHN-1)-(CHN-19) are preferred for R$^1$, wherein R$^{1a}$ is a hydrogen atom or C$_1$-C$_{20}$ alkyl. More preferred examples of R$^1$ include (CHN-1)-(CHN-4) or (CHN-6)-(CHN-8).

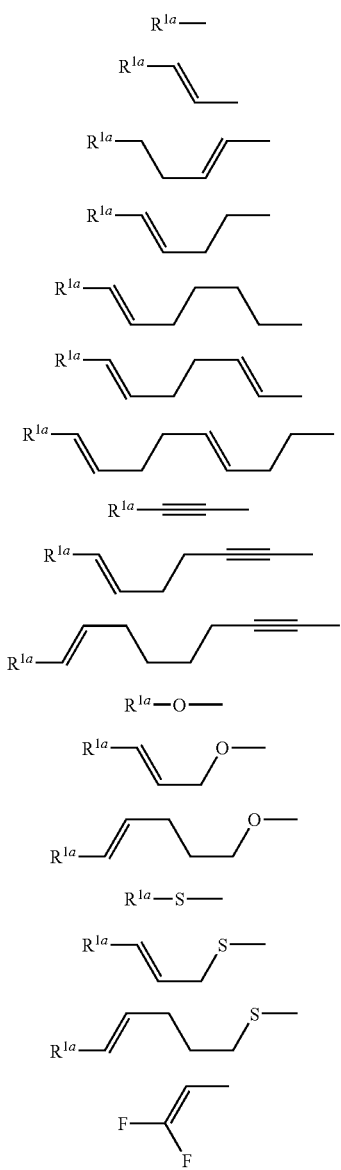

In formula (1), the rings A$^1$, A$^2$, A$^3$, A$^4$ and A$^5$ are each independently a benzene ring, a naphthalene ring, a thiophene ring, a cyclohexene ring, a bicyclooctane ring, a tetrahydronaphthalene ring or a cyclohexane ring, wherein arbitrary hydrogen atom may be replaced by a halogen atom or alkyl, alkoxy or haloalkyl of C$_1$-C$_3$, —CH$_2$— may be replaced by —O— or —S—, and —CH= may be replaced by —N=. Preferred examples of the rings A$^1$, A$^2$, A$^3$, A$^4$ and A$^5$ include formulae (RG-1)-(RG-15). Y$^1$, Y$^2$, Y$^3$ and Y$^4$ are each independently a hydrogen atom or a halogen atom, and fn1, fn2, fn3 and fn4 are each independently 0, 1, 2 or 3.

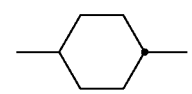
(RG-1)

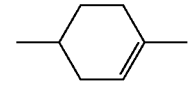
(RG-2)

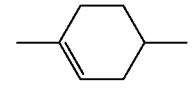
(RG-3)

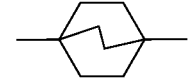
(RG-4)

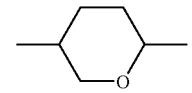
(RG-5)

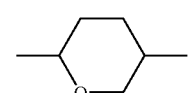
(RG-6)

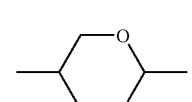
(RG-7)

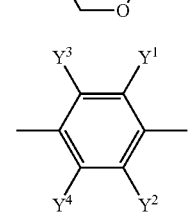
(RG-8)

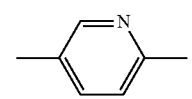
(RG-9)

-continued (RG-10)

(RG-11)

(RG-12)

(RG-13)

(RG-14)

(RG-15)

More preferred examples of the rings $A^1$, $A^2$, $A^3$, $A^4$ and $A^5$ include formulae (RG-1), (RG-5), (RG-7), (RG-8-1)-(RG-8-5), (RG-9), (RG-10) and (RG-15).

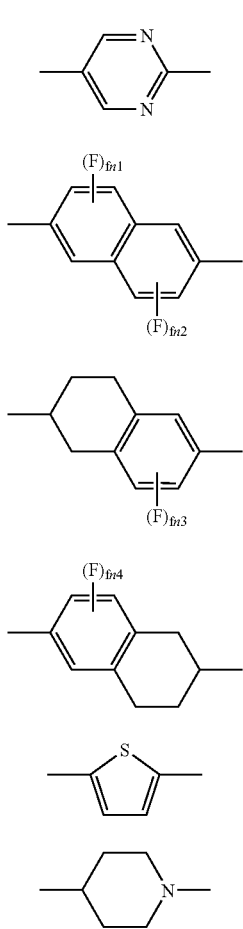

(RG-1)

(RG-5)

(RG-7)

(RG-8-1)

(RG-8-2)

-continued (RG-8-3)

(RG-8-4)

(RG-8-5)

(RG-9)

(RG-10)

(RG-15)

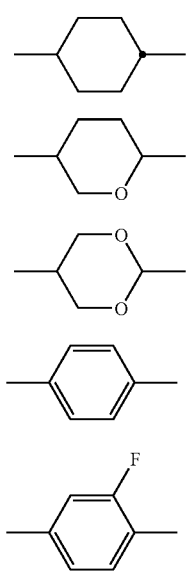

In formula (1), $Z^1$, $Z^2$, $Z^3$, $Z^4$, $Z^5$ and $Z^6$ are each independently a single bond, or $C_1$-$C_4$ alkylene wherein arbitrary —$CH_2$— may be replaced by —O—, —S—, —COO—, —OCO—, —CSO—, —OCS—, —CH=CH—, —CF=CF— or —C≡C— and arbitrary hydrogen atom may be replaced by a halogen atom.

Preferred examples of $Z^1$, $Z^2$, $Z^3$, $Z^4$, $Z^5$ and $Z^6$ include a single bond, —$CH_2CH_2$—, —CH=CH—, —C≡C—, —COO—, —$CF_2O$—, —$CH_2O$— and —$OCH_2$—. The steric configuration of the double bond in the linking groups such as —CH=CH—, —CF=CF—, —CH=CH—($CH_2)_2$— and —($CH_2)_2$—CH=CH— is preferably in trans-form rather than cis-form. More preferred examples of $Z^1$, $Z^2$, $Z^3$, $Z^4$, $Z^5$ and $Z^6$ include a single bond, —COO—, and —$CF_2O$—.

In formula (1), $L^1$, $L^2$, $L^3$ and $L^4$ are each independently a hydrogen atom or a halogen atom. In addition, preferably, $L^1$, $L^2$, $L^3$ and $L^4$ are each independently a hydrogen atom or a fluorine atom.

In formula (1), $X^1$ is a hydrogen atom, a halogen atom, —C≡N, —N=C=S, —C≡C—C≡N, —$SF_5$, or $C_1$-$C_{10}$ alkyl wherein arbitrary —$CH_2$— may be replaced by —O—, —S—, —CH=CH— or —C≡C— and arbitrary hydrogen atom may be replaced by a halogen atom.

Specific examples of alkyl with arbitrary hydrogen atom being replaced by a halogen atom include —$CH_2F$, —$CHF_2$, —$CF_3$, —$(CH_2)_2$—F, —$CF_2CH_2F$, —$CF_2CHF_2$, —$CH_2CF_3$, —$CF_2CF_3$, —$(CH_2)_3$—F, —$(CF_2)_3$—F, —$CF_2CHFCF_3$, —$CHFCF_2CF_3$, —$(CH_2)_4$—F, —$(CF_2)_4$—F, —$(CH_2)_5$—F and —$(CF_2)_5$—F.

Specific examples of alkoxy with arbitrary hydrogen atom being replaced by a halogen atom include —OCH$_2$F, —OCHF$_2$, —OCF$_3$, —O—(CH$_2$)$_2$—F, —OCF$_2$CH$_2$F, —OCF$_2$CHF$_2$, —OCH$_2$CF$_3$, —O—(CH$_2$)$_3$—F, —O—(CF$_2$)$_3$—F, —OCF$_2$CHFCF$_3$, —OCHFCF$_2$CF$_3$, —O(CH$_2$)$_4$—F, —O—(CF$_2$)$_4$—F, —O—(CH$_2$)$_5$—F and —O—(CF$_2$)$_5$—F.

Specific examples of alkenyl with arbitrary hydrogen atom being replaced by a halogen atom include —CH=CHF, —CH=CF$_2$, —CF=CHF, —CH=CHCH$_2$F, —CH=CHCF$_3$, —(CH$_2$)$_2$—CH=CF$_2$, —CH$_2$CH=CHCF$_3$ and —CH=CHCF$_2$CF$_3$.

Specific examples of X$^1$ include a hydrogen atom, a fluorine atom, a chlorine atom, —C≡N, —N=C=S, —SF$_5$, —CH$_3$, —C$_2$H$_5$, —C$_3$H$_7$, —C$_4$H$_9$, —C$_5$H$_{11}$, —C$_6$H$_{13}$, —C$_7$H$_{15}$, —C$_8$H$_{17}$, —C$_9$H$_{19}$, —C$_{10}$H$_{21}$, —CH$_2$F, —CHF$_2$, —CF$_3$, —(CH$_2$)$_2$—F, —CF$_2$CH$_2$F, —CF$_2$CHF$_2$, —CH$_2$CF$_3$, —CF$_2$CF$_3$, —(CH$_2$)$_3$—F, —(CF$_2$)$_3$—F, —CF$_2$CHFCF$_3$, —CHFCF$_2$CF$_3$, —(CH$_2$)$_4$—F, —(CF$_2$)$_4$—F, —(CH$_2$)$_5$—F, —(CF$_2$)$_5$—F, —OCH$_3$, —OC$_2$H$_5$, —OC$_3$H$_7$, —OC$_4$H$_9$, —OC$_5$H$_{11}$, —OCH$_2$F, —OCHF$_2$, —OCF$_3$, —O—(CH$_2$)$_2$—F, —OCF$_2$CH$_2$F, —OCF$_2$CHF$_2$, —OCH$_2$CF$_3$, —O—(CH$_2$)$_3$—F, —O—(CF$_2$)$_3$—F, —OCF$_2$CHFCF$_3$, —OCHFCF$_2$CF$_3$, —O(CH$_2$)$_4$—F, —O—(CF$_2$)$_4$—F, —O—(CH$_2$)$_5$—F, —O—(CF$_2$)$_5$—F, —CH=CH$_2$, —CH=CHCH$_3$, —CH$_2$CH=CH$_2$, —CH=CHC$_2$H$_5$, —CH$_2$CH=CHCH$_3$, —(CH$_2$)$_2$—CH=CH$_2$, —CH=CHC$_3$H$_7$, —CH$_2$CH=CHC$_2$H$_5$, —(CH$_2$)$_2$—CH=CHCH$_3$, —(CH$_2$)$_3$—CH=CH$_2$, —CH=CHF, —CH=CF$_2$, —CF=CHF, —CH=CHCH$_2$F, —CH=CHCF$_3$, —(CH$_2$)$_2$—CH=CF$_2$, —CH$_2$CH=CHCF$_3$ and —CH=CHCF$_2$CF$_3$.

Preferred examples of X$^1$ include a fluorine atom, a chlorine atom, —C≡N, —CF$_3$, —CHF$_2$, —CH$_2$F, —OCF$_3$, —OCHF$_2$ and —OCH$_2$F. More preferred examples of X$^1$ include a fluorine atom, a chlorine atom, —CF$_3$ and —OCF$_3$.

In formula (1), l, m, n, o and p are each independently 0 or 1, and l+m+n+o+p≦4. Preferably, l+m+n+o+p≦3, and more preferably l+m+n+o+p≦2.

Within the scope of formula (1), the structures represented by formulae (1-1)-(1-9) are preferred.

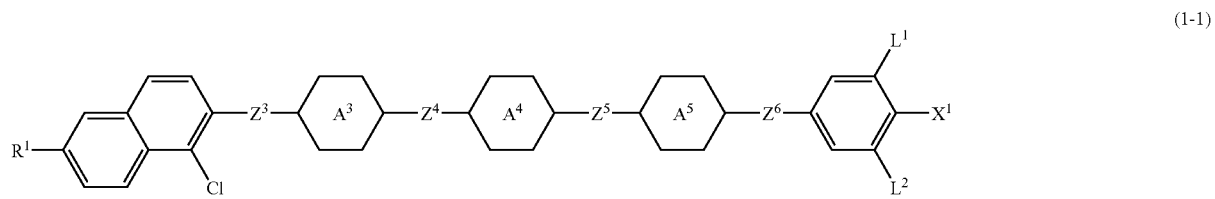
(1-1)

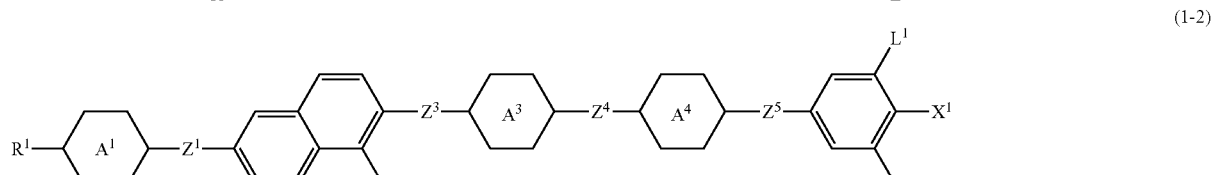
(1-2)

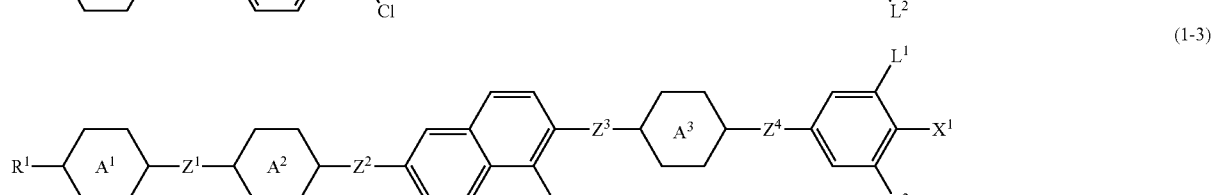
(1-3)

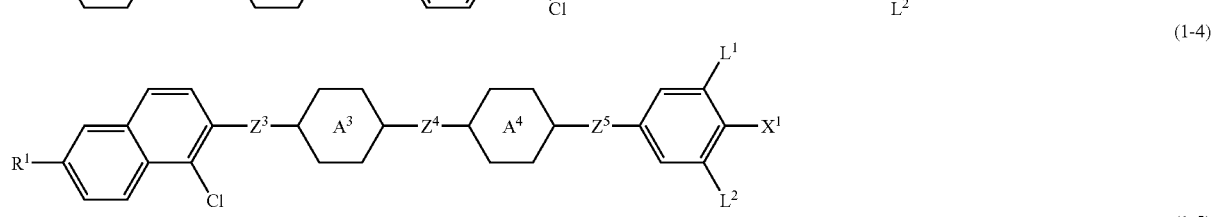
(1-4)

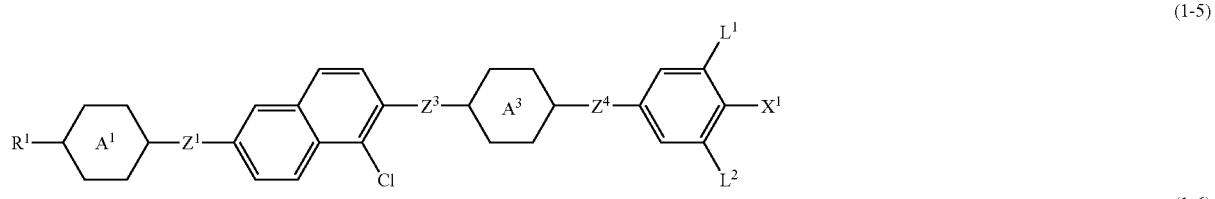
(1-5)

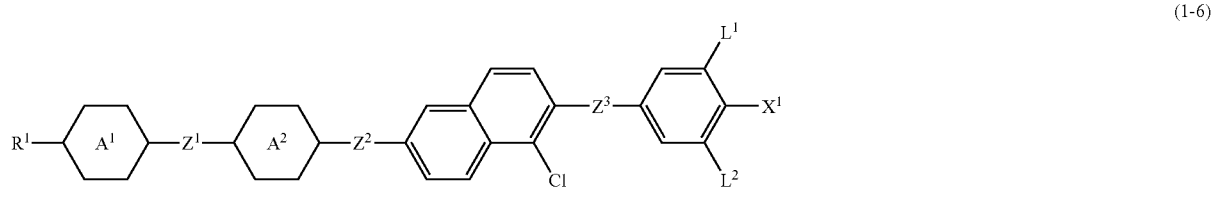
(1-6)

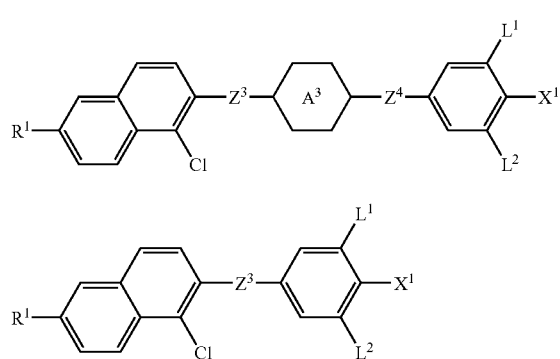
(1-7)

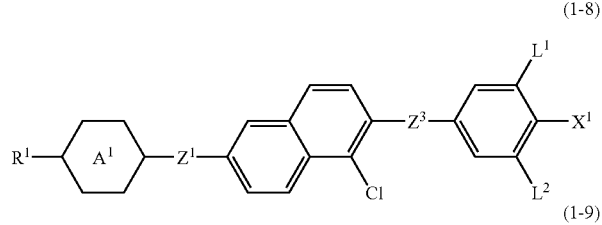
(1-8)

(1-9)

In these formulae, $R^1$ is any one of formulae (CHN-1)-(CHN-19). $R^{1a}$ is a hydrogen atom or $C_1$-$C_{20}$ alkyl. The rings $A^1$, $A^2$, $A^3$, $A^4$ and $A^5$ are each independently one of formulae (RG-1)-(RG-15). $Y^1$, $Y^2$, $Y^3$ and $Y^4$ are each independently a hydrogen atom or a halogen atom, and fn1, fn2, fn3 and fn4 are each independently 0, 1, 2 or 3. $Z^1$, $Z^2$, $Z^3$, $Z^4$, $Z^5$ and $Z^6$ are each independently a single bond, —CH$_2$CH$_2$—, —CH=CH—, —C≡C—, —COO—, —CF$_2$O—, —CH$_2$O— or —OCH$_2$—. $L^1$ and $L^2$ are each independently a hydrogen atom, a fluorine atom or a chlorine atom. $X^1$ is a fluorine atom, a chlorine atom, —C≡N, —CF$_3$, —CHF$_2$, —CH$_2$F, —OCF$_3$, —OCHF$_2$, —OCH$_2$F, or —C≡C—CF$_3$.

1-2. Properties of Compound (1)

The compound (1) used in the invention is further described below. The compound (1) is a liquid crystal compound having a chloronaphthalene ring. The compound is very stable in the physical and chemical properties under the conditions of common use of the devices, and has good compatibility with other liquid crystal compounds. A composition containing the compound is stable under the conditions of common use of the devices. Accordingly, the composition makes a wide temperature range for the optically isotropic liquid crystal phase and hence can be used as a display device in a wide temperature range. In addition, since the compound is large in the dielectric anisotropy and the optical anisotropy, it can be used as a component for reducing the driving voltage of a composition driven in an optically isotropic liquid crystal phase.

The physical properties such as the clearing point, the optical anisotropy, the dielectric anisotropy and so on can be adjusted as required, through proper selection of the combination of l, m, n, o, and p, the species of the rings $A^1$-$A^5$, the left terminal group $R^1$, the groups on the most right benzene ring and their substitution position ($L^1$, $L^2$ and $X^1$) or the linking groups $Z^1$-$Z^6$ of the compound (1). The effects of the combination of l, m, n, o, and p, the rings $A^1$-$A^5$, the left terminal group $R^1$, the right terminal group $X^1$, the linking groups $Z^1$-$Z^6$ and the species of $L^1$-$L^2$ on the properties of the compound (1) are described below.

Generally, the larger the value of l+m+n+o+p is, the higher the clearing point is; the smaller the value of l+m+n+o+p is, the lower the melting point is.

The more the aromatic rings included in the rings $A^1$-$A^5$, the larger the optical anisotropy is. The formulae (RG-7), (RG-8-2)-(RG-8-5), (RG-9), (RG-10) and (RG-15) have effects of making large dielectric anisotropy, (RG-8-1)-(RG-8-5), (RG-9), (RG-10) and (RG-15) have effects of making a large optical anisotropy, and (RG-1) and (RG-5) is helpful to achieve good compatibility.

When $R^1$ is straight, the compound (1) has a wide temperature range of liquid crystal phase and a small viscosity. When $R^1$ is branched, the compound (1) has good compatibility with other liquid crystal compounds. The compound with $R^1$ as an optically active group may be used as a chiral dopant. The compound with $R^1$ being not an optically active group may be used as a component of the composition. When $R^1$ is alkenyl, the preferred steric configuration depends on the position of the double bond. An alkenyl compound having a preferred steric configuration can have a high upper-limit temperature or a wide temperature range of liquid crystal phase.

When the linking groups $Z^1$, $Z^2$, $Z^3$, $Z^4$, $Z^5$ and $Z^6$ are a single bond, —CH$_2$CH$_2$—, —CH=CH—, —CF$_2$O—, —OCF$_2$—, —CH$_2$O—, —OCH$_2$—, —CF=CF—, —(CH$_2$)$_3$—O—, —O—(CH$_2$)$_3$—, —(CH$_2$)$_2$—CF$_2$O—, —OCF$_2$—(CH$_2$)$_2$— or —(CH$_2$)$_4$—, the compound (1) has a low viscosity. When the linkage group is a single bond, —(CH$_2$)$_2$—, —CF$_2$O—, —OCF$_2$— or —CH=CH—, the compound (1) has an even lower viscosity. When the linking group is —CH=CH—, the compound (1) has a wide temperature range of liquid crystal phase and a large elastic constant ratio $K_{33}/K_{11}$ ($K_{33}$: bend elastic constant, $K_{11}$: splay elastic constant). When the linking group is —C≡C—, the compound (1) has a large optical anisotropy. When the linking group is —COO— or —CF$_2$O—, the compound (1) has a large dielectric anisotropy. When $Z^1$, $Z^2$, $Z^3$, $Z^4$, $Z^5$ and $Z^6$ are a single bond, —(CH$_2$)$_2$—, —CH$_2$O—, —CF$_2$O—, —OCF$_2$— or —(CH$_2$)$_4$—, the compound (1) has relatively stable chemical properties and has less tendency to be degraded.

When the right terminal group $X^1$ is a fluorine atom, a chlorine atom, —C≡N, —N=C=S, —SF$_5$, —CF$_3$, —CHF$_2$, —CH$_2$F, —OCF$_3$, —OCHF$_2$ or —OCH$_2$F, the compound (1) has a large dielectric anisotropy. When $X^1$ is —C≡N, —N=C=S or alkenyl, the compound (1) has a large optical anisotropy. When $X^1$ is a fluorine atom, —OCF$_3$ or alkyl, the compound (1) is chemically stable.

When both $L^1$ and $L^2$ are a fluorine atom and $X^1$ is a fluorine atom, a chlorine atom, —C≡N, —N=C=S, —SF$_5$, —CF$_3$, —CHF$_2$, —CH$_2$F, —OCF$_3$, —OCHF$_2$ or —OCH$_2$F, the compound (1) has a large dielectric anisotropy. When $L^1$ is a fluorine atom and $X^1$ is —CF$_3$ or —OCF$_3$, when both $L^1$ and $L^2$ are a fluorine atom and $X^1$ is —CF$_3$ or —OCF$_3$, or when $L^1$, $L^2$ and $X^1$ all are a fluorine atom, the compound (1)

has a large dielectric anisotropy and a wide temperature range of liquid crystal phase, and is chemically stable to be less liable to degradation.

As described above, a compound having desired properties can be obtained through proper selection of the species of the ring structures, the terminal groups, the linking groups and so on.

1-3. Specific Examples of Compound (1)

Preferred examples of the compound (1) include formulae (1-1)-(1-9). More preferred examples include formulae (1-4A)-(1-4E), (1-5A)-(1-5G), (1-6A)-(1-6G), (1-7A)-(1-7D), (1-8A)-(1-8E) and (1-9A).

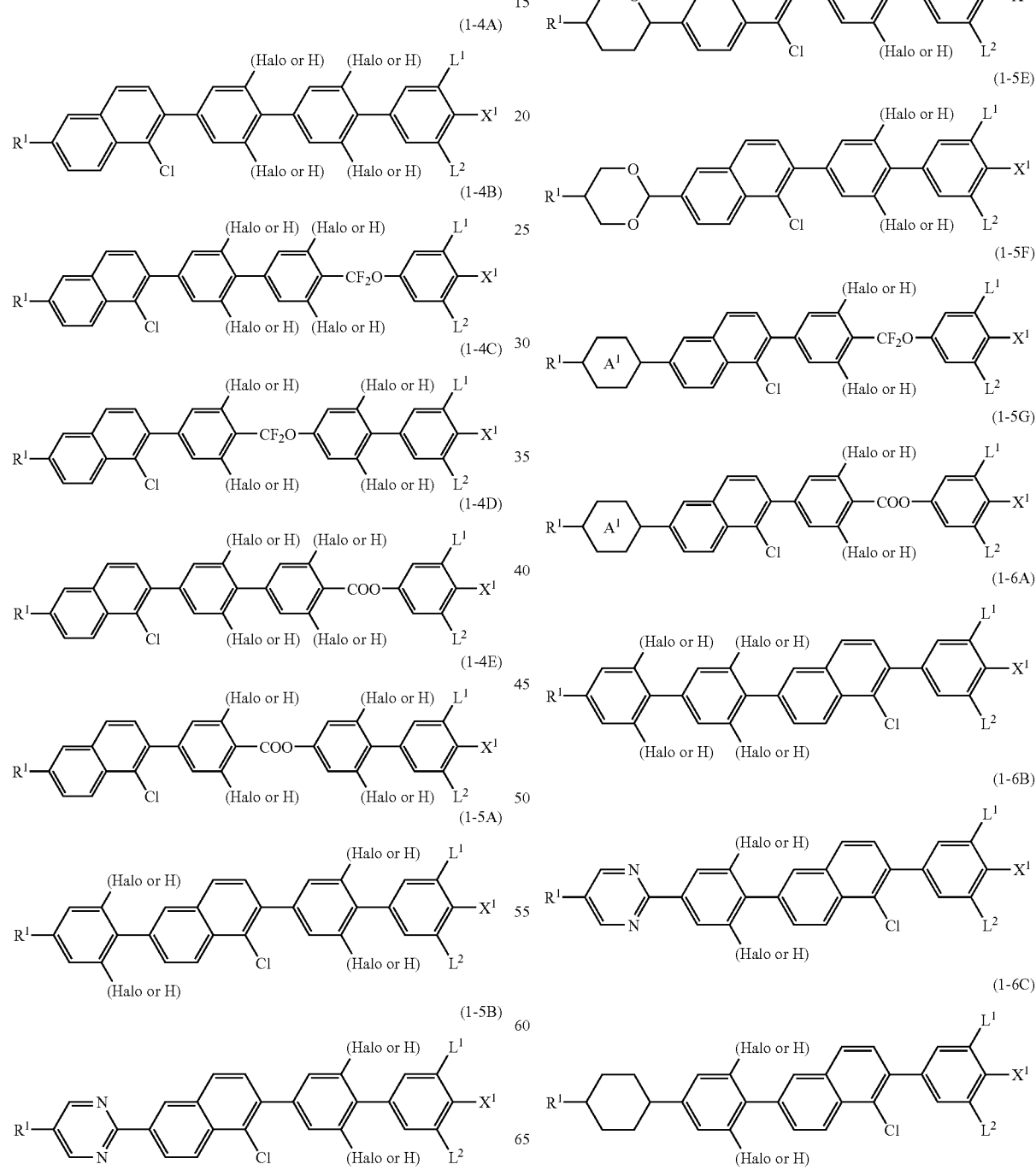

-continued
(1-6D)
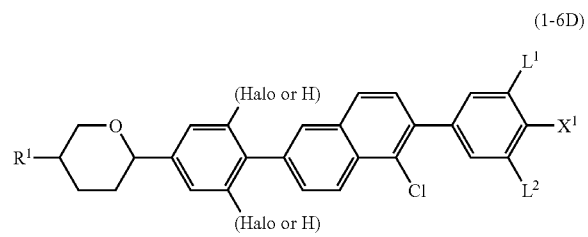
(1-6E)
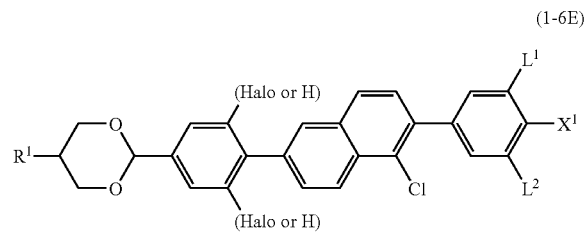
(1-6F)
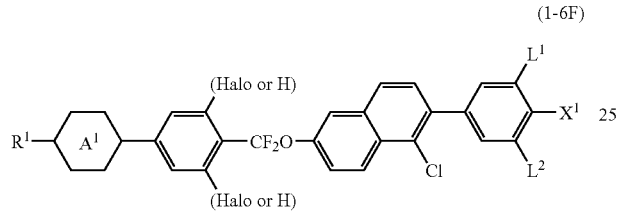
(1-6G)
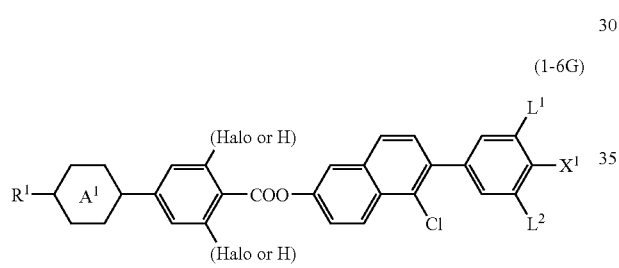
(1-7A)
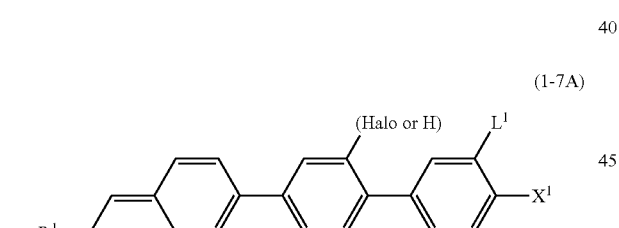
(1-7B)
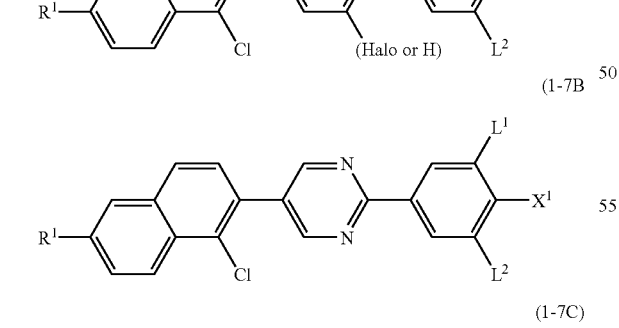
(1-7C)
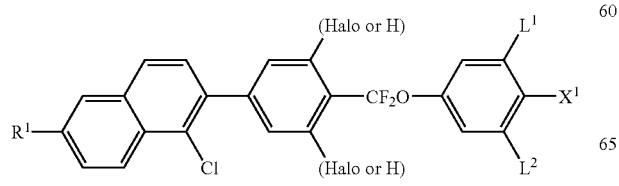
-continued
(1-7D)
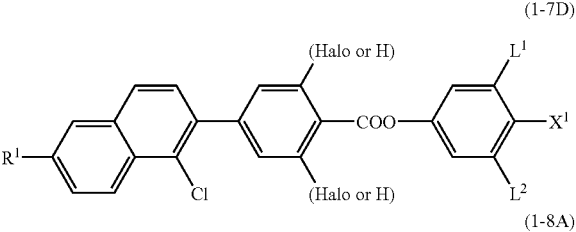
(1-8A)
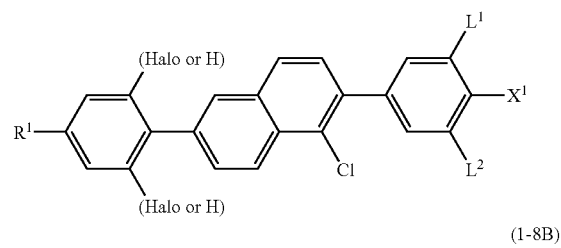
(1-8B)
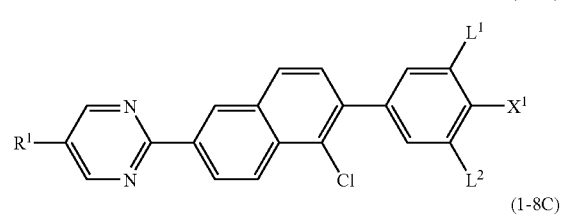
(1-8C)
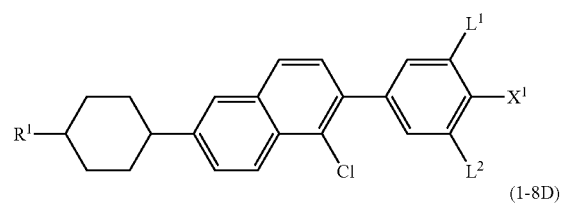
(1-8D)
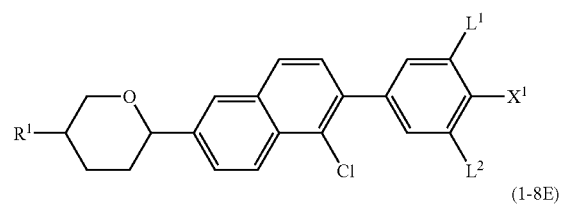
(1-8E)
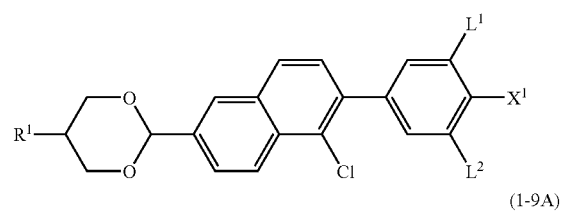
(1-9A)
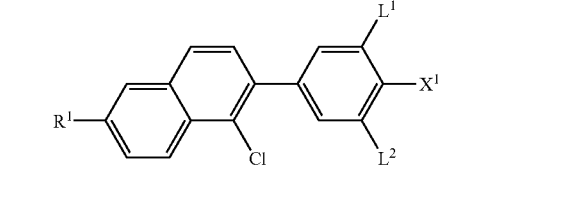
In these formulae, $R^1$ is one selected from formulae (CHN-1)-(CHN-4) and (CHN-6)-(CHN-8) above, the ring $A^1$ is one ring selected from formulae (RG-7), (RG-8-1)-(RG-8-5), (RG-10) and (RG-15) above, and $X^1$ is a fluorine atom, a chlorine atom, —C≡N, —$CF_3$, —$CHF_2$, —$CH_2F$, —$OCF_3$, —$OCHF_2$ or —C≡C—$CF_3$.

1-4. Synthesis of Compound (1)

Synthesis of the compound (1) is described below. The compound (1) may be synthesized with a suitable combination of certain methods known in the filed of synthetic organic chemistry. The methods for introducing the desired terminal group, rings and linking groups into the starting material are disclosed in known publications, such as *Organic Syntheses*, John Wiley & Sons, Inc; *Organic Reactions*, John Wiley & Sons, Inc; *Comprehensive Organic Synthesis*, Pergamon Press; *Lectures on New Experimental Chemistry* (MARUZEN), etc.

1-4-1. Formation of Chloronaphthalene Ring

It is possible to construct 1-chloronaphthalene ring by the method disclosed in, for example, *Synlett*, No. 18, 2837 (2005).

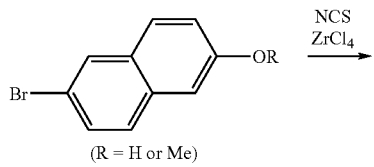

(R = H or Me)

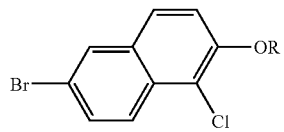

1-4-2. Formation of Linking Groups $Z^1$-$Z^6$

An example of the method for forming the linking groups $Z^1$-$Z^6$ of the compound (1) is described in reference of the reaction scheme below, wherein $MSG^1$ or $MSG^2$ is a monovalent organic group having at least one ring. The plural groups represented by $MSG^1$ (or $MSG^2$) in the scheme may be the same as or different from each other. The compounds (1A)-(1J) correspond to the compound (1).

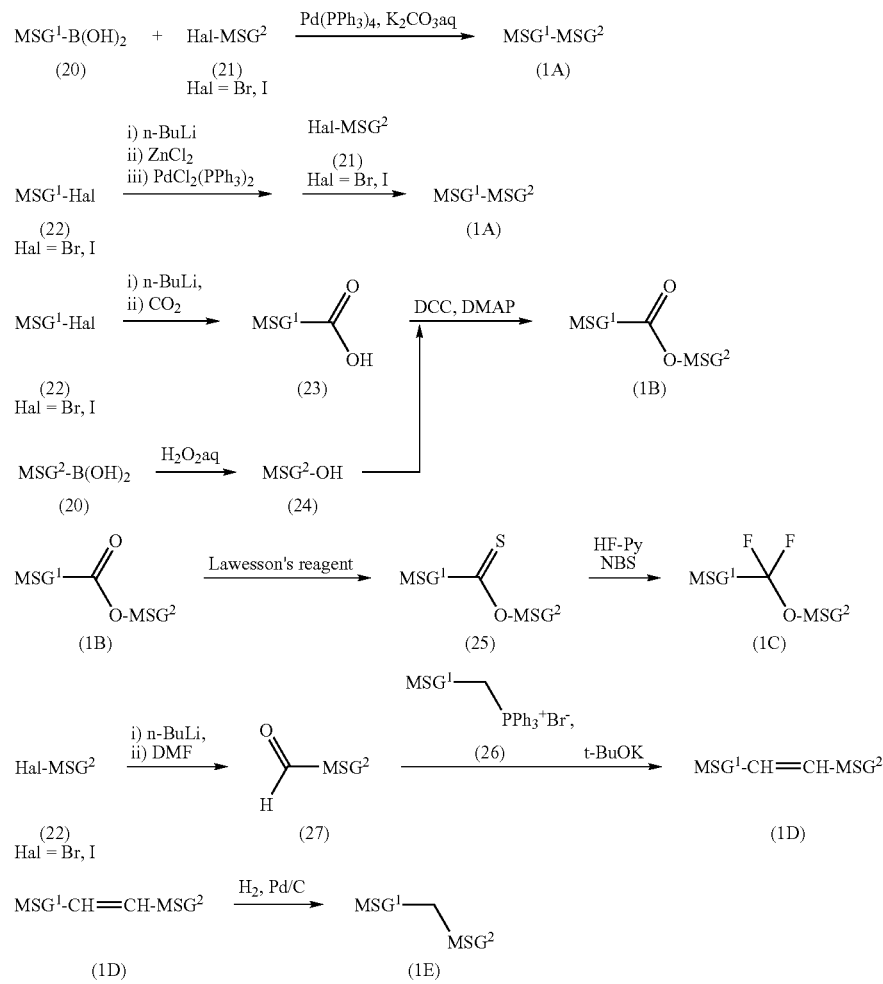

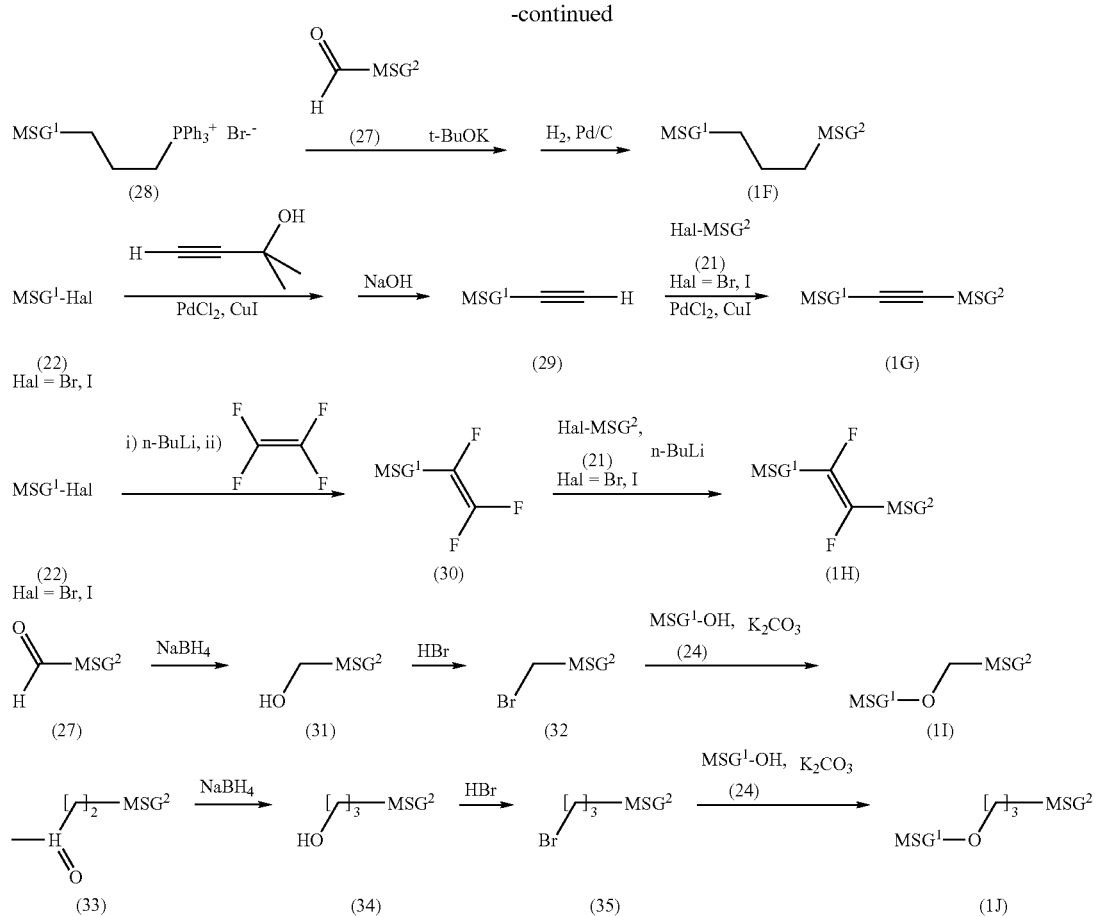

Next, exemplary methods for forming various linking groups $Z^1$-$Z^6$ in the compound (1) are described in reference of the items (I) to (X) below.

(I) Formation of Single Bond

An arylboric acid (20) is reacted with a compound (21), which is synthesized with a well-known method, in the presence of an aqueous carbonate solution and a catalyst such as tetrakis(triphenylphosphine) palladium to synthesize a compound (1A). The compound (1A) may alternatively be synthesized in a manner that a compound (22), which is synthesized with a well-known method, is reacted with n-butyl lithium and then with zinc chloride, and is then reacted with a compound (21) in the presence of a catalyst, such as dichloro-bis(triphenylphsophine) palladium.

(II) Formation of —COO— and —OCO—

The compound (22) is reacted with n-butyl lithium and then with carbon dioxide to obtain a carboxylic acid (23). The compound (23) and a phenol compound (24) synthesized with a well-known method are subjected to dehydration in the presence of DDC (1,3-dicyclohexylcarbodiimide) and DMAP (4-dimethylaminopyridine) to synthesize a compound (1B) with —COO—. A compound with —OCO— may be obtained in a similar manner.

(III) Formation of —CF$_2$O— and —OCF$_2$—

The compound (1B) is treated with a sulfurizing agent, such as Lawesson's reagent, to obtain a compound (25). The compound (25) is fluorinated with hydrogen fluoride pyridine complex and NBS (N-bromosuccinimide) to synthesize a compound (1C) with —CF$_2$O—. The reaction is described in M. Kuroboshi et al., Chem. Lett., 1992, 827. The compound (1C) may alternatively be synthesized by fluorinating the compound (25) by (diethylamino)sulfur trifluoride (DAST). The reaction is described in W. H. Bunnelle, et al., J. Org. Chem., vol. 55, p. 768 (1990). A compound with —OCF$_2$— may be produced in a similar manner. These linking groups may alternatively be formed by the method described in Peer. Kirsch, et al., Anbew. Chem. Int. Ed., vol. 40, p. 1480 (2001).

(IV) Formation of —CH═CH—

The compound (22) is treated with n-butyl lithium and then reacted with a formamide, such as N,N-dimethylformamide (DMF), to obtain an aldehyde compound (27). A phosphonium salt (26), which is synthesized by a well-known method, is treated with a base, such as potassium t-butoxide, to form a phosphorus ylide, which is then reacted with the aldehyde compound (27) to synthesize a compound (1D). A cis-compound is formed due to the reaction conditions, and, if necessary, the cis-compound can be isomerized to a trans-compound by a well-known method.

(V) Formation of —(CH$_2$)$_2$—

The compound (1D) is hydrogenated in the presence of a catalyst, such as palladium charcoal, to synthesize a compound (1E).

(VI) Formation of —(CH$_2$)$_4$—

A compound with —(CH$_2$)$_2$—CH═CH— is obtained in a manner as described in the item (IV), wherein a phosphonium salt (28) is used instead of the phosphonium salt (26). The compound is subjected to catalytic hydrogenation to synthesize a compound (1F).

(VI) Formation of —C≡C—

The compound (22) is reacted with 2-methyl-3-butyne-2-ol in the presence of a catalyst containing dichloropalladium and copper halogenide and then deprotected under a basic condition to obtain a compound (29). The compound (29) is reacted with a compound (21) in the presence of a catalyst containing dichloro-bis(triphenylphsophine) palladium and copper halogenide to synthesize a compound (1G).

(VIII) Formation of —CF═CF—

The compound (22) is treated with n-butyl lithium and then reacted with tetrafluoroethylene to get a compound (30). The compound (21) is treated with n-butyl lithium and then reacted with the compound (30) to synthesize a compound (1H).

(IX) Formation of —CH$_2$O— or —OCH$_2$—

The compound (27) is reduced by a reducing agent, such as sodium borohydride, to obtain a compound (31). The compound (31) is then halogenated with hydrobromic acid or the like to obtain a compound (32). The compound (32) is reacted with the compound (24) in the presence of potassium carbonate or the like to synthesize a compound (II).

(X) Formation of —(CH$_2$)$_3$O— or —O(CH$_2$)$_3$—

A compound (1J) is synthesized in a manner as described in item (IX) except that a compound (33) is used instead of the compound (27).

1-4-3. Synthesis of rings A$^1$, A$^2$, A$^3$, A$^4$, A$^5$ and A$^6$

To obtain the rings of 1,4-cyclohexylene, 1,3-dioxan-2,5-diyl, 1,4-phenylene, 2-fluoro-1,4-phenylene, 2,3-difluoro-1,4-phenylene, 2,5-difluoro-1,4-phenylene, 2,6-difluoro-1,4-phenylene, 2,3,5,6-tetrafluoro-1,4-phenylene, pyrimidin-2,5-diyl, pyridin-2,5-diyl and so on, the starting materials may be commercially available, or may alternatively be synthesized by well-known methods.

1-4-4. Synthesis of Compound (1)

There are a variety of synthesis methods for the compound of formula (1), which may be synthesized from commercially available reagents in reference of the embodiments in the present specification or papers or books.

2. Compounds (2)-(13)

A second aspect of the invention relates to a liquid crystal composition that is prepared by adding a component selected from the components B, C, D and E shown below in the compound of formula (1) (component A). As compared to a composition only comprising the component A, the driving voltage, temperature range of liquid crystal phase, optical anisotropy, dielectric anisotropy, viscosity and so on of the liquid crystal composition may be adjusted as required.

Preferably, the component to be added into the component A is preferably a mixture containing a component B including at least one compound selected from the group consisting of formulae (2), (3) and (4), a component C including at least one compound selected from the group consisting of formula (5) or a component D including at least one compound selected from the group consisting of formulae (6), (7), (8), (9) and (10). In addition, the threshold voltage, temperature range of liquid crystal phase, optical anisotropy, dielectric anisotropy, viscosity and so on may be adjusted by mixing a component E including at least one compound selected from the group consisting of formulae (11), (12) and (13).

In addition, each component of the liquid crystal composition used in the invention may contain isotopes, since the isotopes do not much change the physical properties of the compound.

For the component B, preferred examples of the compound of formula (2) include formulae (2-1)-(2-16), preferred examples of the compound of formula (3) include formulae (3-1)-(3-112), and preferred examples of the compound of formula (4) include formulae (4-1)-(4-52).

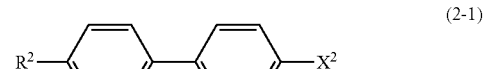 (2-1)

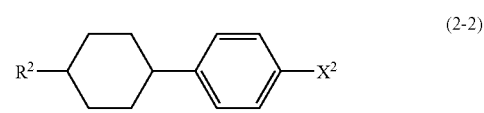 (2-2)

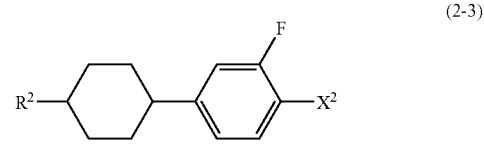 (2-3)

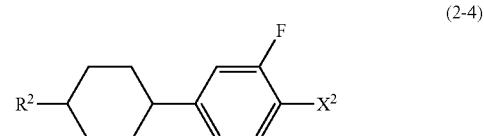 (2-4)

 (2-5)

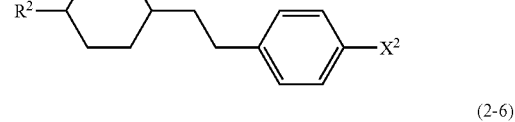 (2-6)

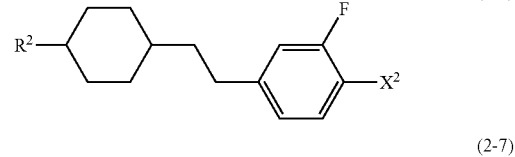 (2-7)

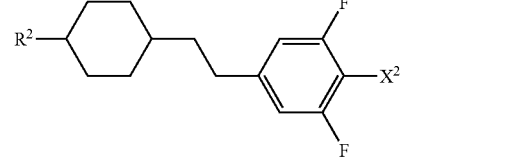 (2-8)

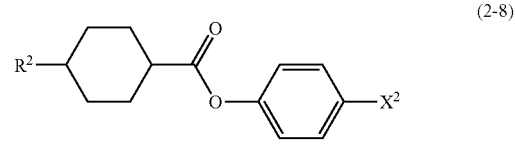 (2-9)

-continued
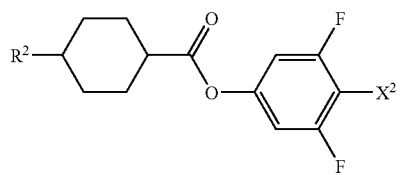 (2-10)
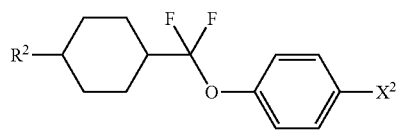 (2-11)
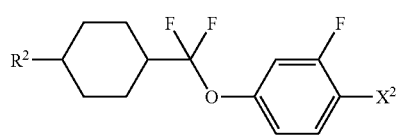 (2-12)
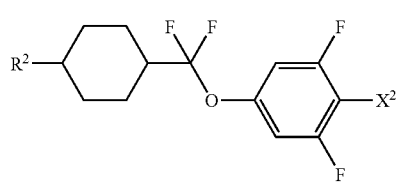 (2-13)
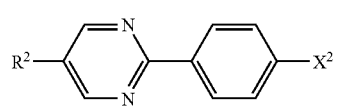 (2-14)
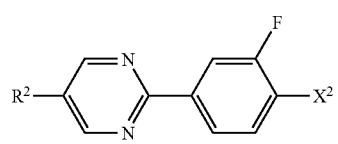 (2-15)
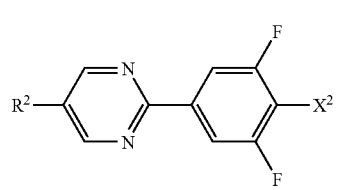 (2-16)
 (3-1)
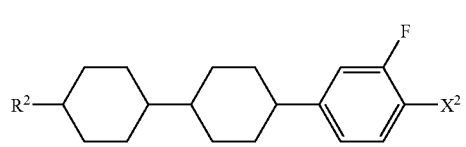 (3-2)
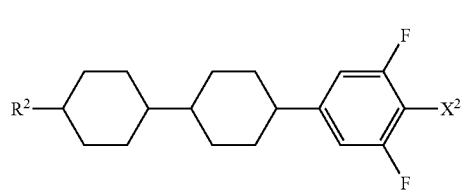 (3-3)
-continued
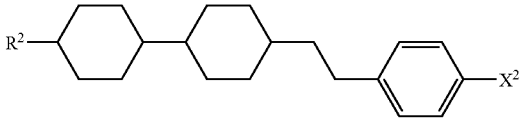 (3-4)
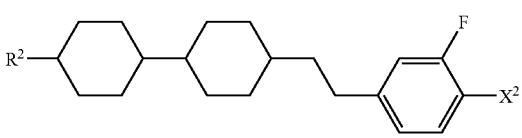 (3-5)
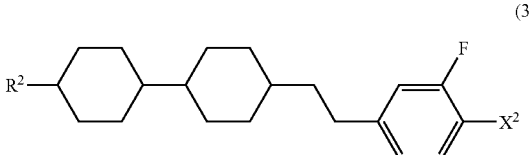 (3-6)
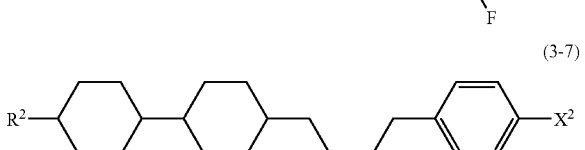 (3-7)
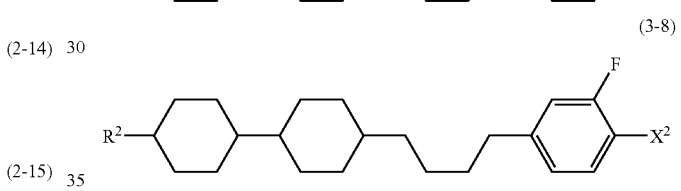 (3-8)
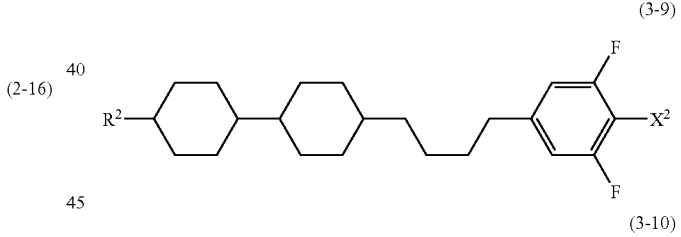 (3-9)
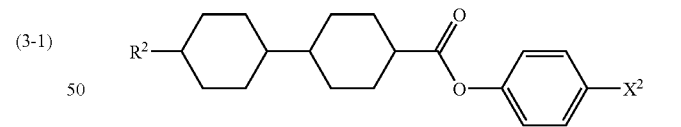 (3-10)
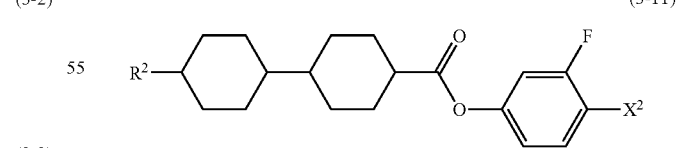 (3-11)
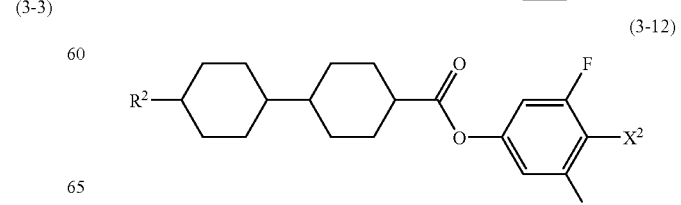 (3-12)

-continued (3-13) through (3-31): chemical structure diagrams

-continued
(3-32)
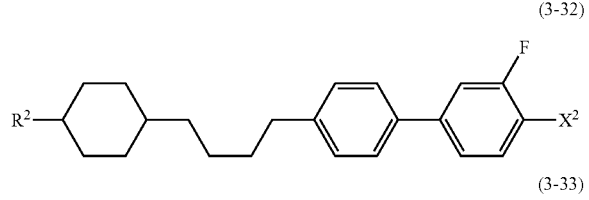
(3-33)
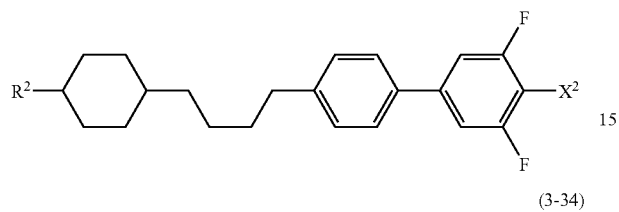
(3-34)
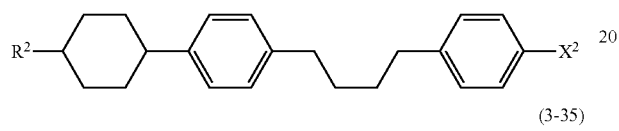
(3-35)
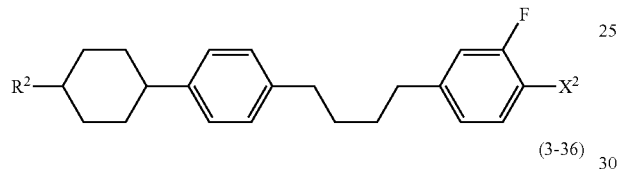
(3-36)
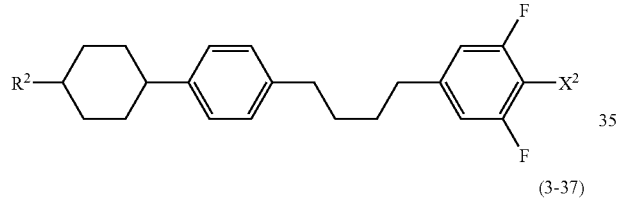
(3-37)
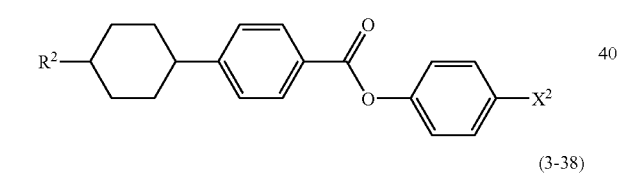
(3-38)
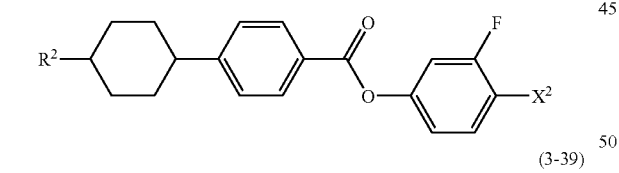
(3-39)
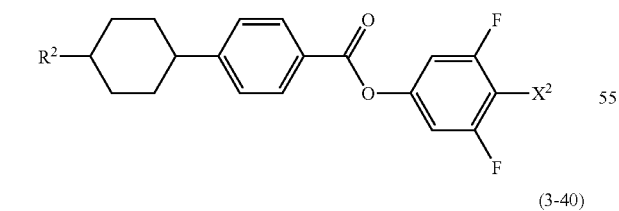
(3-40)
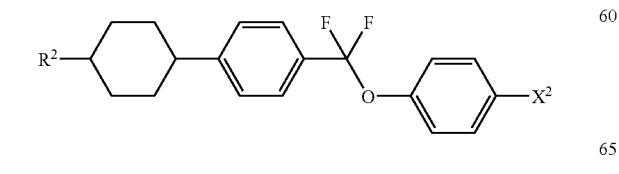
-continued
(3-41)
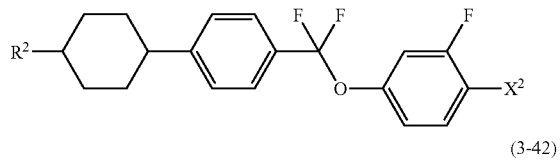
(3-42)
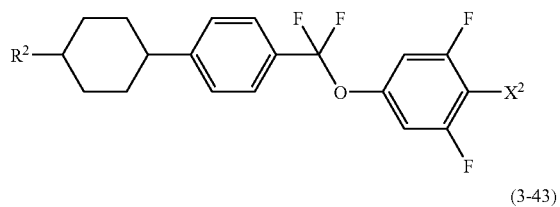
(3-43)
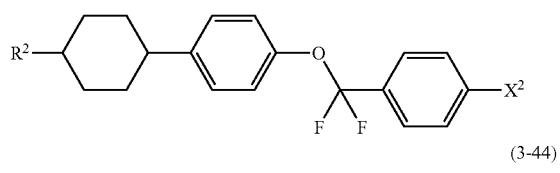
(3-44)
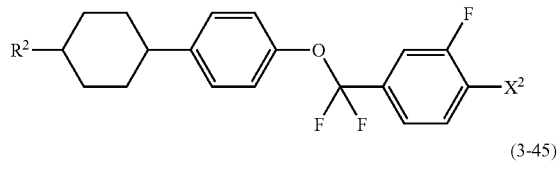
(3-45)
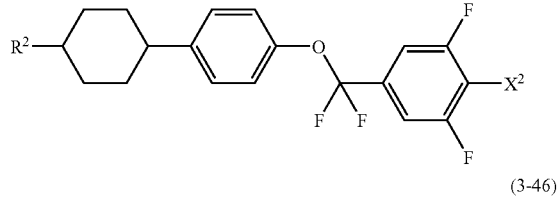
(3-46)
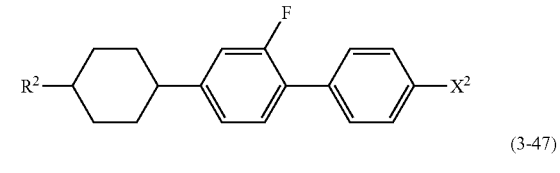
(3-47)
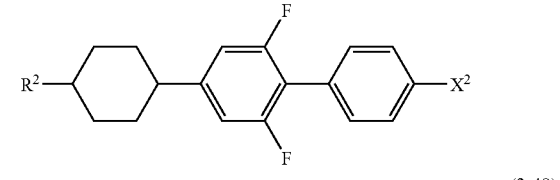
(3-48)
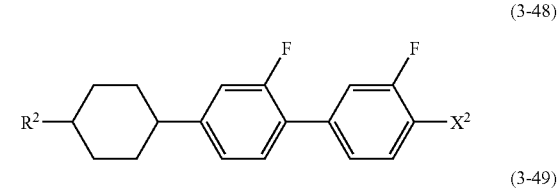
(3-49)
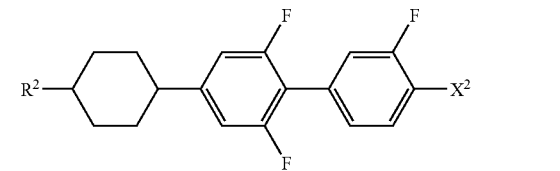

(3-50)
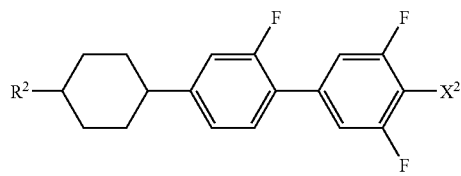
(3-51)
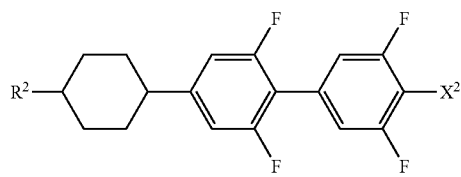
(3-52)
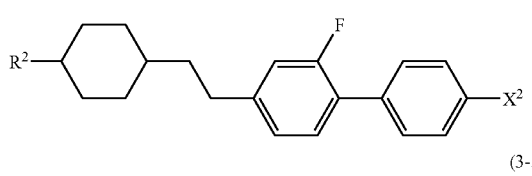
(3-53)
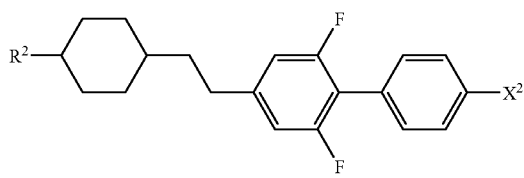
(3-54)
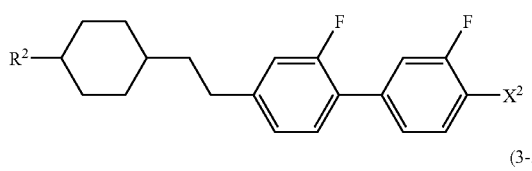
(3-55)
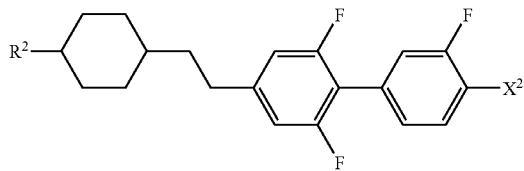
(3-56)
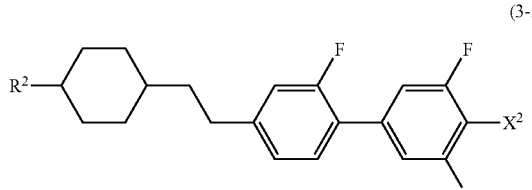
(3-57)
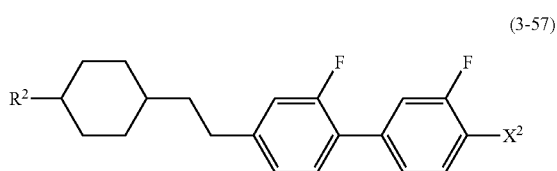
(3-58)
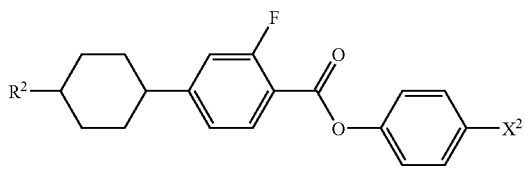
(3-59)
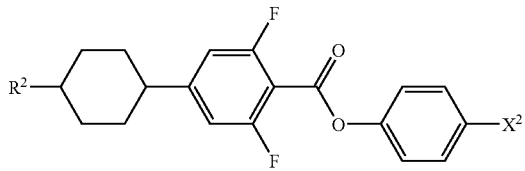
(3-60)
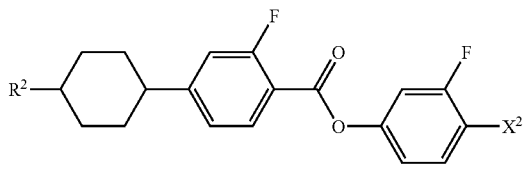
(3-61)
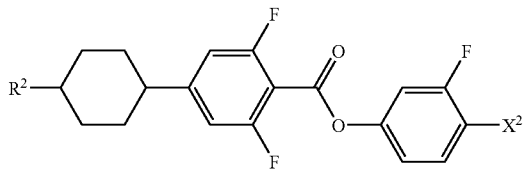
(3-62)
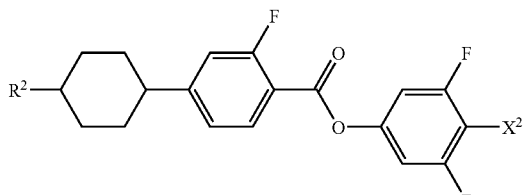
(3-63)
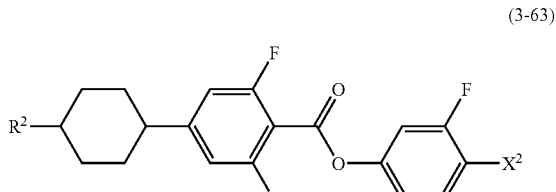
(3-64)
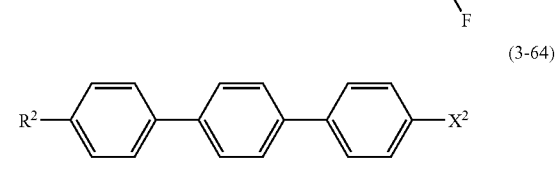
(3-65)
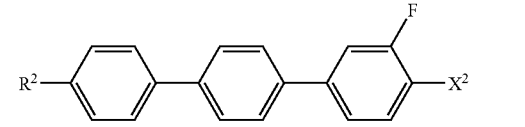

(3-66) 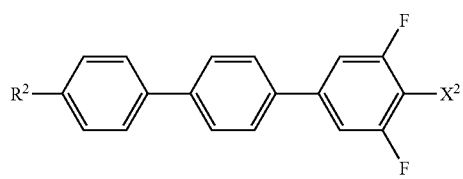
(3-67) 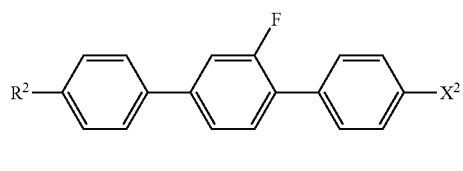
(3-68) 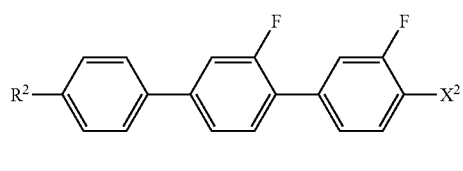
(3-69) 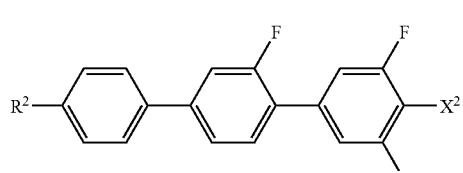
(3-70) 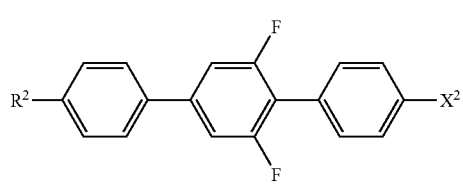
(3-71) 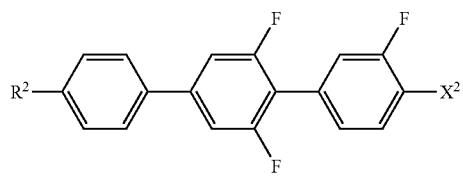
(3-72) 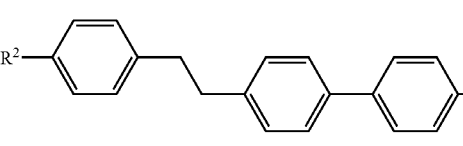
(3-73) 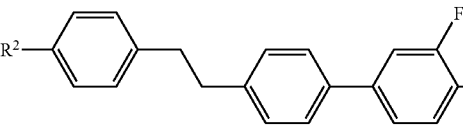
(3-74) 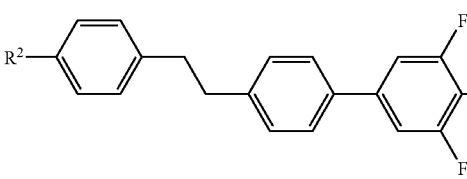
(3-75) 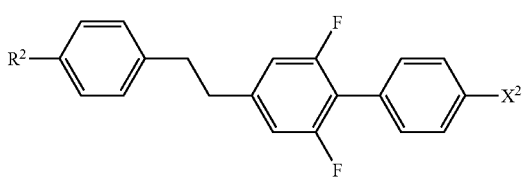
(3-76) 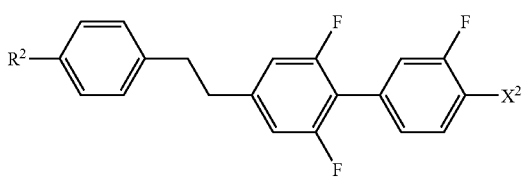
(3-77) 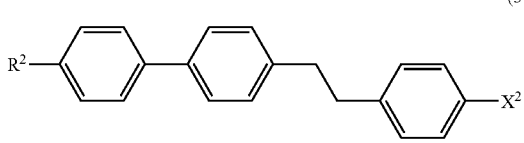
(3-78) 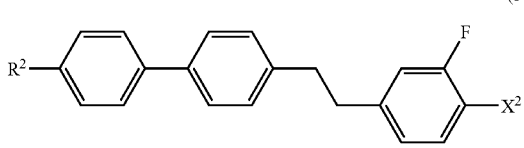
(3-79) 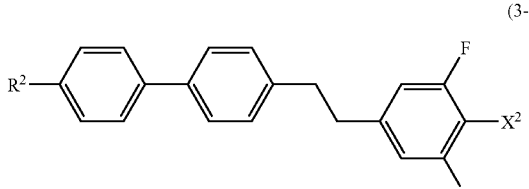
(3-80) 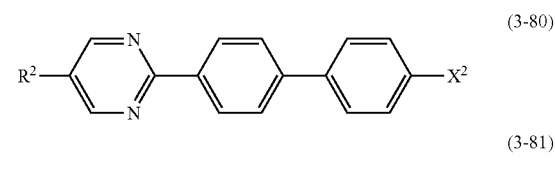
(3-81) 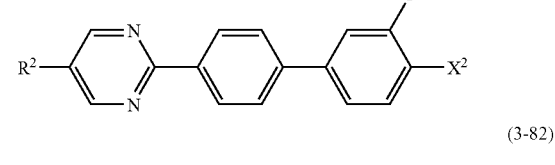
(3-82) 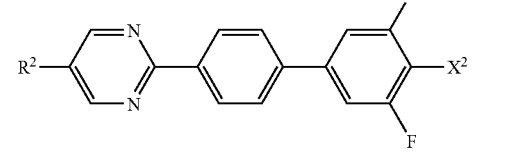
(3-83) 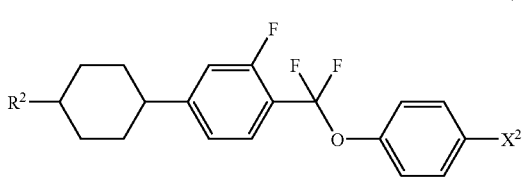

(3-84)
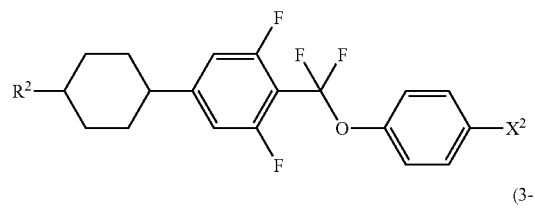
(3-85)
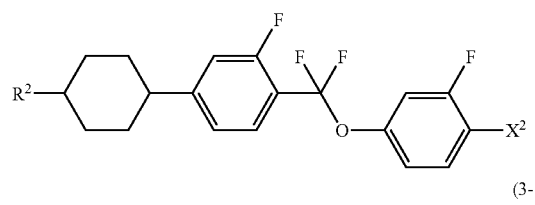
(3-86)
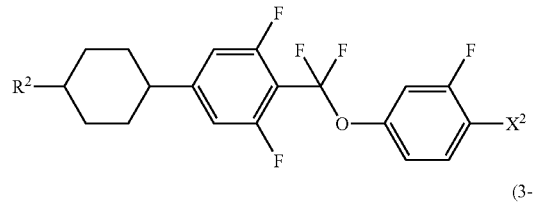
(3-87)
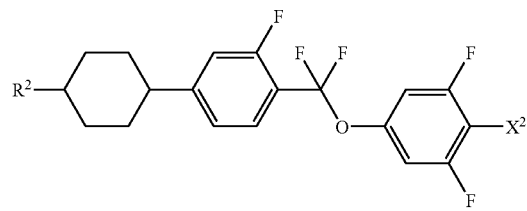
(3-88)
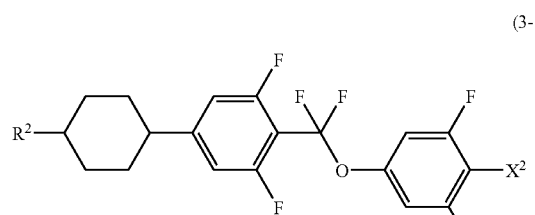
(3-89)
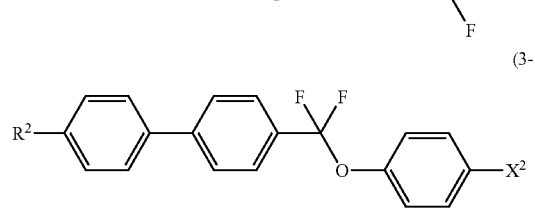
(3-90)
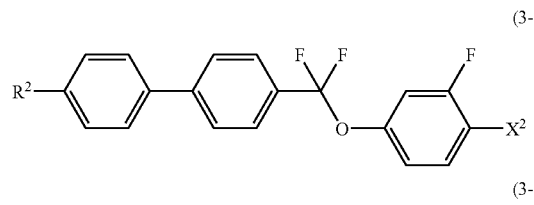
(3-91)
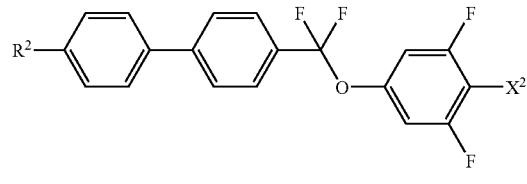
(3-92)
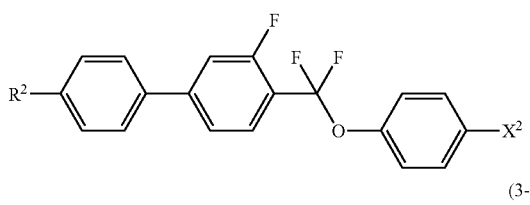
(3-93)
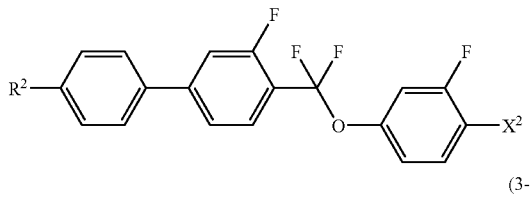
(3-94)
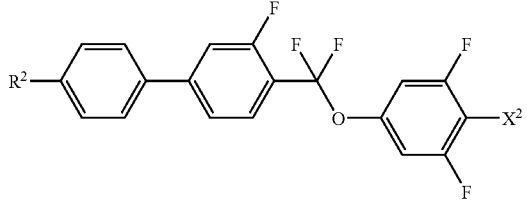
(3-95)
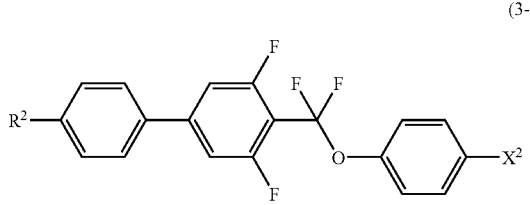
(3-96)
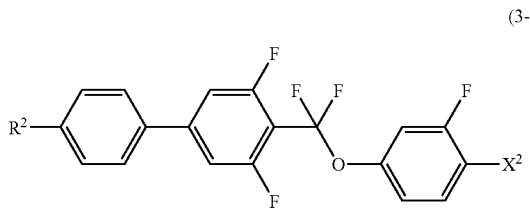
(3-97)
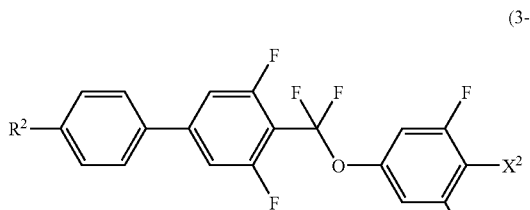
(3-98)
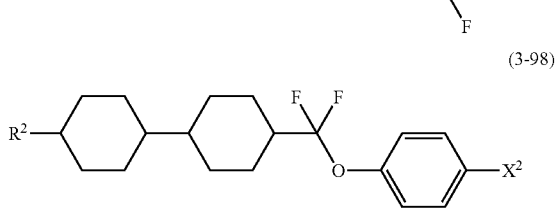
(3-99)
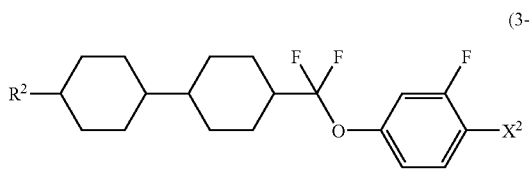

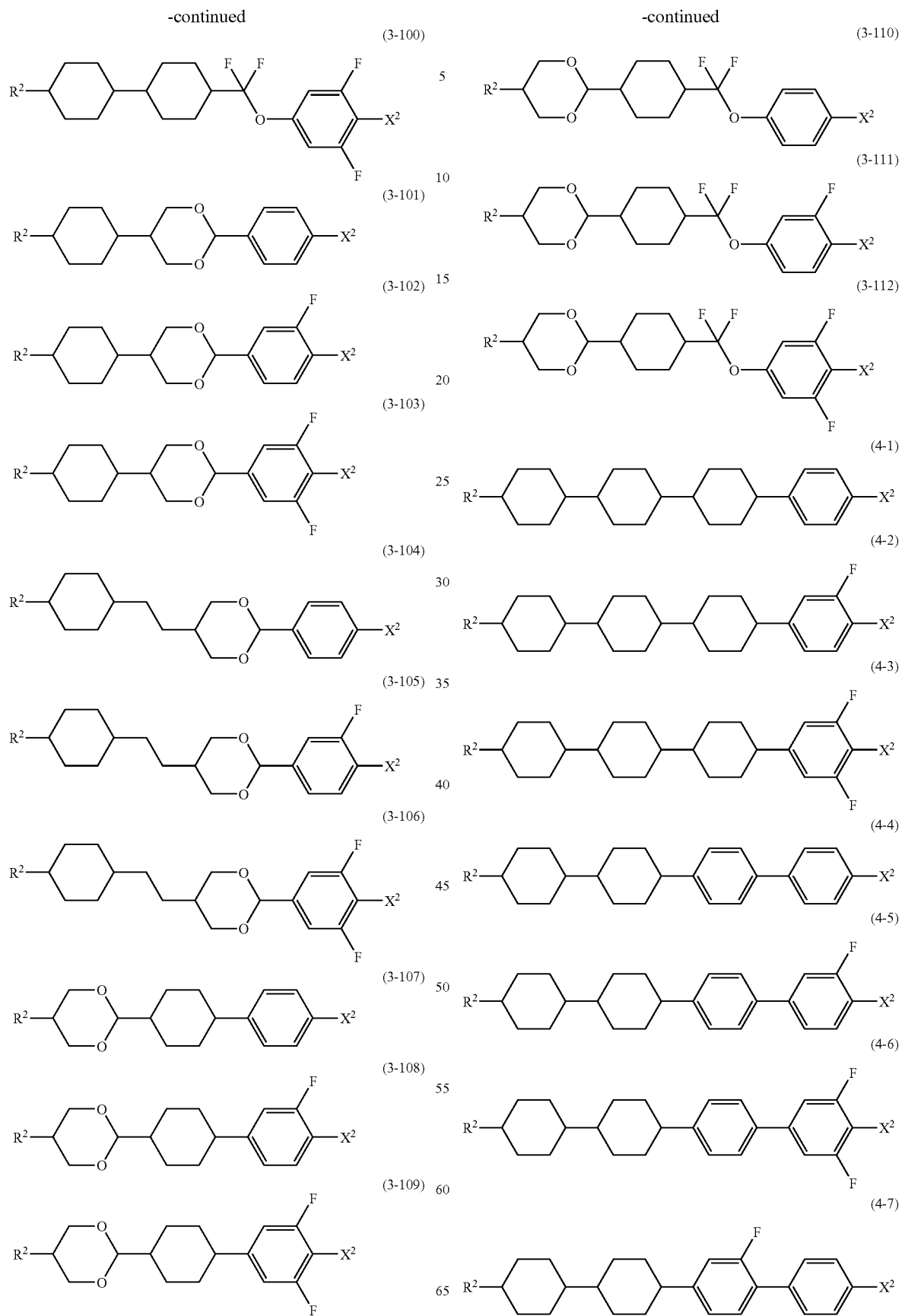

-continued
(4-8)
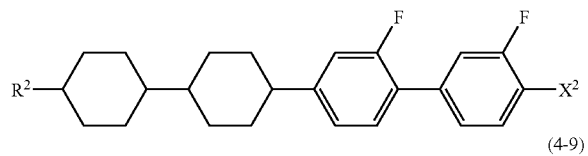
(4-9)
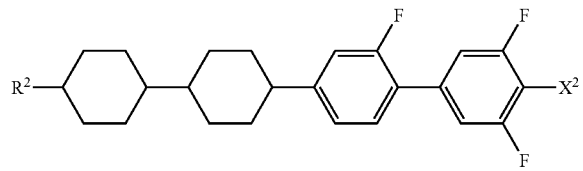
(4-10)
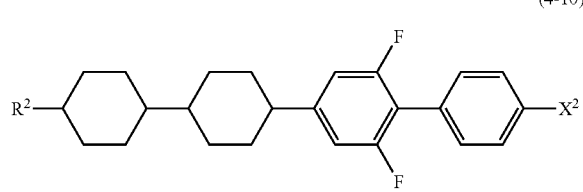
(4-11)
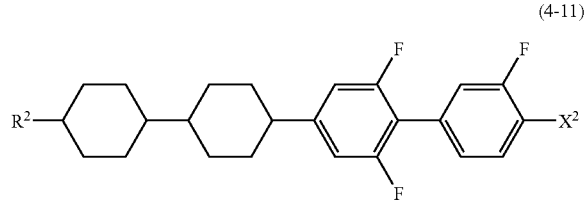
(4-12)
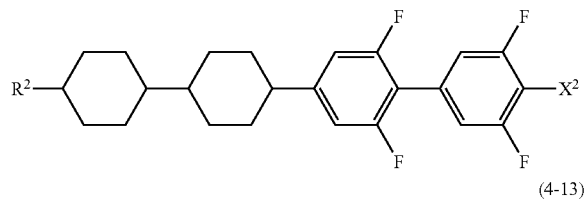
(4-13)
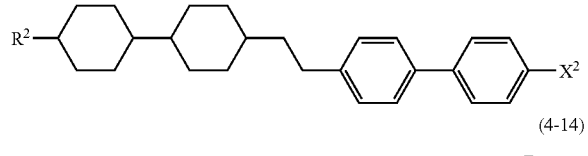
(4-14)
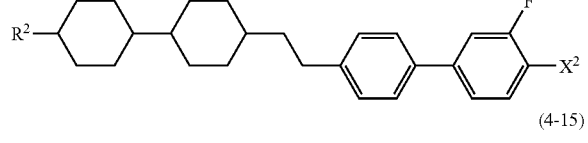
(4-15)
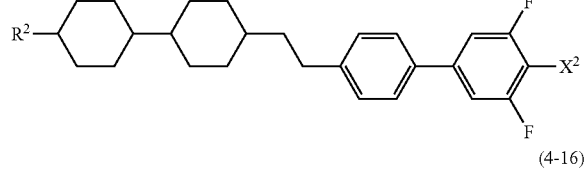
(4-16)
-continued
(4-17)
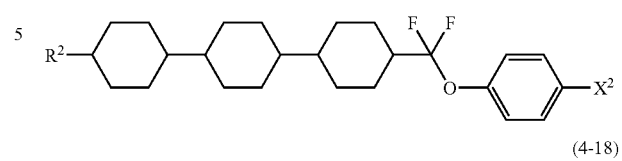
(4-18)
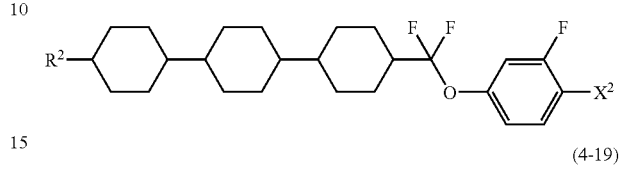
(4-19)
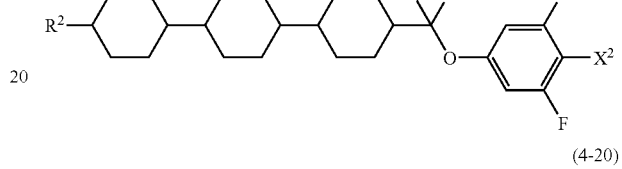
(4-20)
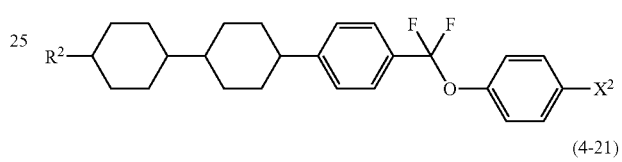
(4-21)
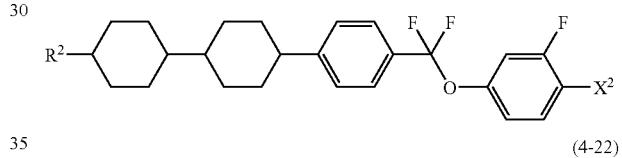
(4-22)
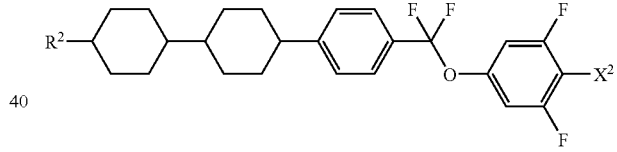
(4-23)
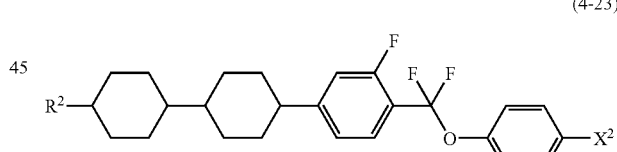
(4-24)
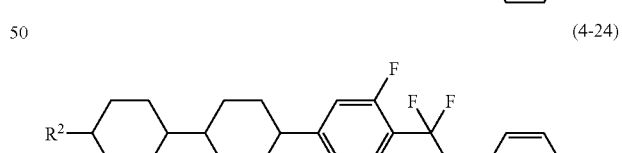
(4-25)
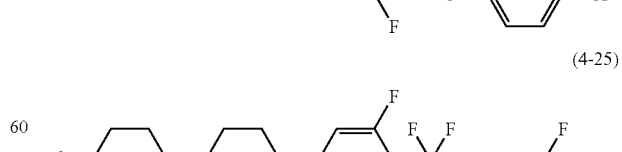
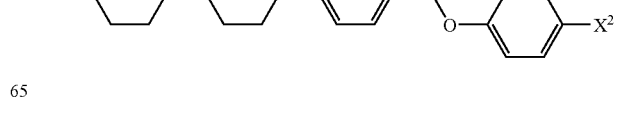

(4-26)
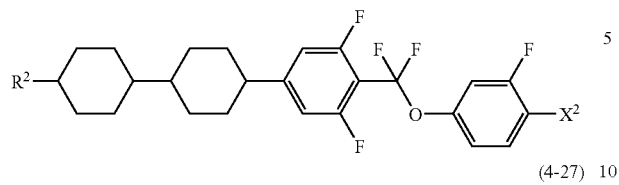
(4-27)
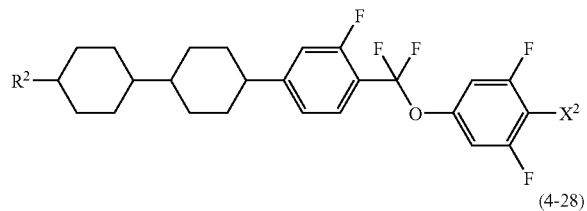
(4-28)
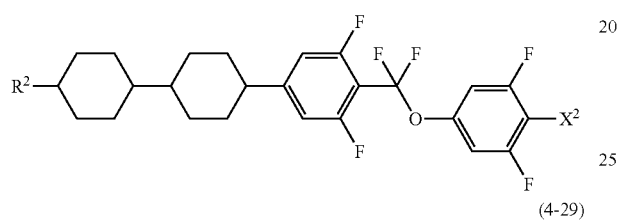
(4-29)
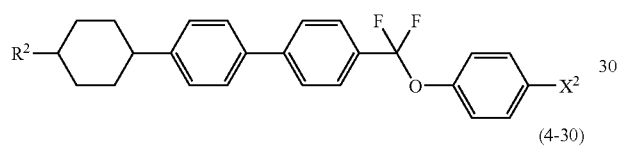
(4-30)
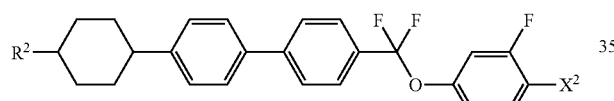
(4-31)
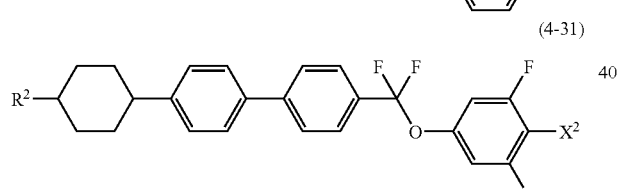
(4-32)
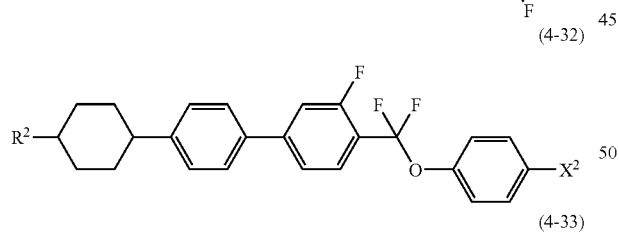
(4-33)
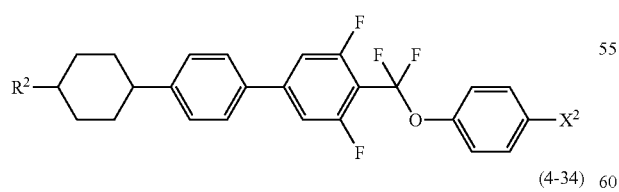
(4-34)
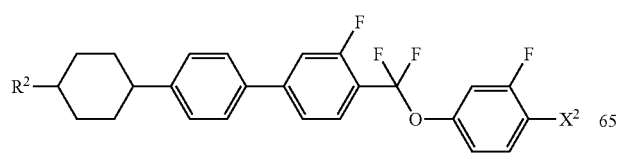
(4-35)
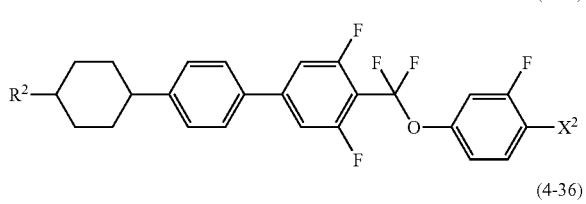
(4-36)
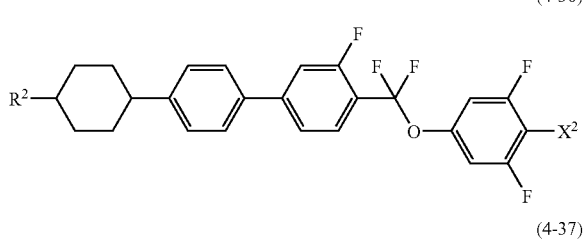
(4-37)
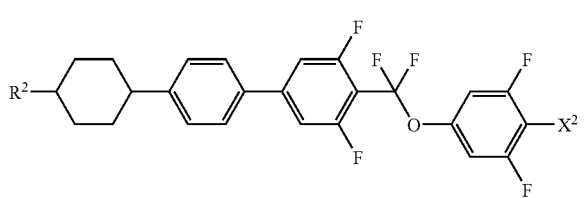
(4-38)
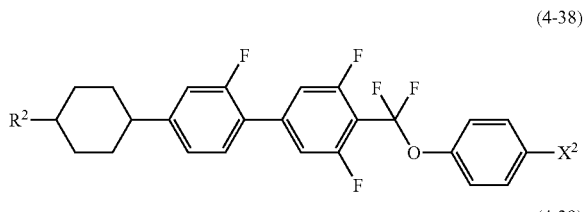
(4-39)
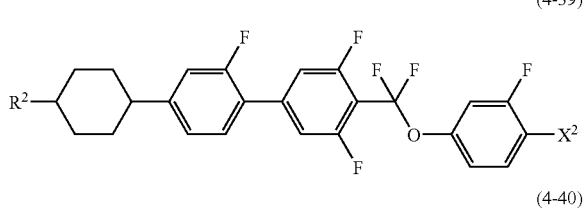
(4-40)
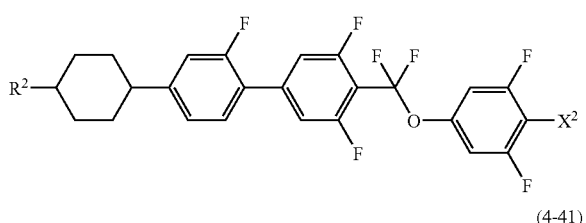
(4-41)
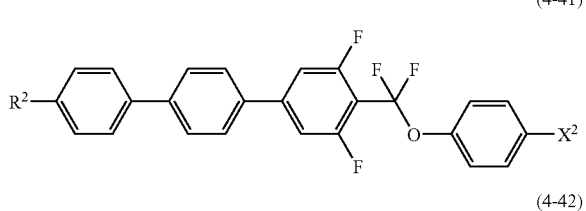
(4-42)
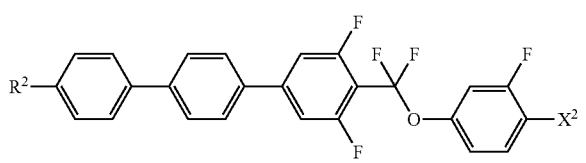

(4-43)
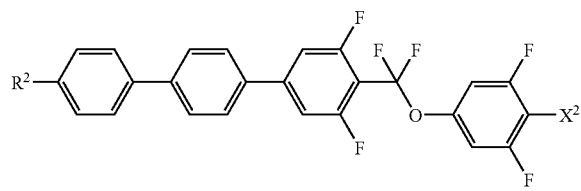

(4-44)
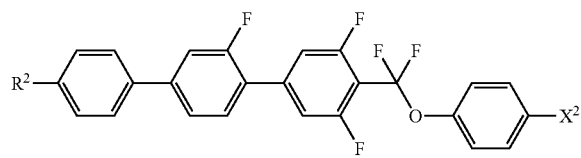

(4-45)
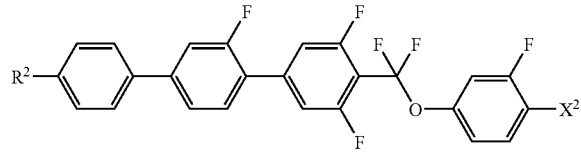

(4-46)
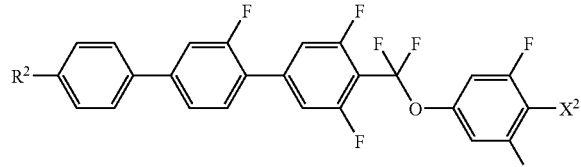

(4-47)
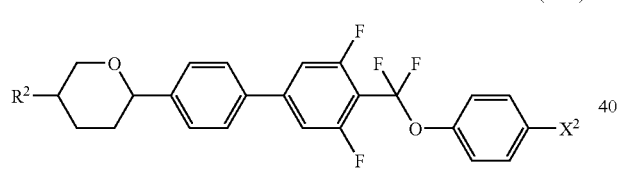

(4-48)
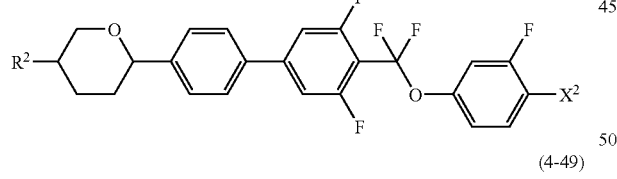

(4-49)
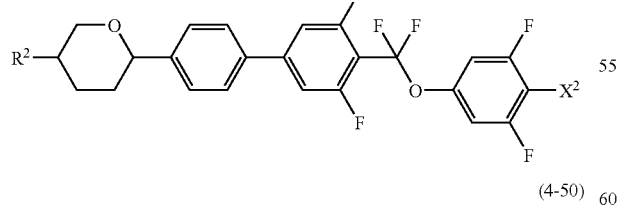

(4-50)
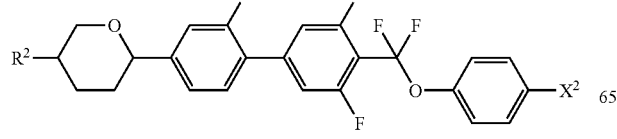

(4-51)
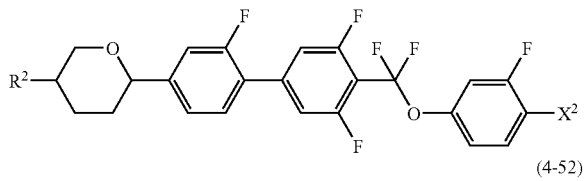

(4-52)
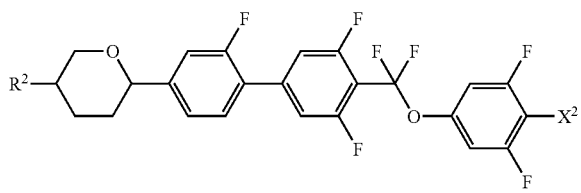

In these formulae, $R^2$ and $X^2$ are defined as above.

The compounds represented by formulae (2)-(4), i.e., component B, are useful for preparing a liquid crystal composition for a TFT, since they have positive dielectric anisotropy and very good thermal stability or chemical stability. The content of the component B in the liquid crystal composition of the invention is suitably 1-99 wt %, preferably 10-97 wt % and more preferably 40-95 wt %, relative to the total weight of the liquid crystal composition. In addition, the viscosity can be adjusted by further including a compound represented by one of formulae (11)-(13), i.e., component E. Suitable examples of the compound represented by formula (5), i.e., component C, include formulae (5-1)-(5-62).

(5-1)
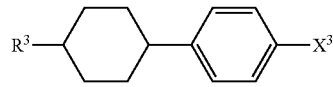

(5-2)

(5-3)
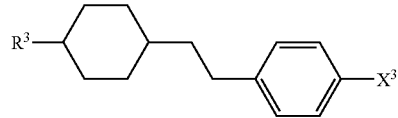

(5-4)
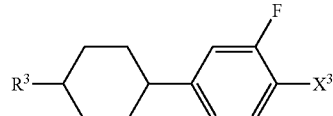

(5-5)
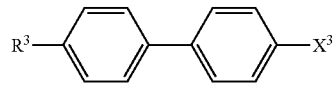

(5-6)
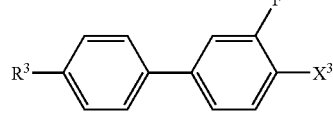

-continued
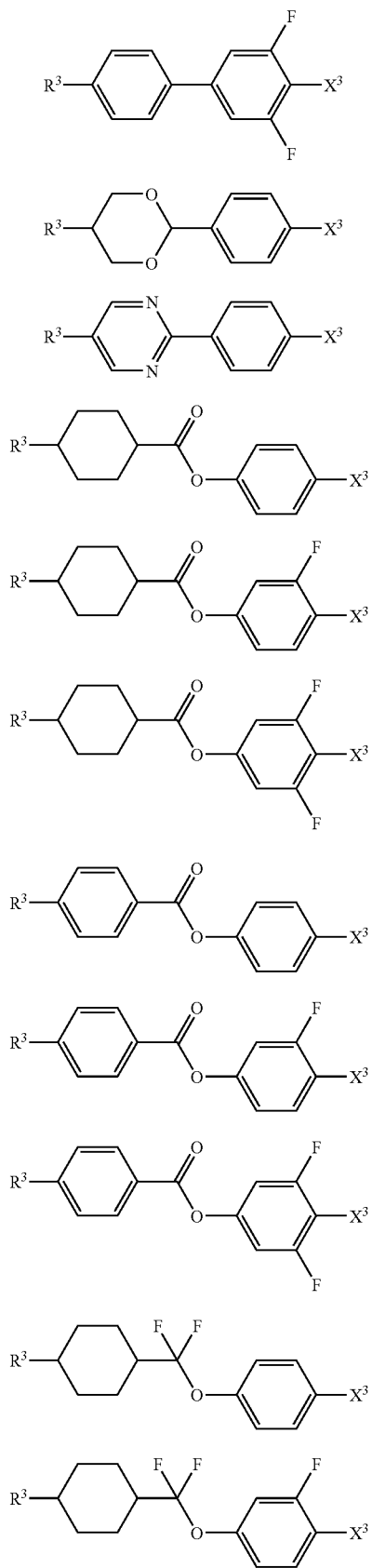
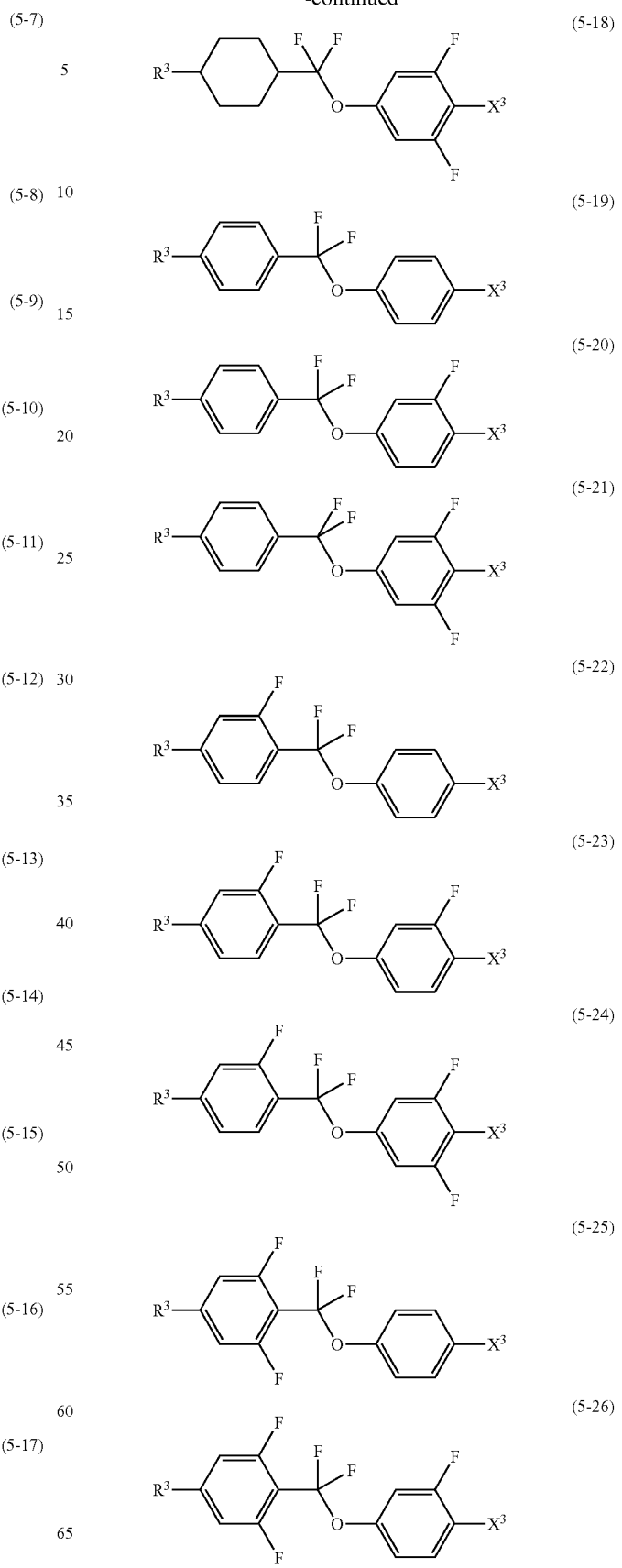

(5-27) through (5-46): chemical structure diagrams

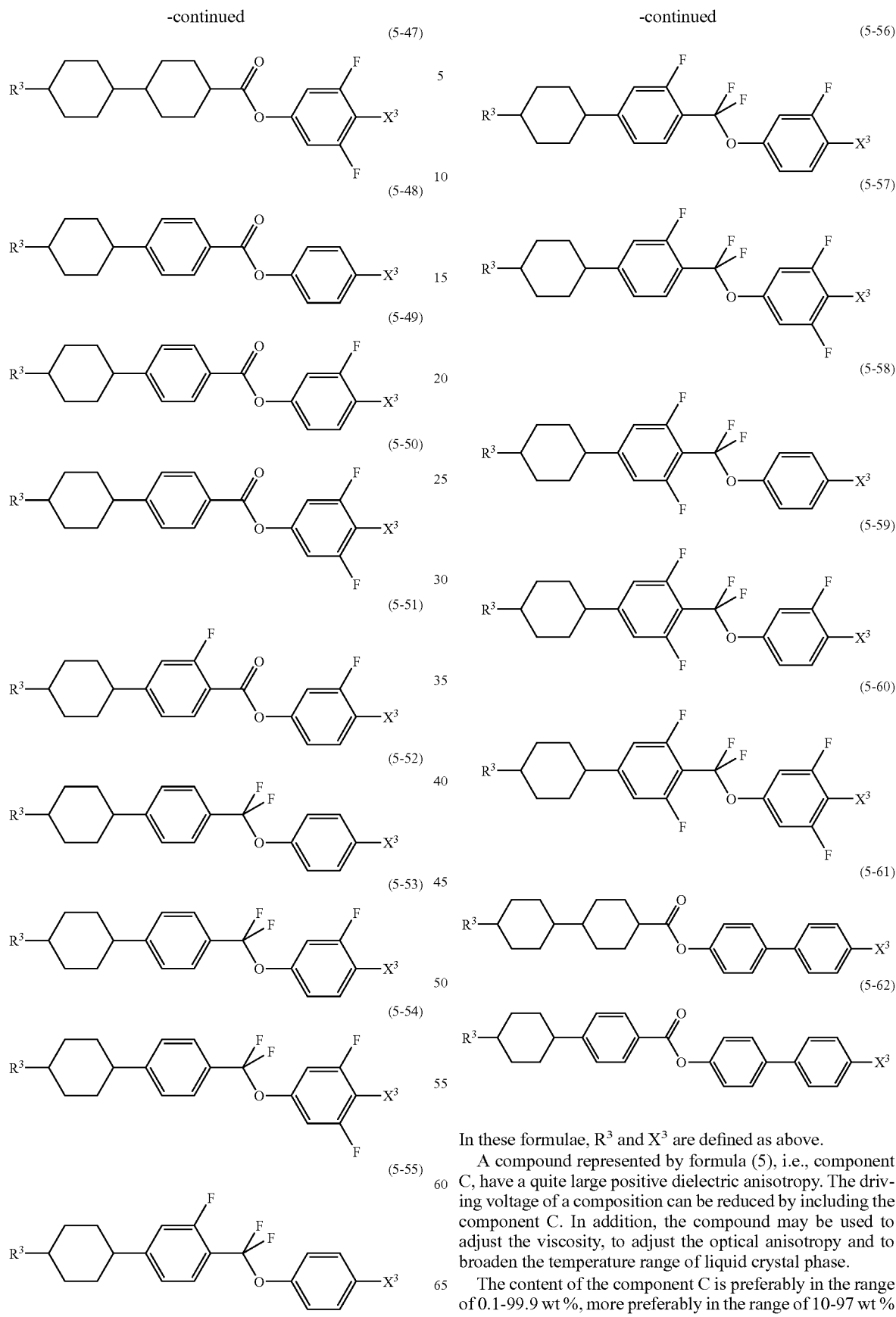

In these formulae, $R^3$ and $X^3$ are defined as above.

A compound represented by formula (5), i.e., component C, have a quite large positive dielectric anisotropy. The driving voltage of a composition can be reduced by including the component C. In addition, the compound may be used to adjust the viscosity, to adjust the optical anisotropy and to broaden the temperature range of liquid crystal phase.

The content of the component C is preferably in the range of 0.1-99.9 wt %, more preferably in the range of 10-97 wt % and even more preferably in the range of 40-95 wt %, relative to the total weight of the composition. In addition, the threshold voltage, temperature range of liquid crystal phase, optical anisotropy, dielectric anisotropy, viscosity and so on can be adjusted by including the following components.

In preparing a liquid crystal composition of the invention with a negative dielectric anisotropy, a preferred component is component D including at least one compound selected from the group consisting of formulae (6)-(10).

Suitable examples of the compounds represented by formulae (6)-(10), i.e., component D, include formulae (6-1)-(6-5), (7-1)-(7-9), (8-1)-(8-3) and (10-1)-(10-11).

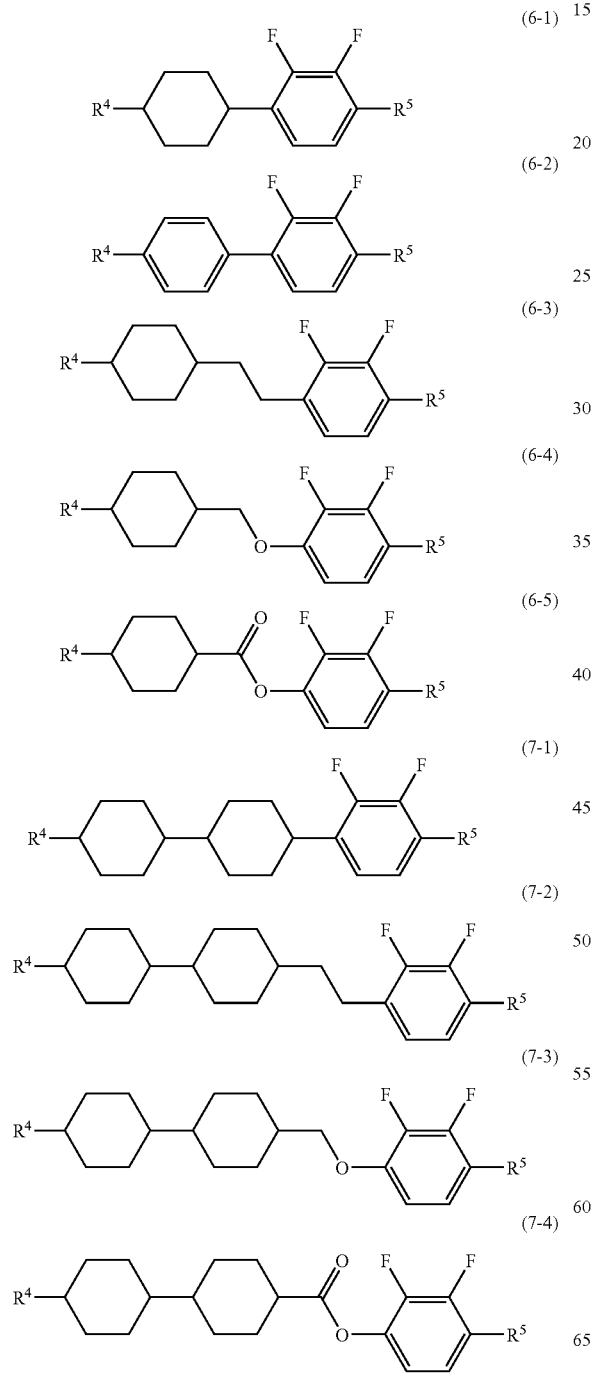
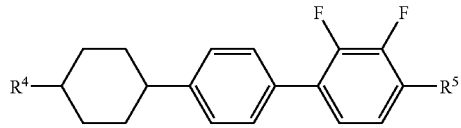
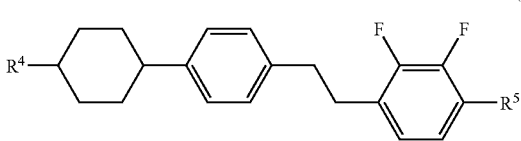
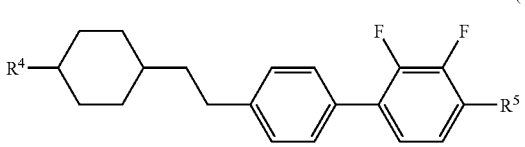
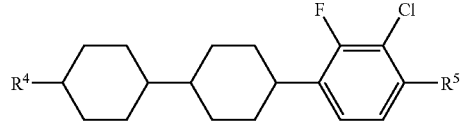
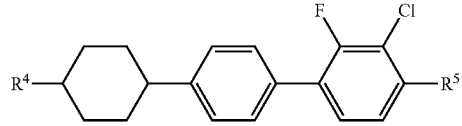
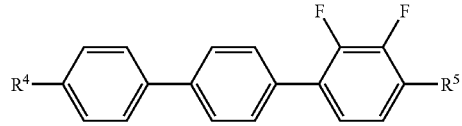
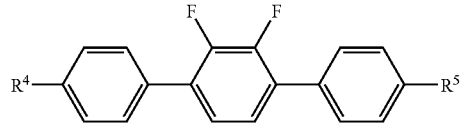
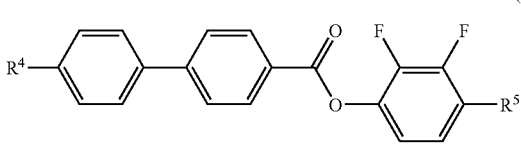
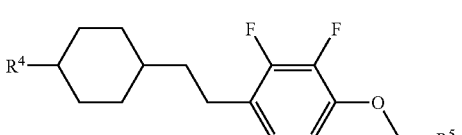
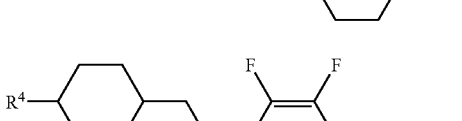

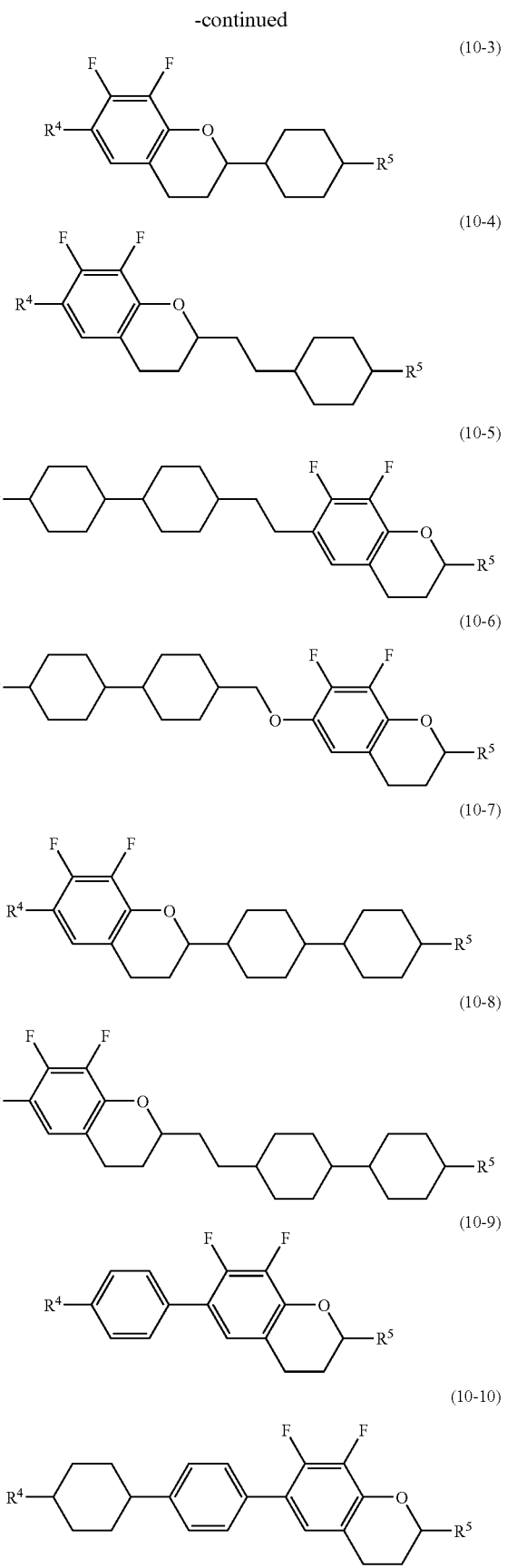

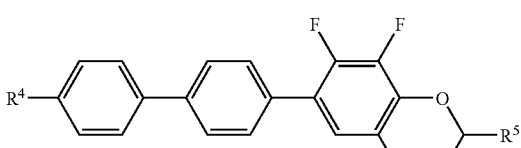

In the formulae, $R^4$ and $R^5$ are defined as above.

The compounds of component D are mainly used in liquid crystal compositions having a negative dielectric anisotropy. In the scope of the component D, a 2-ring compound represented by formula (6) mainly has an effect of adjusting the threshold voltage, adjusting the viscosity or adjusting the optical anisotropy. A 3-ring compound represented by formulae (7) or (8) mainly has an effect of raising the clearing point, broadening the temperature range of optically isotropic liquid crystal phase or increasing the optical anisotropy, etc. A compound represented by formulae (9) or (10) mainly has an effect of adjusting the driving voltage since it has a negatively large dielectric anisotropy.

In preparing a composition having a negative dielectric anisotropy, the content of the component D is preferably 40 wt % or higher, more preferably in the range of 50-95 wt %, relative to the total weight of the composition. In addition, by mixing the component D, the elastic constant can be controlled and the voltage-transmittance curve of the composition can be controlled. In a case where the component D is added into a composition having a positive dielectric anisotropy, the content of the component D is preferably 30 wt % or less relative to the total weight of the composition.

Suitable examples of the compounds represented by formulae (11), (12) and (13), i.e., component E, include formulae (11-1)-(11-11), formulae (12-1)-(12-18) and formulae (13-1)-(13-6).

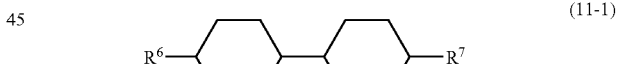

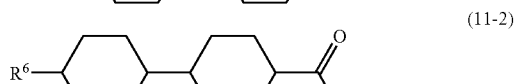

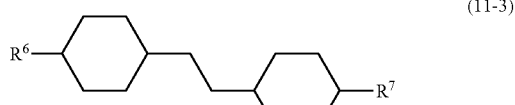

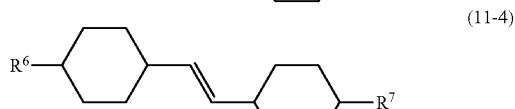

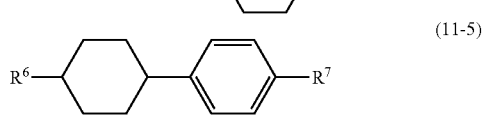

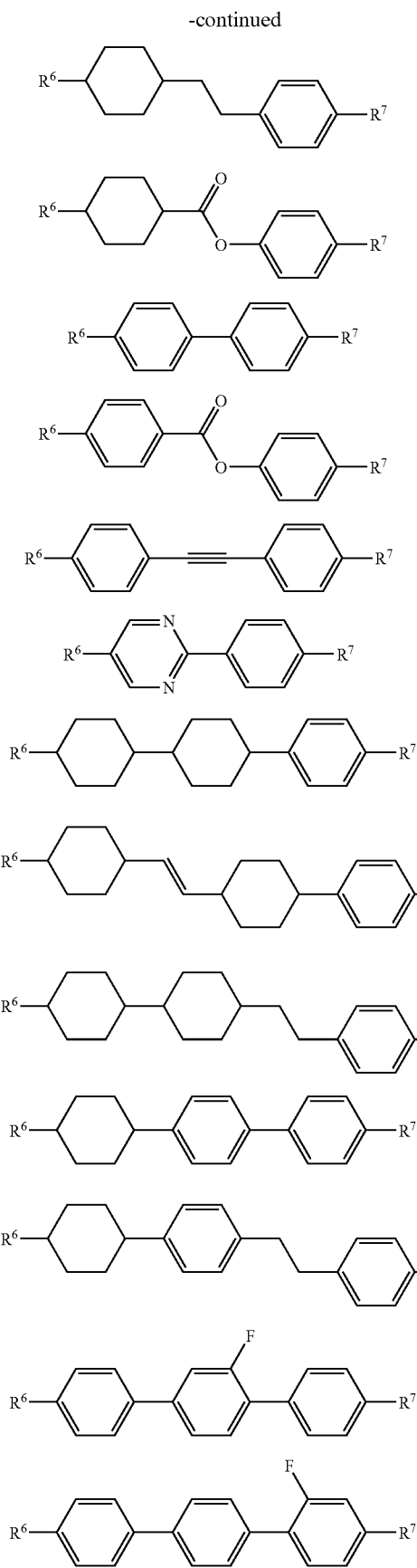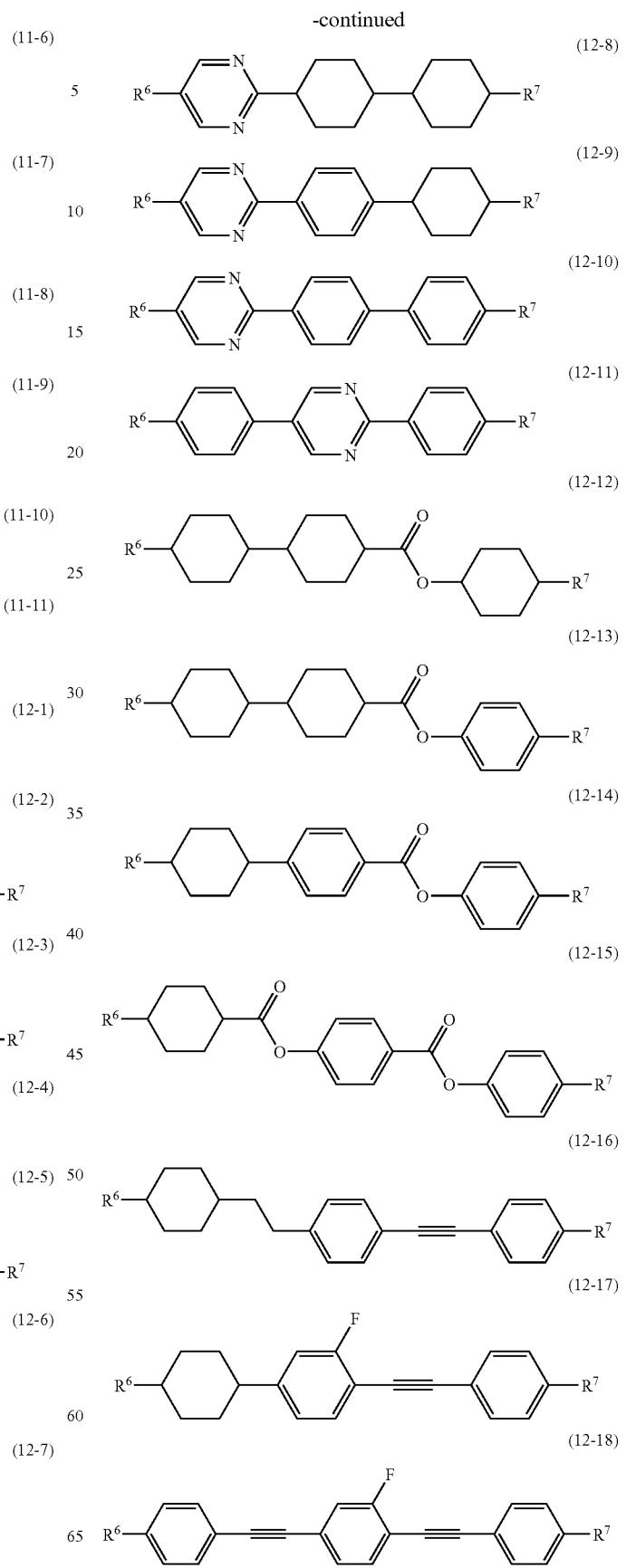

-continued

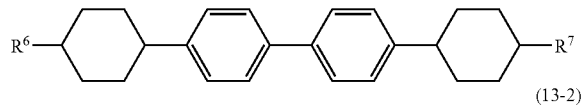
(13-1)

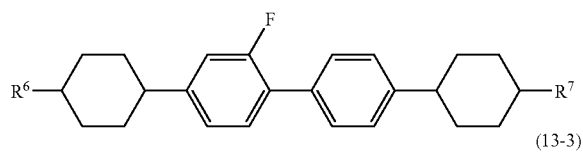
(13-2)

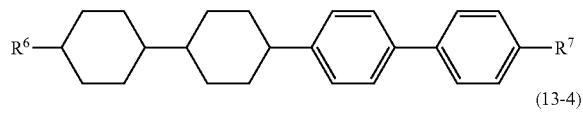
(13-3)

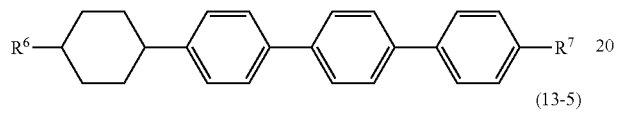
(13-4)

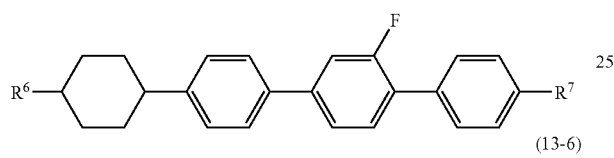
(13-5)

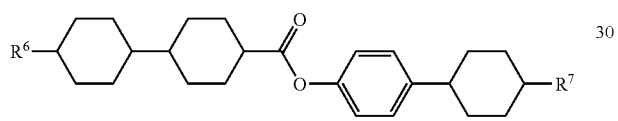
(13-6)

In the formulae, $R^6$ and $R^7$ are defined as above.

The compounds represented by formulae (11)-(13), i.e., component E, have a dielectric anisotropy with a small absolute value and are nearly neutral. A compound represented by formula (11) mainly has an effect of adjusting the viscosity or adjusting the optical anisotropy, and a compound represented by formula (12) or (13) has an effect of raising the clearing point and broadening the temperature range of optically isotropic liquid crystal phase, or an effect of adjusting the optical anisotropy.

As the content of the compound of the component E is increased, the driving voltage of the liquid crystal composition is increased and the viscosity is decreased. Therefore, it is desired to have a high content, so long as the desired value of the driving voltage of the liquid crystal composition can be obtained. In preparing a liquid crystal composition for TFTs, the content of the component E is preferably 60 wt % or less, more preferably 40 wt % or less, relative to the total weight of the composition. The liquid crystal composition of the invention preferably includes at least one compound represented by formula (1) in a ratio of 0.1-99 wt % to exhibit good properties.

The liquid crystal composition of the invention is typically prepared with a well-known method, for example, a method of dissolving the required components at high temperature.

3. Compounds (15)-(19)

A third aspect of the invention relates to a liquid crystal composition that is prepared by adding a component selected from the components F and G shown below in the component A.

Preferably, the component added in the component A is a mixture containing a component F including at least one compound selected from the group consisting of formula (15), (16), (17) and (18) or a component G including at least one compound selected from the group consisting of formula (19).

In addition, each component of the liquid crystal composition used in the invention may contains isotopes, since the isotopes do not much change the physical properties of the compound.

In the scope of the above component F, suitable examples of the compound represented by formula (15) include formulae (15-1)-(15-8), suitable examples of the compound represented by formula (16) include formulae (16-1)-(16-26), and suitable examples of the compound represented by formula (17) include formulae (17-1)-(17-52).

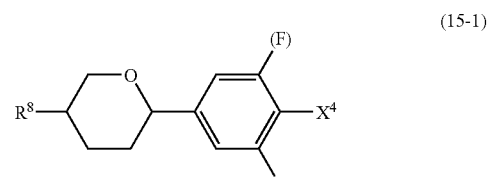
(15-1)

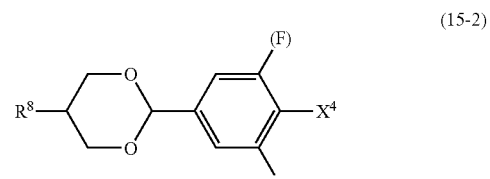
(15-2)

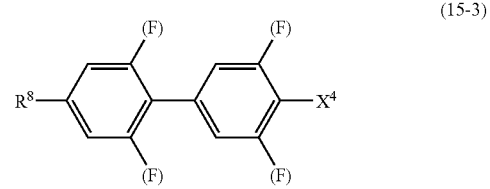
(15-3)

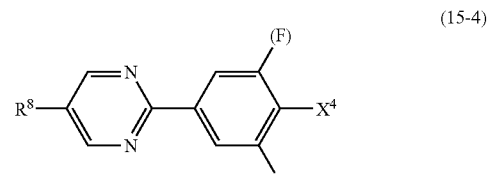
(15-4)

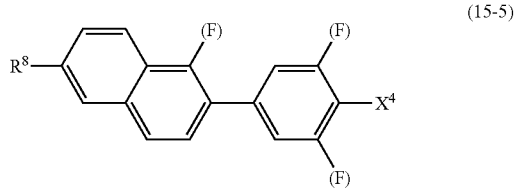
(15-5)

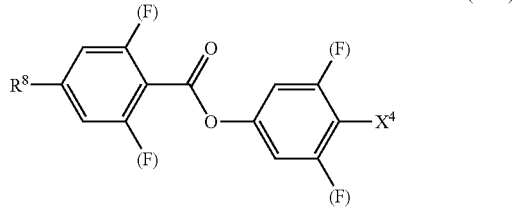
(15-6)

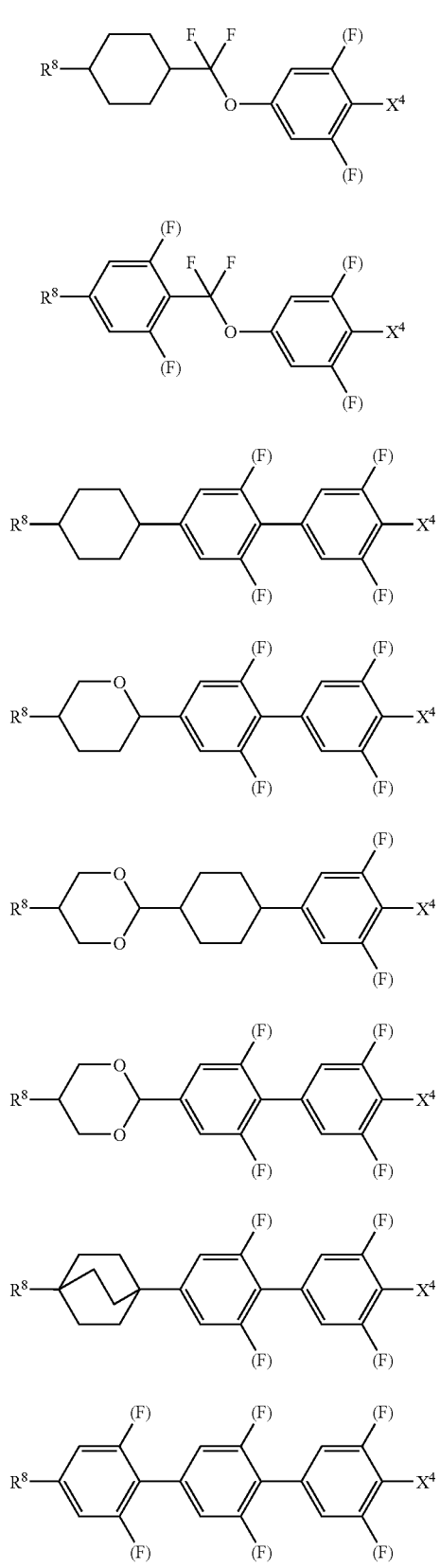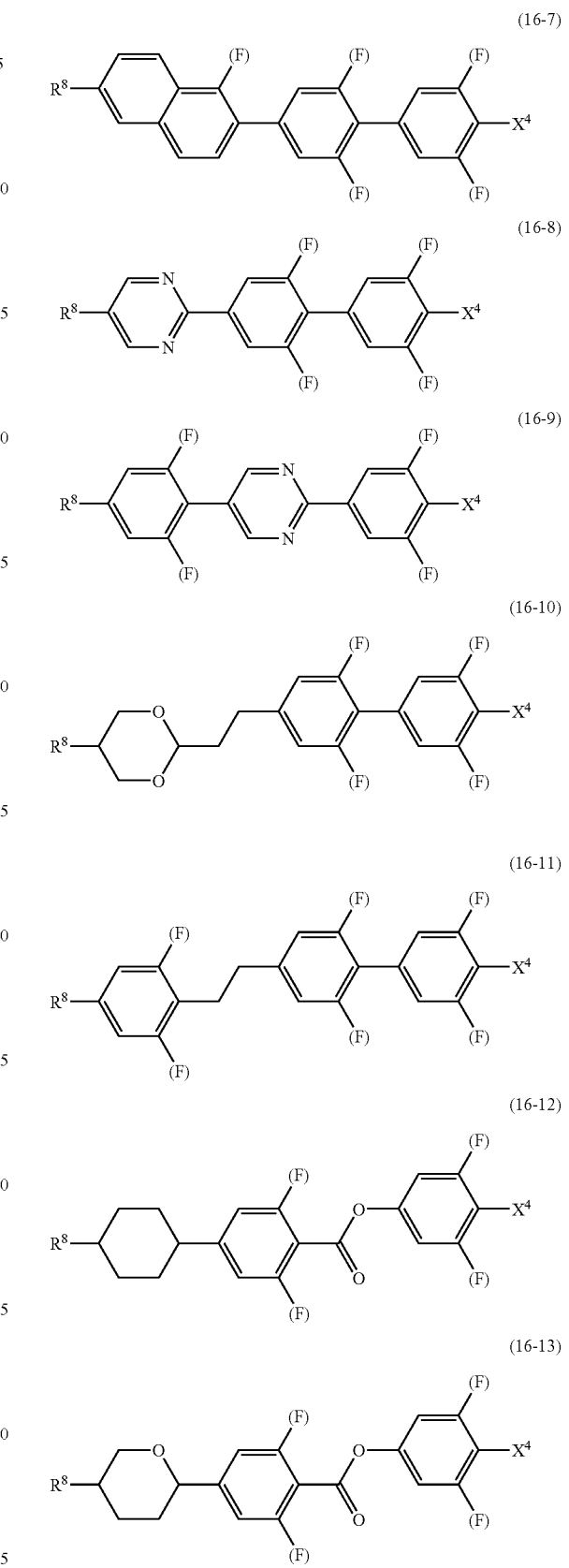

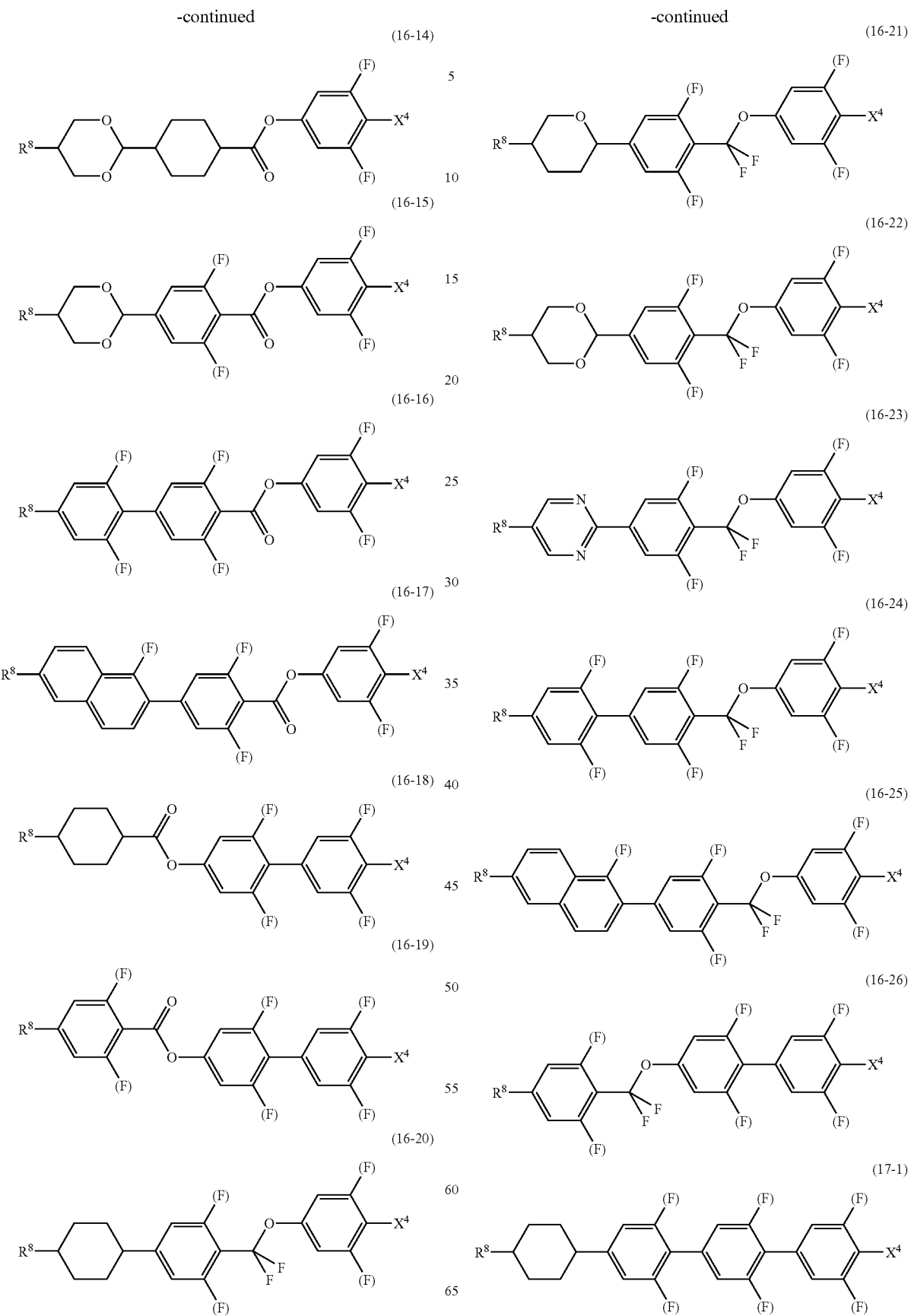

-continued
(17-2)
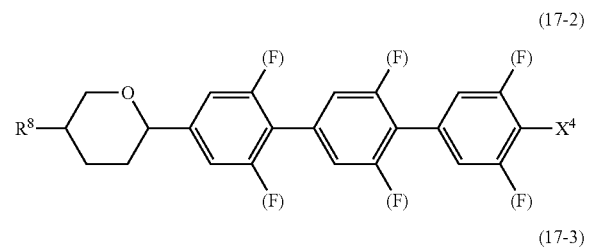
(17-3)
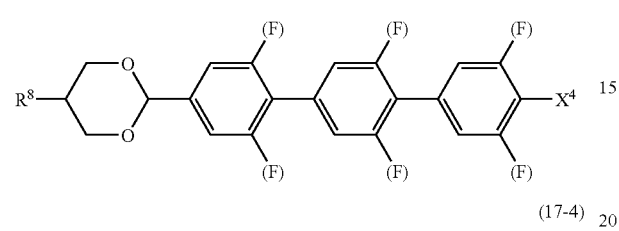
(17-4)
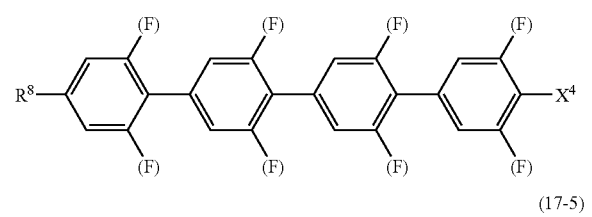
(17-5)
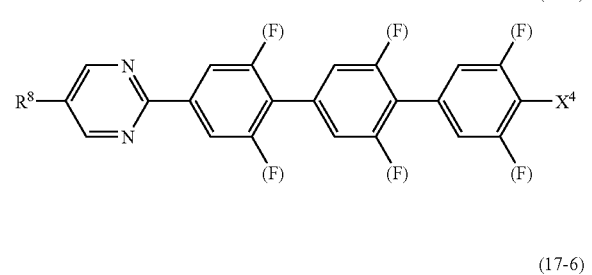
(17-6)
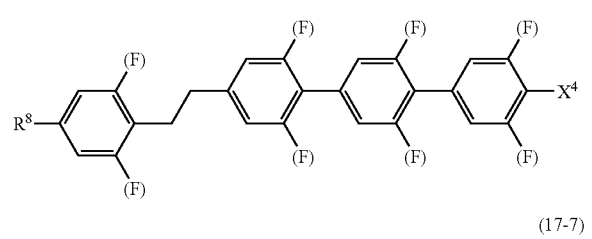
(17-7)
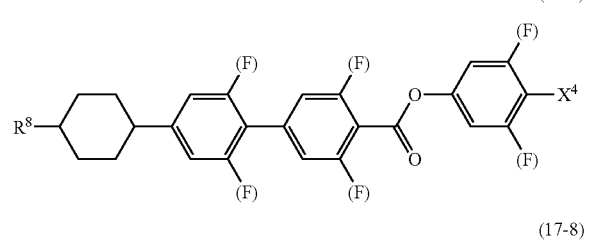
(17-8)
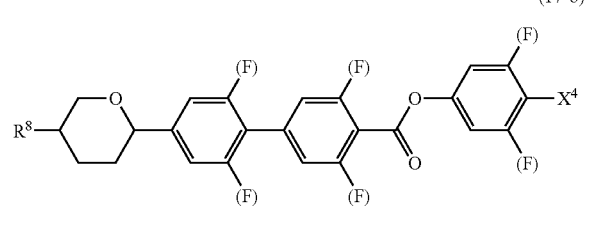
-continued
(17-9)
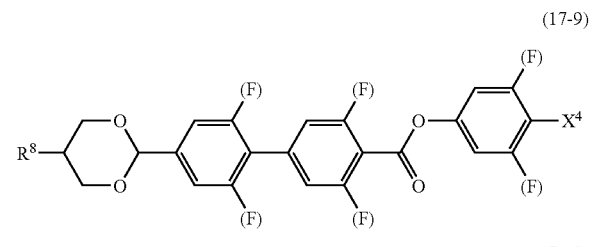
(17-10)
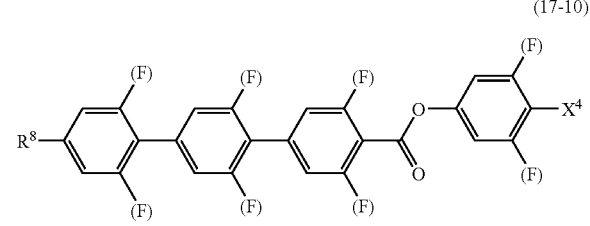
(17-11)
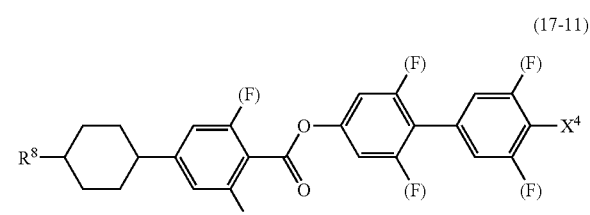
(17-12)
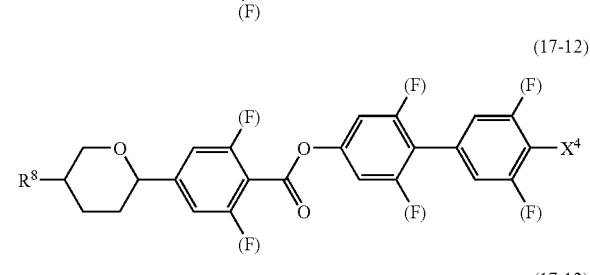
(17-13)
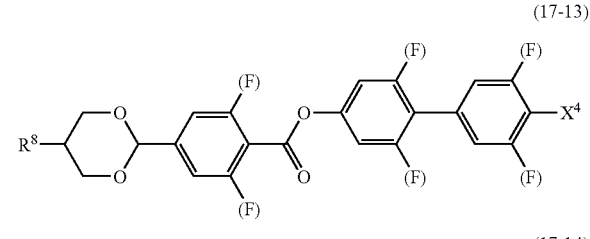
(17-14)
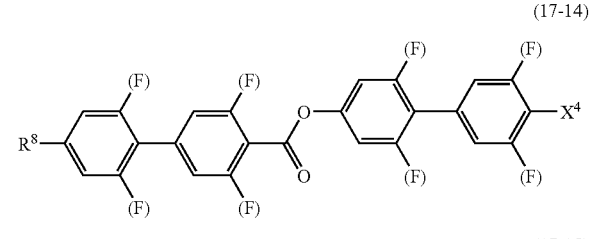
(17-15)
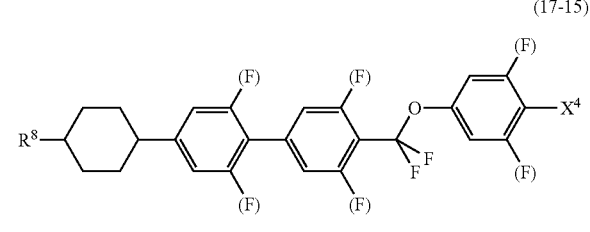

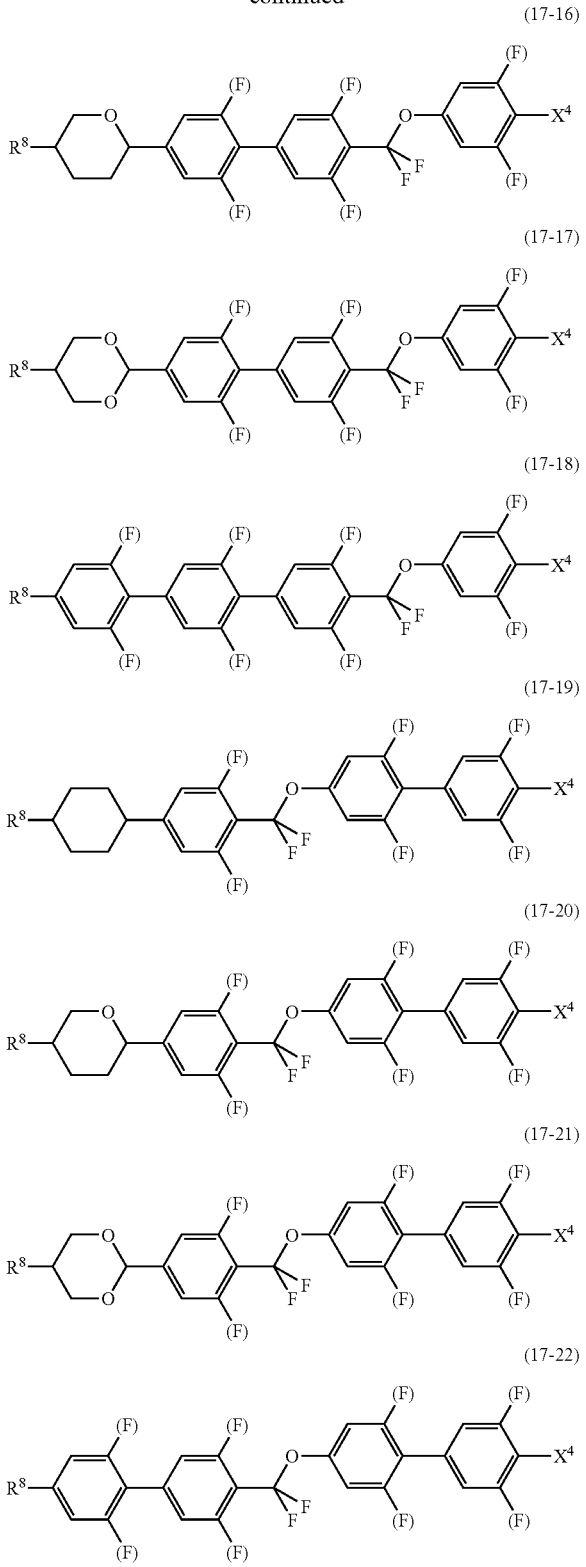

In the formulae, $R^8$ and $X^4$ are defined as above, and (F) denotes a hydrogen atom or a fluorine atom.

The compounds represented by formulae (15)-(18), i.e., component F, are useful in preparing a liquid crystal composition for active driving such as TFT driving, since they have a very large positive dielectric anisotropy and very good thermal or chemical stability. The content of the component F in the liquid crystal composition of the invention is suitably 1-99 wt %, preferably 10-97 wt % and more preferably 40-95 wt %, relative to the total weight of the liquid crystal composition. In addition, the viscosity can be adjusted by further including a compound represented by one of formulae (11)-(13), i.e., component E.

Suitable examples of the compound represented by formula (19), i.e., component G, include formulae (19-1)-(19-37).

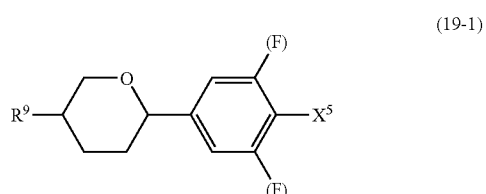
(19-1)

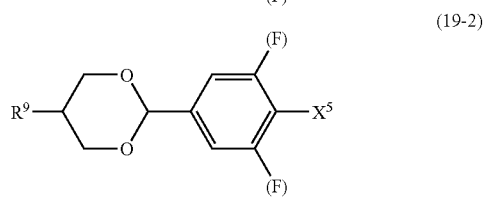
(19-2)

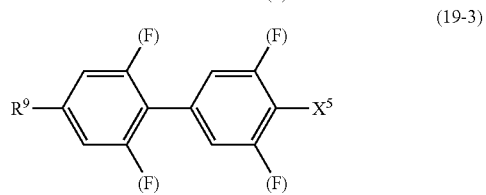
(19-3)

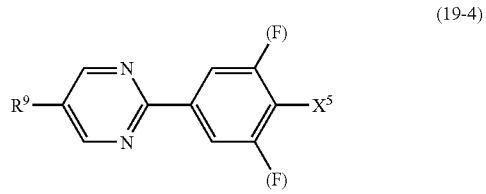
(19-4)

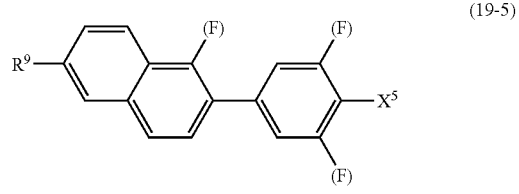
(19-5)

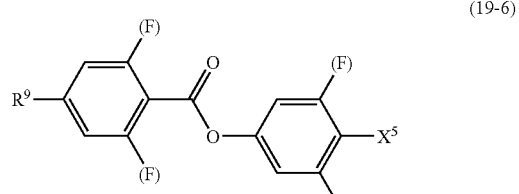
(19-6)

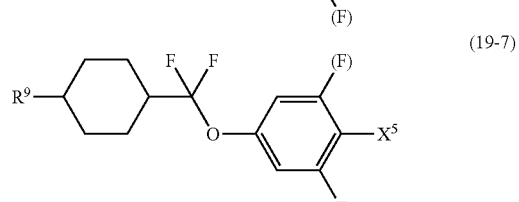
(19-7)

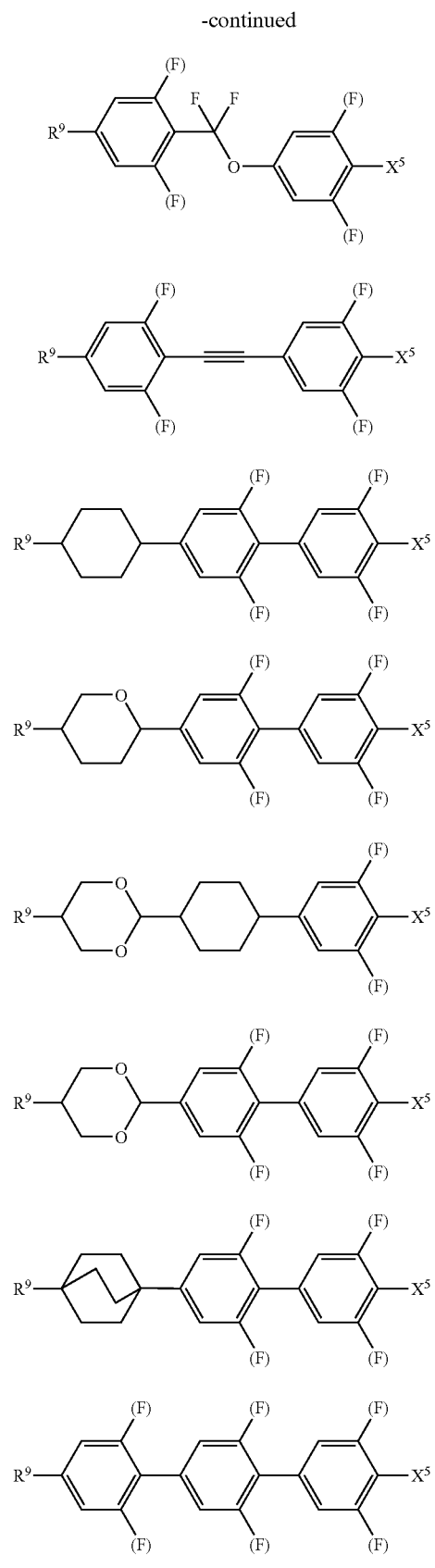
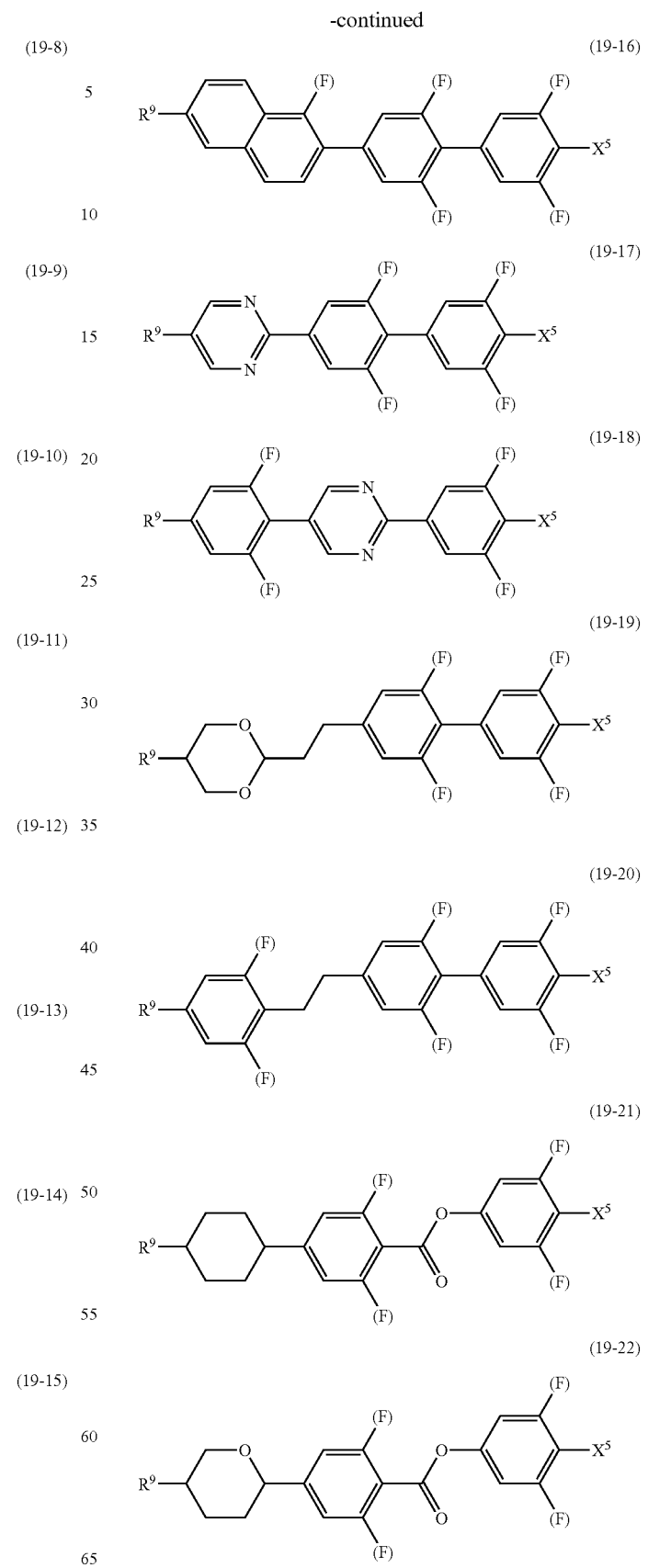

-continued
(19-23)
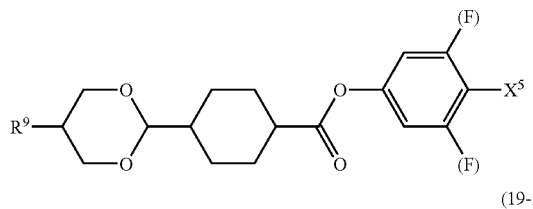
(19-24)
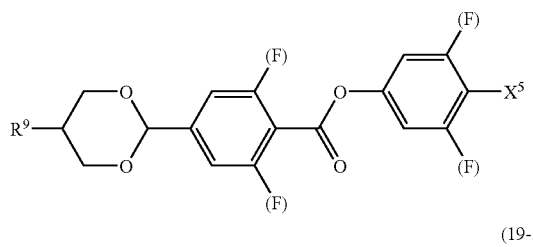
(19-25)
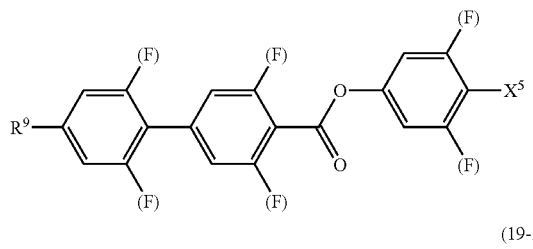
(19-26)
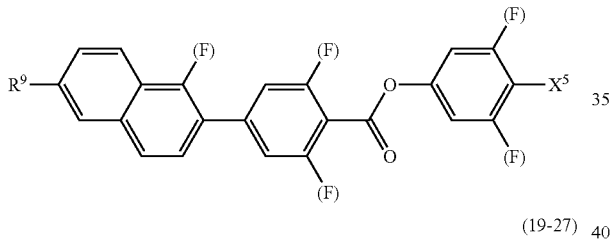
(19-27)
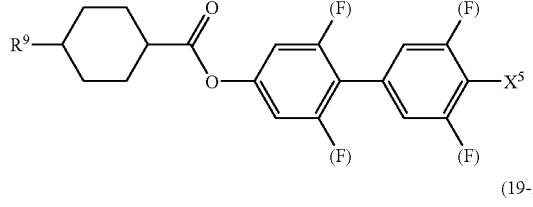
(19-28)
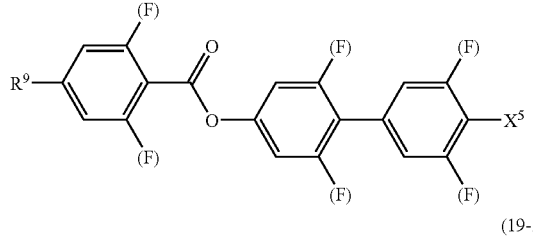
(19-29)
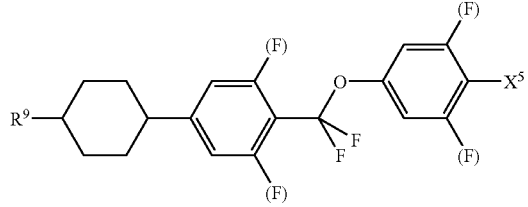
-continued
(19-30)
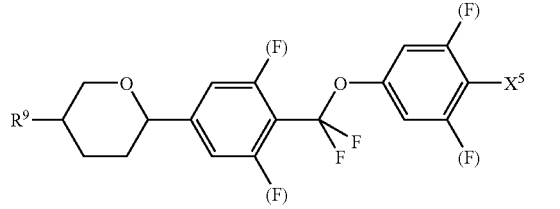
(19-31)
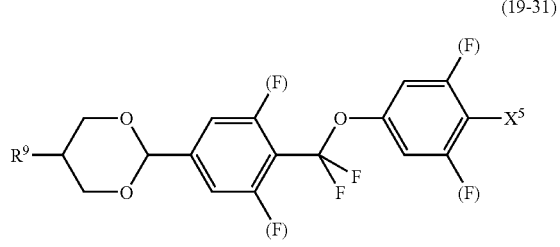
(19-32)
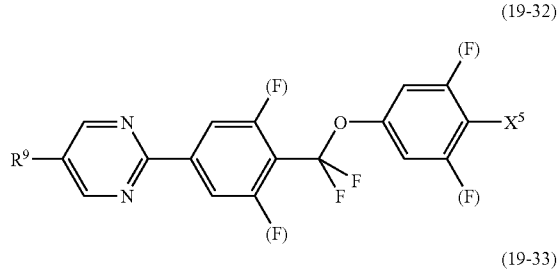
(19-33)
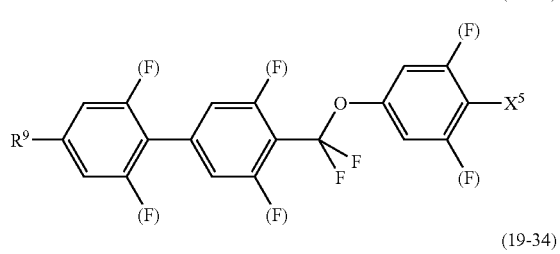
(19-34)
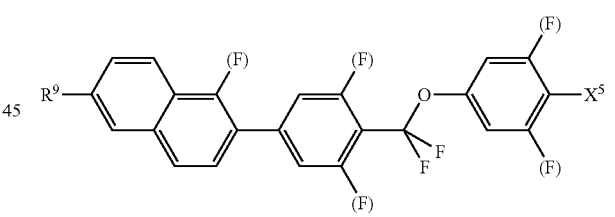
(19-35)
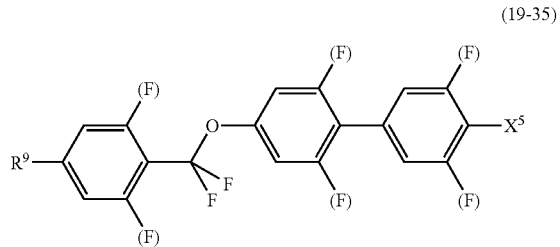
(19-36)

-continued

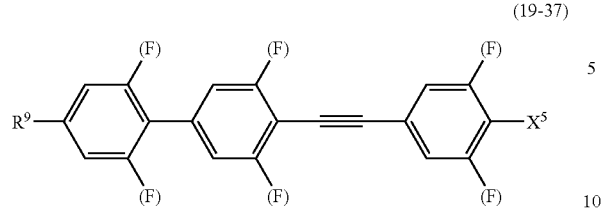
(19-37)

In these formulae, $R^9$ and $X^5$ are defined as above.

The compounds represented by formula (19), i.e., component G, have a very large positive dielectric anisotropy, and are therefore mainly used to reduce the driving voltage of devices driven in an optically isotropic liquid crystal phase, PDLCD (Polymer Dispersed LCD), PNLCD (Polymer Network LCD), PSCLCD (Polymer Stabilized Cholesteric LCD) and so on. The driving voltage of the composition can be reduced by including the component G. In addition, the compounds can be used to adjust the viscosity, to adjust the optical anisotropy and to broaden the temperature range of liquid crystal phase. Further, the compounds can also be used to reduce the steepness of the light transmittance-voltage curve.

The content of the component G is preferably in the range of 0.1-99.9 wt %, more preferably in the range of 10-97 wt % and even more preferably in the range of 40-95 wt %, relative to the total weight of the composition.

4. Composition Having an Optically Isotropic Liquid Crystal Phase 4-1. Components of a Composition Having an Optically Isotropic Liquid Crystal Phase A fourth aspect of the invention relates to a composition including a compound of formula (1) and a chiral dopant, which may be used as a liquid crystal composition in an optical device driven in an optically isotropic liquid crystal phase. The liquid crystal composition exhibits an optically isotropic liquid crystal phase. The chiral dopant is preferably present in an amount of 1-40 wt %, more preferably 3-25 wt % and even most preferably 5-15 wt %, relative to the total weight of the liquid crystal composition. A liquid crystal composition including the chiral dopant in such a range is preferred due to the ease of having an optically isotropic liquid crystal phase. There may be a single chiral dopant, or two or more chiral dopants, contained in the liquid crystal composition.

4-2. Chiral Dopant

The chiral dopant included in the optically isotropic liquid crystal composition is preferably a compound having a large helical twisting power. With such a chiral dopant, the dosage required for obtaining a desired pitch is reduced preventing raise of the driving voltage, which is advantageous in practice. Specifically, the compounds respectively represented by formulae (K1)-(K5) are preferred.

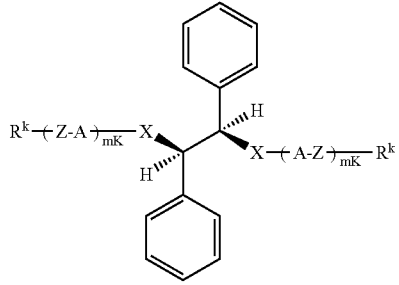
(K1)

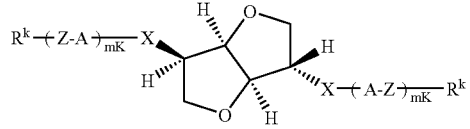
(K2)

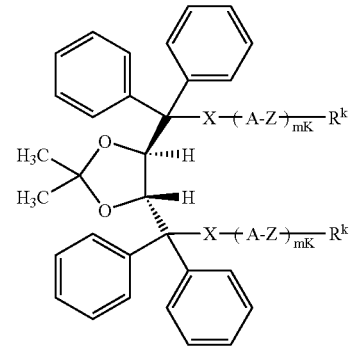
(K3)

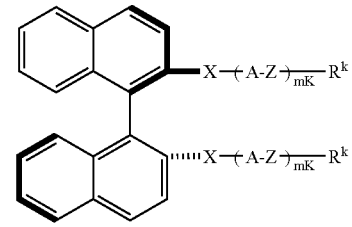
(K4)

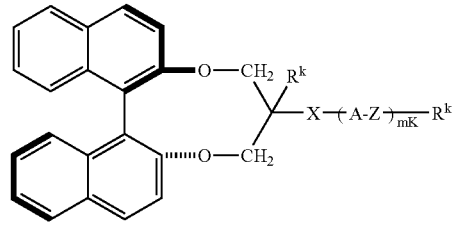
(K5)

In formulae (K1)-(K5), each $R^K$ is independently a hydrogen atom, a halogen atom, —C≡N, —N═C═O, —N═C═S, or $C_1$-$C_{20}$ alkyl wherein arbitrary —$CH_2$— may be replaced by —O—, —S—, —COO—, —OCO—, —CH═CH—, —CF═CF— or —C≡C— and arbitrary hydrogen atom may be replaced by a halogen atom. Each A is independently an aromatic or non-aromatic 3- or 8-membered ring, or a fused ring of 9 or more carbon atoms, wherein arbitrary hydrogen atom may be replaced by a halogen atom, or alkyl or haloalkyl of 1-3 carbon atoms, —$CH_2$— may be replaced by —O—, —S— or —NH—, and —CH═ may be replaced by —N═. Each Z is independently a single bond, or $C_1$-$C_8$ alkylene wherein arbitrary —$CH_2$— may be replaced by —O—, —S—, —COO—, —OCO—, —CSO—, —OCS—, —N=N—, —CH=N—, —N=CH—, —CH=CH—, —CF=CF— or —C≡C— and arbitrary hydrogen atom may be replaced by a halogen atom. X is a single bond, —COO—, —OCO—, —CH₂O—, —OCH₂—, —CF₂O—, —OCF₂— or —CH₂CH₂—, and mK is 1-4.
In the scope of these compounds, formulae (K2-1)-(K2-8) in the scope of formula (K2) and formulae (K5-1)-(K5-3) in the scope of formula (K5) are preferred as the chiral dopant to be added in the liquid crystal composition.
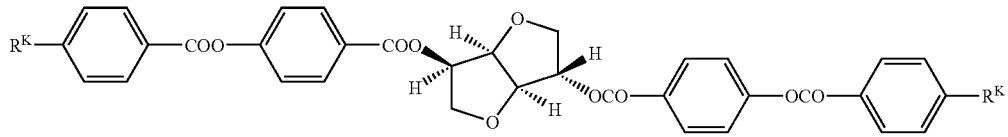
(K2-1)
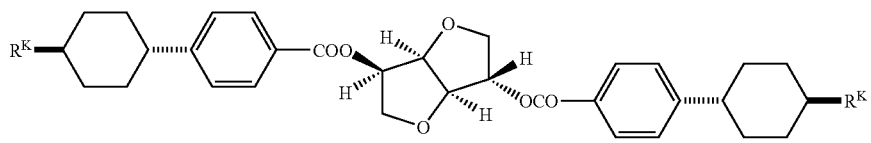
(K2-2)
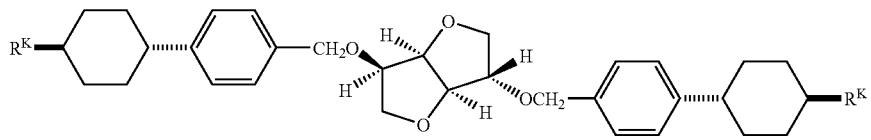
(K2-3)
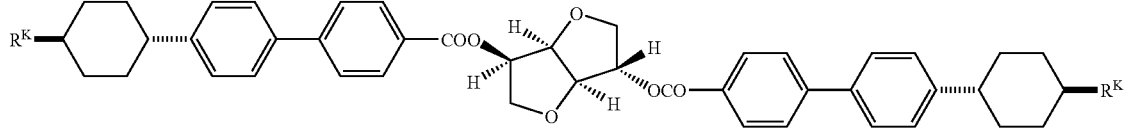
(K2-4)
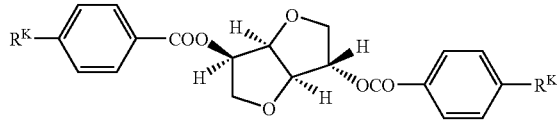
(K2-5)
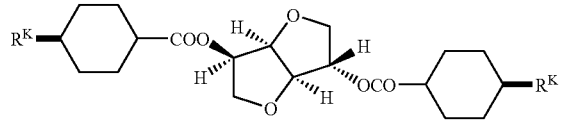
(K2-6)
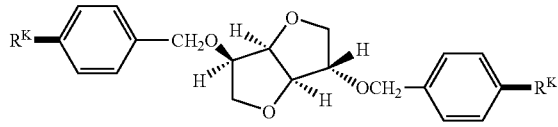
(K2-7)
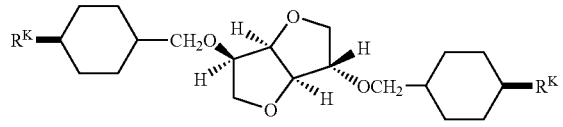
(K2-8)
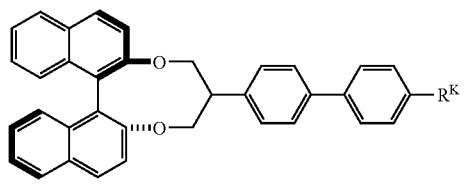
(K5-1)
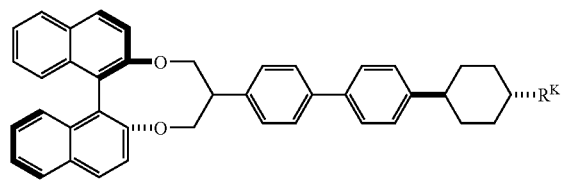
(K5-2)

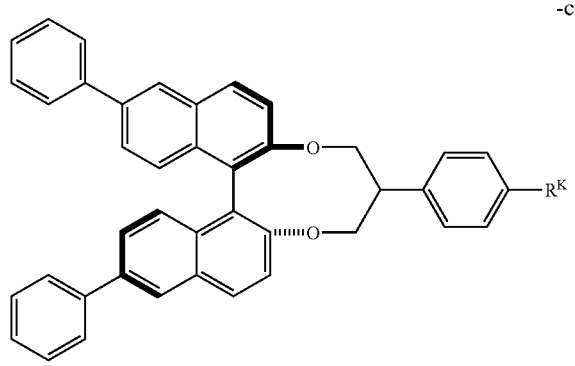
(K5-3)

In these formulae, each $R^K$ is independently $C_3$-$C_{10}$ alkyl wherein the —$CH_2$— directly bonded to the ring may be replaced by —O— and arbitrary —$CH_2$— may be replaced by —CH=CH—.

4-3. Optically Isotropic Liquid Crystal Phase

"A liquid crystal composition has optical isotropy" means that the liquid crystal composition shows optical isotropic nature as the liquid crystal molecule arrangement is macroscopically isotropic, while microscopic liquid crystal order is present. The pitch corresponding to the microscopic liquid crystal order of the composition (often abbreviated to "pitch", hereafter) is preferably 700 nm or less, more preferably 500 nm or less and even more preferably 350 nm or less.

Here, the so-called "isotropic phase" refers to a commonly defined isotropic phase (i.e., disorder phase), that is, a phase which exhibits isotropy due to fluctuation even if a region with a local order parameter not equal to zero is formed. For example, an isotropic phase exhibited at the high temperature side of a nematic phase is equivalent to a non-liquid crystal isotropic phase in the present specification. The same definition also applies for a chiral liquid crystal in the present specification. Also, in the present specification, the so-called "optically isotropic liquid crystal phase" denotes a phase exhibiting optically isotropy without fluctuation, one example of which is a phase exhibiting platelet structure, i.e., a blue phase in a narrow sense.

In the optically isotropic liquid crystal composition of the invention, there is an optically isotropic liquid crystal phase, but a typical platelet structure in a blue phase is not observed by a polarizing microscope. Accordingly, in the present specification, a phase exhibiting a platelet structure refers to a blue phase, and an optically isotropic liquid crystal phase including a blue phase refers to an optically isotropic liquid crystal phase. That is, the blue phase is included in the optically isotropic liquid crystal phase.

Generally, blue phases may be classified into three types, blue phase I, blue phase II and blue phase III, which are all optically active and isotropic. In a blue phase I or II, two or more colors of diffracted light produced by Bragg reflection from various lattice planes are observed. The blue phase is typically observed between the isotropic phase and the chiral nematic phase. "The optically isotropic liquid crystal phase does not exhibit two or more colors of diffracted light" means that a platelet structure observed in a blue phase I or II is not observed and the phase approximately exhibits a single color in the entire plane. For an optically isotropic liquid crystal phase not exhibiting two or more colors of diffracted light, brightness/darkness of the color is not necessarily even in the plane.

An optically isotropic liquid crystal phase not exhibiting two or more colors of diffracted light has an advantage of restraining the intensity of the reflected light caused by Bragg reflection or shifting toward the short wavelength side. In addition, when a liquid crystal material reflecting visible light is used in a display device, sometimes a color variation problem may occur. However, for s liquid crystal not exhibiting two or more colors of diffracted light, the reflection of visible light may be eliminated in the pitch larger than that in a blue phase in a narrow sense (a phase exhibiting a platelet structure), as a result of reflection wavelength shift toward the short wavelength side.

The optically isotropic liquid crystal composition of the invention may be obtained by adding a chiral dopant into a composition having a nematic phase, wherein the chiral dopant is preferably added in an amount such that the pitch is 700 nm or less. In addition, the composition having a nematic phase includes a compound represented by formula (1) and other necessary components. In addition, the optically isotropic liquid crystal composition of the invention may alternatively be obtained by adding a chiral dopant in a composition having a chiral nematic phase but no optically isotropic liquid crystal phase. The composition having a chiral nematic phase but no optically isotropic liquid crystal phase includes a compound represented by formula (1), an optically active compound and other necessary components, wherein the optically active compound is preferably added in an amount such that the pitch is 700 nm or more to exhibit the optically isotropic liquid crystal phase. The optically active compounds to be added may be the above compounds with large helical twisting power, i.e., those represented by formulae (K1)-(K5), (K2-1)-(K2-8) and (K5-1)-(K5-3) respectively. In addition, the optically active compound added may not have a large helical twisting power. Such compounds include, e.g., the compounds added in a liquid crystal composition used in a device driven in a nematic phase (TN mode or STN mode, etc.).

Examples of the optically active compounds having no large helical twisting power include the following optically active compounds (Op-1)-(Op-13).

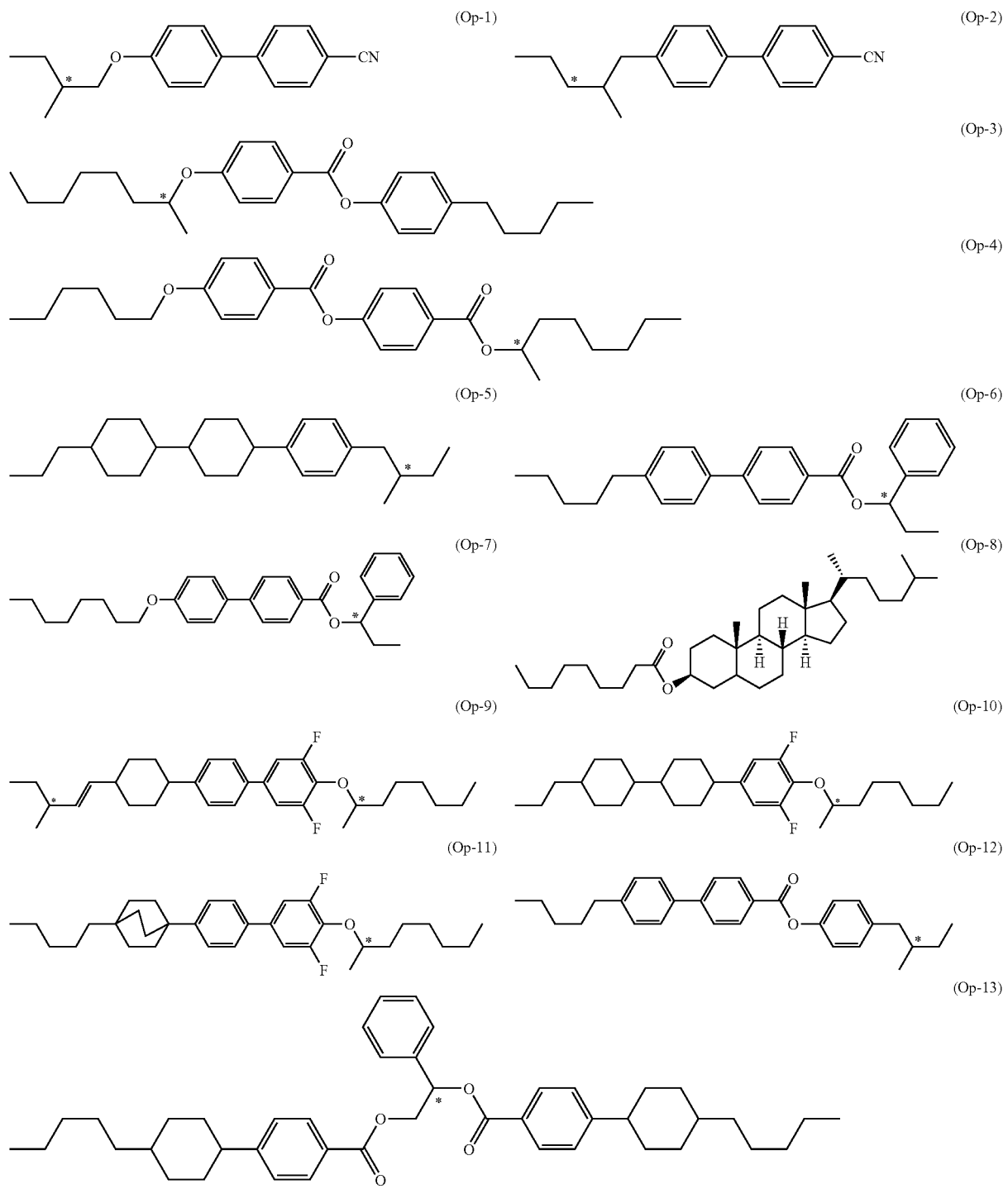

In addition, the temperature range of the optically isotropic liquid crystal composition of the invention may be broadened by adding a chiral dopant into a liquid crystal composition that has a wide coexistence temperature range of a nematic or chiral nematic phase and an isotropic phase for exhibiting an optically isotropic liquid crystal phase. For example, a composition having an optically isotropic liquid crystal phase in a wide temperature range may be prepared as follows. A liquid crystal compound having a high clearing point is mixed with a liquid crystal compound having a low clearing point, so as to prepare a liquid crystal composition with a wide coexistence temperature range of a nematic phase and an isotropic phase. A chiral dopant is then added in the liquid crystal composition prepared.

For a liquid crystal composition with a wide coexistence temperature range of a nematic or chiral nematic phase and an isotropic phase, the difference between the upper-limit temperature and the lower-limit temperature of the coexistence of the chiral nematic phase and the isotropic phase is preferably 3-150° C., more preferably 5-150° C. Further, the liquid crystal composition preferably has a difference of 3-150° C. between the upper-limit temperature and the lower-limit temperature of the coexistence of the nematic phase and the isotropic phase.

If an electric field is applied to the liquid crystal medium of the invention in an optically isotropic liquid crystal phase, an electric-birefringence is produced but a Kerr effect is not necessarily produced. Because the greater the pitch is, the larger the electric birefringence of the optically isotropic liquid crystal phase is, as a result, the electric birefringence may be increased by adjusting the species and content of the chiral dopant to make a larger pitch, so long as the requirements on other optical properties, such as transmittance, diffraction wavelength and so on, are satisfied.

4-4. Other Components

Other compounds, such as a polymer material, may be further added in the optically isotropic liquid crystal composition of the invention, so long as they do not affect the properties of the composition. In addition to the polymer material, the liquid crystal composition of the invention may also include, for example, a dichroic dye or a photochromic compound. Examples of the dichroic dye are merocyanine dyes, styryl dyes, azo dyes, azomethine dyes, azoxy dyes, quinophthalone dyes, anthraquinone dyes and tetrazine dyes, etc.

5. Optically Isotropic Polymer/Liquid Crystal Composite

A fifth aspect of the invention relates to a liquid crystal composition/polymer composite material including a compound represented by formula (1) and a chiral dopant, which exhibits optical isotropy. The polymer/liquid crystal composite is an optically isotropic polymer/liquid crystal composite that can be used in an optical device driven in an optically isotropic liquid crystal phase. Such a polymer/liquid crystal composite may include a polymer and, for example, the liquid crystal composition (B) described in the $1^{st}$ to $31^{st}$ items described above. The polymer/liquid crystal composite of the invention has no particular limitation, so long as it includes both a liquid crystal material and a polymeric compound, in which the polymer is partly or fully dissolved in the liquid crystal material or is separated from the liquid crystal material. In addition, in the present specification, a nematic phase excludes a chiral nematic phase and refers to a nematic phase in a narrow sense, unless specifically indicated.

The optically isotropic polymer/liquid crystal composite according to a preferred aspect of the invention can exhibit an optically isotropic liquid crystal phase in a wide temperature range. In addition, the polymer/liquid crystal composite according to a preferred aspect of the invention has a very high response speed. Based on such effects, the polymer/liquid crystal composite according to a preferred aspect of the invention is useful in an optical device such as a display device, etc.

5-2. Polymer

The composite material of the invention can be prepared by mixing an optically isotropic liquid crystal composition with a pre-polymerized polymer, and preferably by mixing a low-molecular weight monomer, macromonomer or oligomer, etc. (generally referred to as "monomers", hereinafter) as a polymer material with a liquid crystal composition B, followed by polymerization of the mixture. In the present specification, the mixture including monomers and a liquid crystal composition is called a "polymerizable monomer/liquid crystal mixture". A polymerizable monomer/liquid crystal mixture may optionally include a polymerization initiator, a curing agent, a catalyst, a stabilizer and a dichroic dye or photochromic compound, etc., so long as the effects of the invention are not affected. For example, the polymerizable monomer/liquid crystal mixture may optionally comprise 0.1-20 parts by weight of a polymerization initiator relative to 100 parts by weight of the polymerizable monomers.

The polymerization temperature is preferably a temperature at which the polymer/liquid crystal composite exhibits high transparency and isotropy, more preferably a temperature at which the mixture of the monomers and the liquid crystal material exhibits an isotropic phase or a blue phase, and the polymerization is done in the isotropic phase or optically isotropic liquid crystal phase. That is, the polymerization temperature is preferably a temperature at which the polymerized polymer/liquid crystal composite does not substantially scatter the light at the long wavelength side of visible light and exhibits optical isotropy.

The starting material of the polymer in the composite material of the invention may be a low-molecular weight monomer, macromonomer or oligomer, for example. In the present specification, the scope of the monomer as a starting material of polymer is intended to include low-molecular weight monomers, macromonomers and oligomers, etc. In addition, the polymer obtained preferably has a three-dimensional crosslinked structure. Accordingly, the monomer as a starting material of polymer preferably uses a polyfunctional monomer with two or more polymerizable functional groups. The polymerizable functional groups are not particularly limited, and may be, for example, acryl, methacryl, glycidyl, epoxy, oxetanyl or vinyl, etc., wherein acryl and methacryl are preferred in terms of the polymerizing rate. The monomer as a starting material of polymer preferably includes 10 wt % or more of a monomer having two or more polymerizable functional groups, so that the composite material of the invention easily exhibits high transparency and isotropy. In addition, to obtain a suitable composite material, the polymer preferably has mesogenic moieties, and the monomers as starting materials of polymer may partially or entirely have a mesogenic moiety.

5-2-1 Mono-Functional or Di-Functional Monomer Having a Mesogenic Moiety

The mono-functional or di-functional monomer having a mesogenic moiety is not particularly limited in its structure, and may be, for example, the compounds represented by formula (M1) or formula (M2) below.

 (M1)

 (M2)

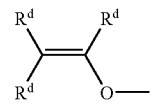 (M3-1)

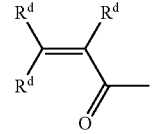 (M3-2)

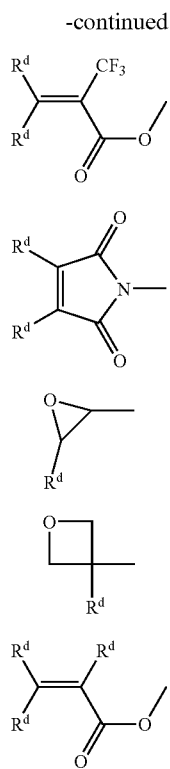

In formula (M1), $R^a$ is a hydrogen atom, a halogen atom, —C≡N, —N=C=O, —N=C=S, or $C_1$-$C_{20}$ alkyl wherein arbitrary —$CH_2$— may be replaced by —O—, —S—, —CO—, —COO—, —OCO—, —CH=CH—, —CF=CF— or —C≡C— and arbitrary hydrogen atom may be replaced by a halogen atom or —C≡N. $R^b$ is a polymerizable group selected from formulae (M3-1)-(M3-7).

Preferred examples of $R^a$ include a hydrogen atom, halogen atom, —C≡N, —$CF_3$, $CF_2H$, —$CFH_2$, —$OCF_3$, —$OCF_2H$, $C_1$-$C_{20}$ alkyl, $C_1$-$C_{19}$ alkoxy, $C_2$-$C_{21}$ alkenyl and $C_2$-$C_{21}$ alkynyl. Particularly preferred examples include —C≡N, $C_1$-$C_{20}$ alkyl and $C_1$-$C_{19}$ alkoxy.

In formula (M2), each $R^b$ is independently a polymerizable group of formulae (M3-1)-(M3-7).

Here, each $R^d$ in the formulae (M3-1)-(M3-7) is independently a hydrogen atom, halogen atom, or $C_1$-$C_5$ alkyl wherein arbitrary hydrogen atom may be replaced by a halogen atom. Preferred examples of $R^d$ include a hydrogen atom, a halogen atom and methyl. Particularly preferred examples of $R^d$ include a hydrogen atom, a fluorine atom and methyl. In addition, the formula (M3-2), (M3-3), (M3-4) or (M3-7) is preferably synthesized through free radical polymerization. The formula (M3-1), (M3-5) or (M3-6) is preferably synthesized through cationic polymerization. The aforementioned polymerization reactions are living polymerization reactions, and thus the production of a small amount of free radical or active cationic species in the reaction system can initiate the polymerization. In order to accelerate formation of the active species, a polymerization initiator may be used. For this purpose, for example, light or heat may be utilized.

In formulae (M1) and (M2), each $A^M$ is independently an aromatic or non-aromatic 5-, or 6-membered ring, or a fused ring of 9 or more carbon atoms, wherein —$CH_2$— may be replaced by —O—, —S—, —NH— or —$NCH_3$—, —CH= may be replaced by —N=, and arbitrary hydrogen atom may be replaced by a halogen atom, or $C_1$-$C_5$ alkyl or $C_1$-$C_5$ haloalkyl. Preferred examples of $A^M$ include 1,4-cyclohexylene, 1,4-cyclohexenylene, 1,4-phenylene, naphthalen-2,6-diyl, tetrahydronaphthalen-2,6-diyl, fluoren-2,7-diyl and bicyclo[2.2.2]octan-1,4-diyl, wherein arbitrary —$CH_2$— may be replaced by —O—, arbitrary —CH= may be replaced by —N=, and arbitrary hydrogen atom may be replaced by a halogen atom, $C_1$-$C_5$ alkyl or $C_1$-$C_5$ haloalkyl. In consideration of the stability of the compounds, —$CH_2$—O—$CH_2$—O— with the oxygen atoms being not adjacent to one another is preferred to —$CH_2$—O—O—$CH_2$— with the oxygen atoms being adjacent to one another. This is also true for sulphur.

Particularly preferred examples of $A^M$ include 1,4-cyclohexylene, 1,4-cyclohexenylene, 1,4-phenylene, 2-fluoro-1,4-phenylene, 2,3-difluoro-1,4-phenylene, 2,5-difluoro-1,4-phenylene, 2,6-difluoro-1,4-phenylene, 2-methyl-1,4-phenylene, 2-trifluoromethyl-1,4-phenylene, 2,3-bis(trifluoromethyl)-1,4-phenylene, naphthalen-2,6-diyl, tetrahydronaphthalen-2,6-diyl, fluoren-2,7-diyl, 9-methyl fluoren-2,7-diyl, 1,3-dioxan-2,5-diyl, pyridin-2,5-diyl and pyrimidin-2,5-diyl. Furthermore, the steric configuration of the above 1,4-cyclohexylene and 1,3-dioxan-2,5-diyl is preferably in the trans-form rather than in the cis-form. As 2-fluoro-1,4-phenylene is identical to 3-fluoro-1,4-phenylene in the structure, the latter is not exemplified. This also applies for 2,5-difluoro-1,4-phenylene and 3,6-difluoro-1,4-phenylene, etc.

In formulae (M1) and (M2), each Y is independently a single bond or $C_1$-$C_{20}$ alkylene wherein arbitrary —$CH_2$— may be replaced by —O—, —S—, —CH=CH—, —C≡C—, —COO— or —OCO—. Preferred examples of Y include a single bond, —$(CH_2)_{m2}$—, —$O(CH_2)_{m2}$— and —$(CH_2)_{m2}O$— (m2 is an integer of 1-20). Particularly preferred examples of Y include a single bond, —$(CH_2)_{m2}$—, —$O(CH_2)_{m2}$— and —$(CH_2)_{m2}O$— (m2 is an integer of 1-10). In consideration of the stability of the compound, those —Y—$R^a$ and —Y—$R^b$ groups having no —O—O—, —O—S—, —S—O— or —S—S are preferred.

In formulae (M1) and (M2), each $Z^M$ is independently a single bond, —$(CH_2)_{m3}$—, —$O(CH_2)_{m3}$—, —$(CH_2)_{m3}O$—, —$O(CH_2)_{m3}O$—, —CH=CH—, —C≡C—, —COO—, —OCO—, —$(CF_2)_2$—, —$(CH_2)_2$—COO—, —OCO—$(CH_2)_2$—, —CH=CH—COO—, —OCO—CH=CH—, —C≡C—COO—, —OCO—C≡C—, —CH=CH—$(CH_2)_2$—, —$(CH_2)_2$—CH=CH—, —CF=CF—, —C≡C—CH=CH—, —CH=CH—C≡C—, —$OCF_2$—$(CH_2)_2$—, —$(CH_2)_2$—$CF_2O$—, —$OCF_2$— or —$CF_2O$— (m3 is an integer of 1-20).

Preferred examples of $Z^M$ include a single bond, —$(CH_2)_{m3}$—, —$O(CH_2)_{m3}$—, —$(CH_2)_{m3}O$—, —CH=CH—, —C≡C—, —COO—, —OCO—, —$(CH_2)_2$—COO—, —OCO—$(CH_2)_2$—, —CH=CH—COO—, —OCO—CH=CH—, —$OCF_2$— and —$CF_2O$—.

In formulae (M1) and (M2), m1 is an integer of 1-6. Preferred m1 is an integer from 1-3. When m1 is 1, the compound is a 2-ring compound with two 6-membered rings. When m1 is 2 or 3, the compound is a 3-ring or 4-ring compound. For example, when m1 is 1, the two $A^M$ may be the same or different. In addition, for example, when m1 is 2, the three $A^M$ (or two $Z^M$) may be the same or different. The same definition also applies for a case where m1 is an integer of 3-6. This also applies for $R^a$, $R^b$, $R^d$, $Z^M$, $A^M$ and Y.

The compounds of formula (M1) and (M2) may contain isotopes, such as $^2H$ (deuterium) and $^{13}C$, in an amount higher than the natural abundance, since the isotopes do not much affect the properties of the compound.

More preferred examples of the compounds (M1) and (M2) include the compounds (M1-1)-(M1-41) and (M2-1)-(M2-27) respectively represented by formulae (M1-1)-(M1-41) and (M2-1)-(M2-27). In such compounds, $R^a$, $R^b$, $R^d$, $Z^M$, $A^M$, Y and p are defined as in the case of the formulae (M1) and (M2) described in the aspects of the invention.

The partial structures in the compounds (M1-1)-(M1-41) and (M2-1)-(M2-27) are described below in details. The structure (a1) denotes 1,4-phenylene with arbitrary hydrogen atom being replaced by a fluorine atom. The structure (a2) denotes 1,4-phenylene wherein arbitrary hydrogen atom may be replaced by a fluorine atom. The structure (a3) denotes 1,4-phenylene wherein arbitrary hydrogen atom may be replaced by a fluorine atom or methyl. The structure (a4) denotes fluorenyl wherein the hydrogen atom in the 9-position may be replaced by methyl.

(a1)
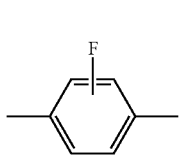

(a2)
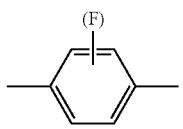

(a3)
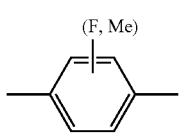

(a4)
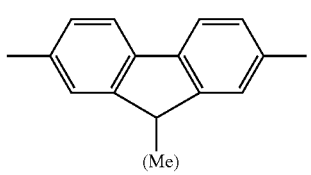

(M1-1)
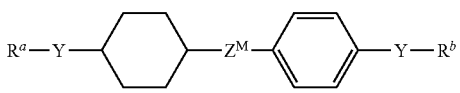

(M1-2)
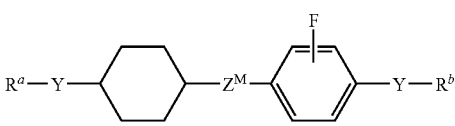

(M1-3)
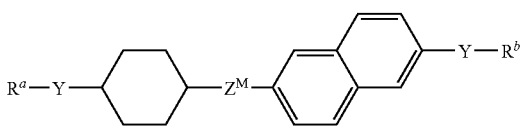

(M1-4)
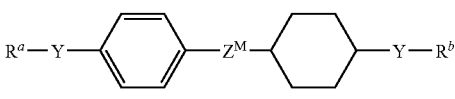

(M1-5)

(M1-6)

(M1-7)
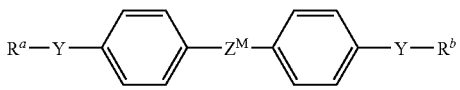

(M1-8)

(M1-9)
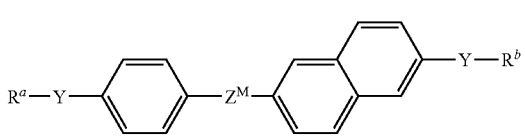

(M1-10)
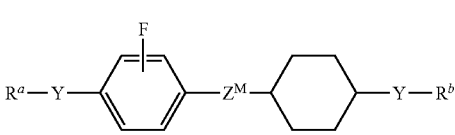

(M1-11)
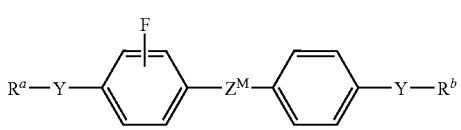

(M1-12)
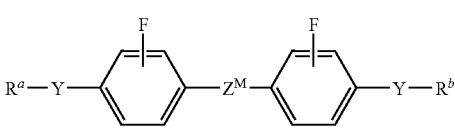

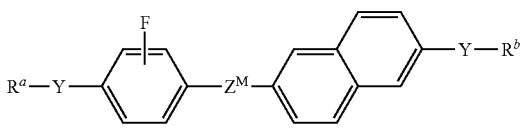

-continued
(M1-13)
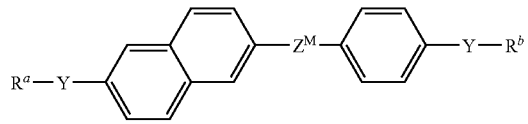
(M1-14)
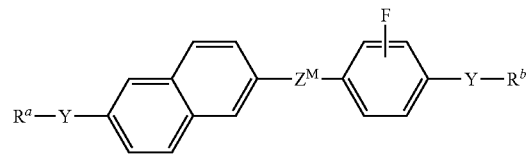
(M1-15)
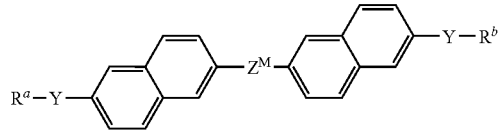
(M1-16)
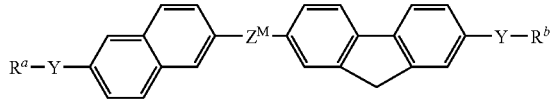
(M1-17)
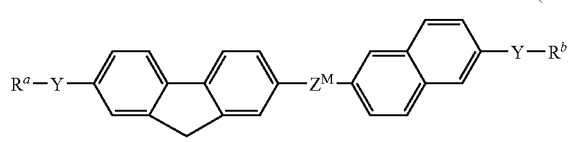
(M1-18)
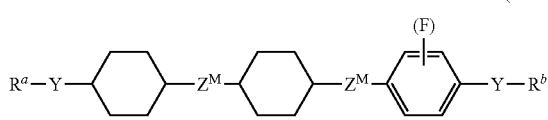
(M1-19)
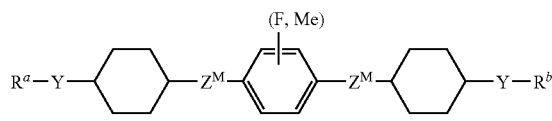
(M1-20)
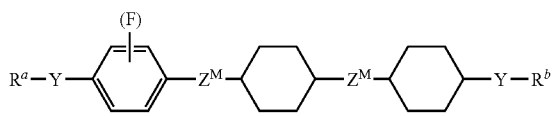
(M1-21)
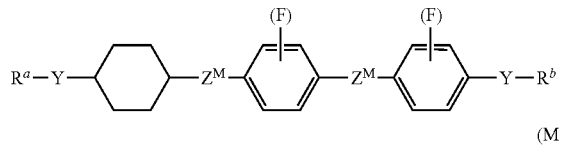
(M1-22)
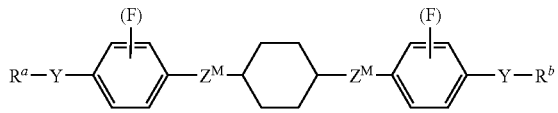
(M1-23)
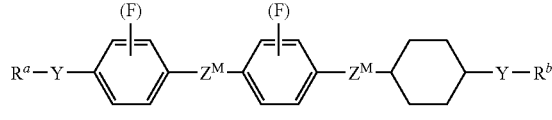
(M1-24)
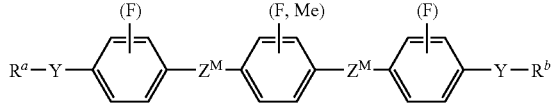
(M1-25)
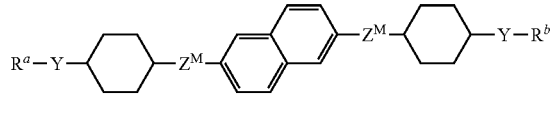
(M1-26)
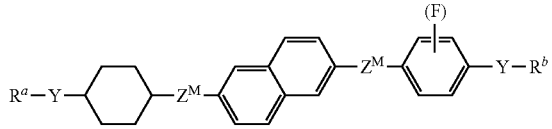
(M1-27)
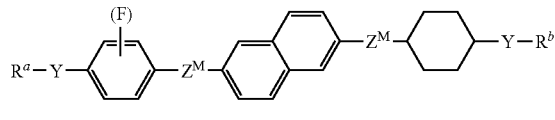
(M1-28)
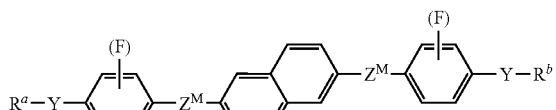
(M1-29)
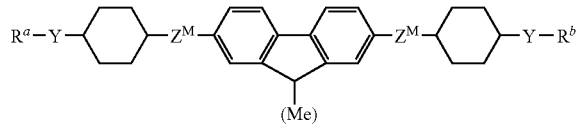
(M1-30)
(M1-31)
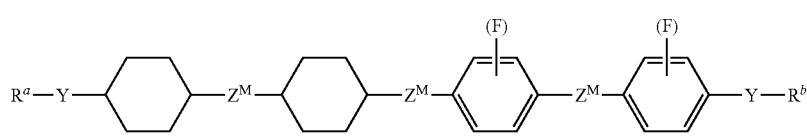

-continued
(M1-32)
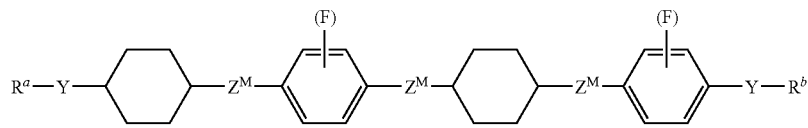
(M1-33)
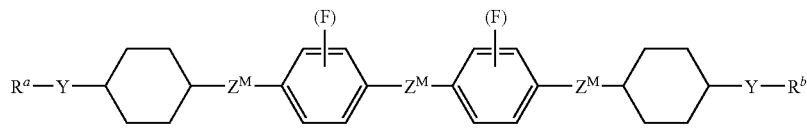
(M1-34)
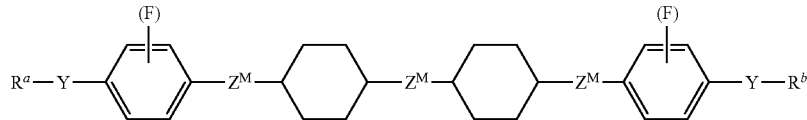
(M1-35)
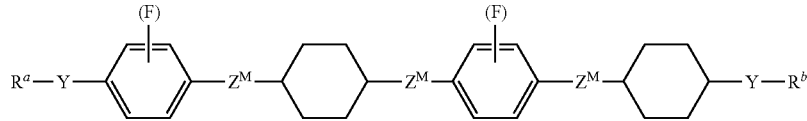
(M1-36)
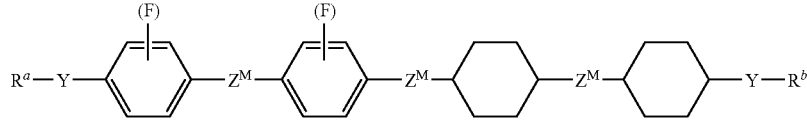
(M1-37)
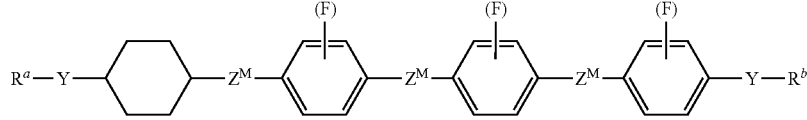
(M1-38)
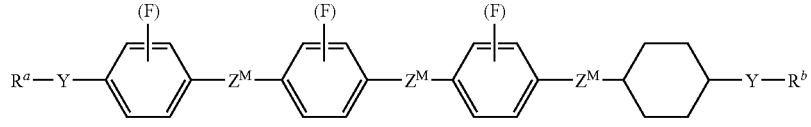
(M1-39)
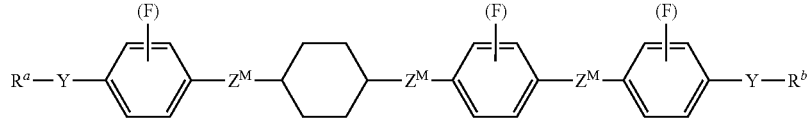
(M1-40)
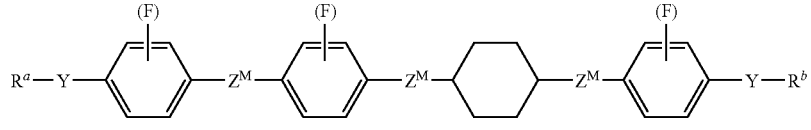
(M1-41)
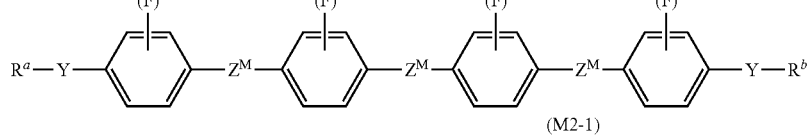
(M2-1)
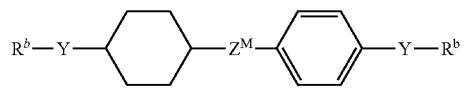
(M2-2)
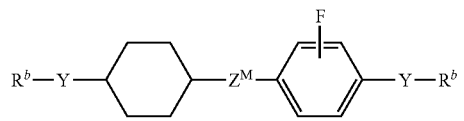

-continued
(M2-3) 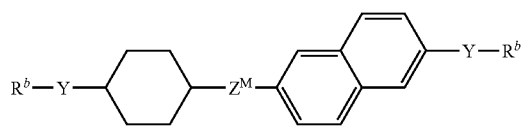
(M2-4) 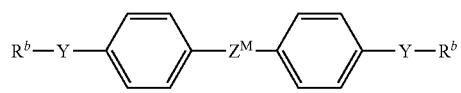
(M2-5) 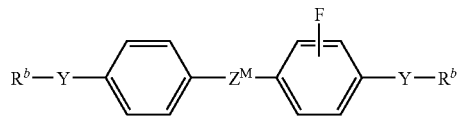
(M2-6) 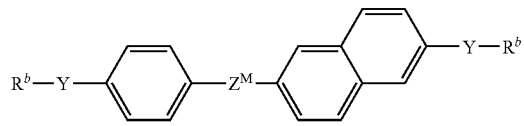
(M2-7) 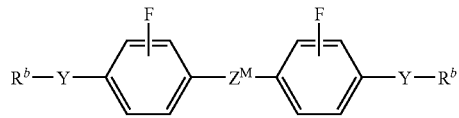
(M2-8) 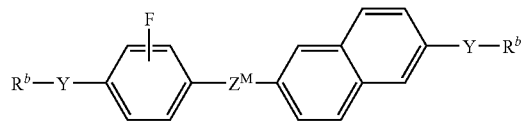
(M2-9) 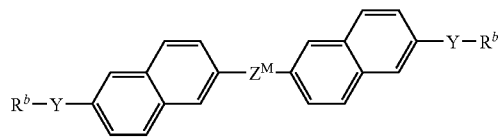
(M2-10) 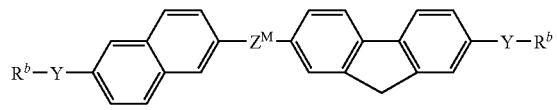
(M2-11) 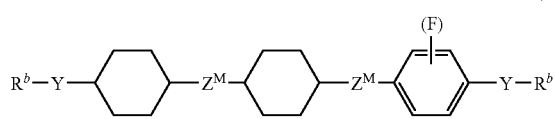
(M2-12) 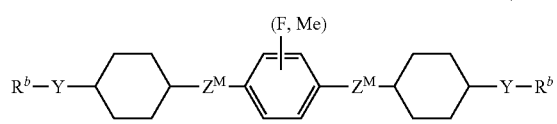
(M2-13) 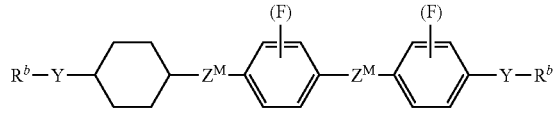
(M2-14) 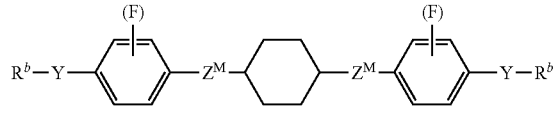
(M2-15) 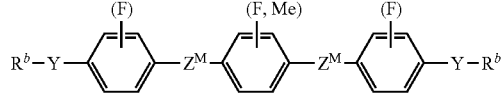
(M2-16) 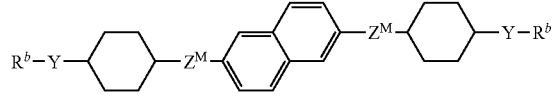
(M2-17) 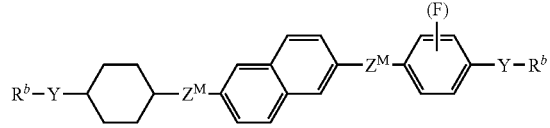
(M2-18) 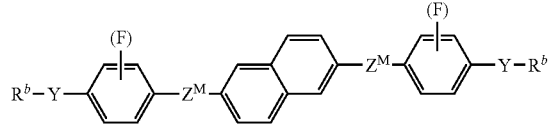
(M2-19) 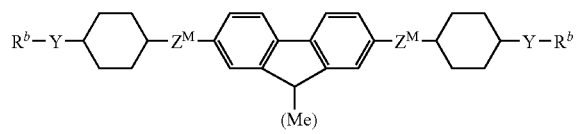
(M2-20) 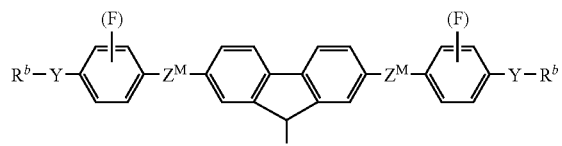
(M2-21) 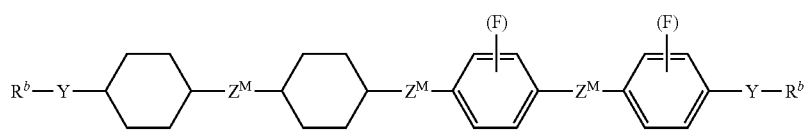

-continued

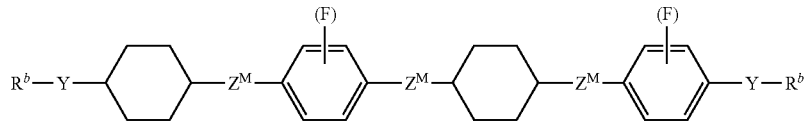
(M2-22)

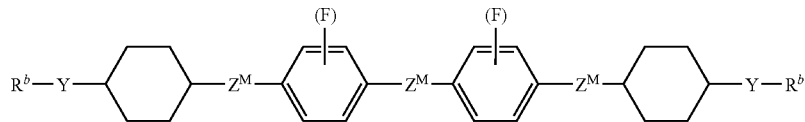
(M2-23)

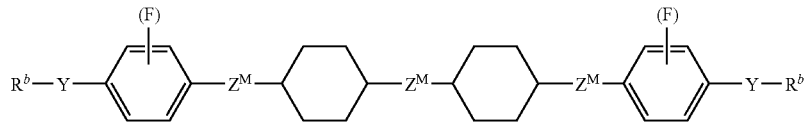
(M2-24)

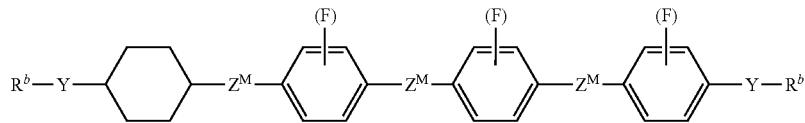
(M2-25)

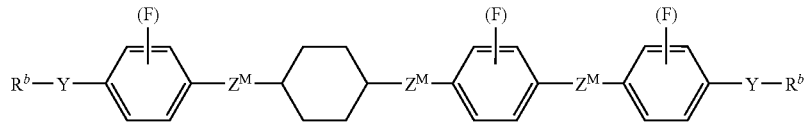
(M2-26)

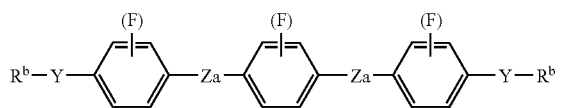

If necessary, a monomer with no mesogenic moiety and a polymerizable compound having a mesogenic moiety other than the monomers (M1) and (M2) may be used.

To optimize the optical isotropy of the polymer/liquid crystal composite of the invention, a monomer having a mesogenic moiety and having three or more polymerizable functional groups may be used. For example, well-known compounds such as (M4-1)-(M4-3) can be used suitably, specific examples of which are described in Japanese Patent Publication Nos. 2000-327632, 2004-182949, and 2004-59772. In (M4-1)-(M4-3), $R^b$, $Z^a$, Y and (F) are defined as above.

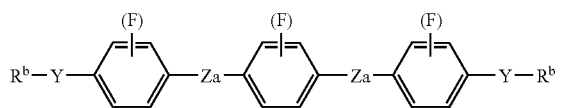

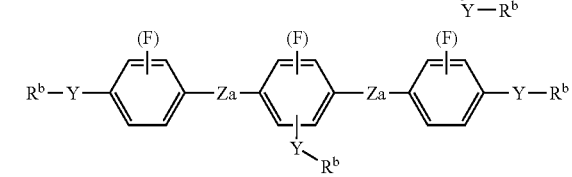

-continued

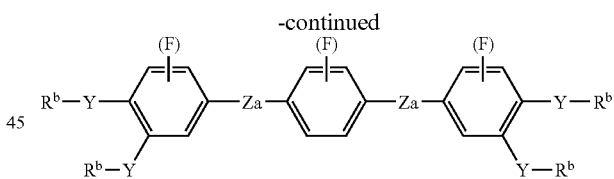

5-2-2. Monomer Having No Mesogenic Moiety and Having Polymerizable Functional Groups Examples of the monomer having no mesogenic moiety and having polymerizable functional groups include, but not limited to, straight or branched acrylate of 1-30 carbon atoms, straight or branched diacrylate of 1-30 carbon atoms, and monomers having three or more polymerizable functional groups, such as glycerol/propoxylate (1PO/OH)/triacrylate, pentaerythritol/propoxylate/triacrylate, pentaerythritol/triacrylate, trimethylolpropane/ethoxylate/triacrylate, trimethylolpropane/propoxylate/triacrylate, trimethylolpropane/triacrylate, di(trimethylolpropane)tetraacrylate, pentaerythritol/tetra acrylate, di(pentaerythritol)pentaacrylate, di(pentaerythritol)hexaacrylate and trimethylolpropane/triacrylate, etc.

5-2-3. Polymerization Initiator

The polymerization reaction for preparing the polymer in the composite material of the invention is not particularly limited, and can be selected from, for example, photo-radical polymerization, thermo-radical polymerization and photo-cationic polymerization, etc.

Examples of the polymerization initiator useful to photo-radical polymerization includes DAROCUR™ 1173 and 4265 (both are tradenames, Ciba Specialty Chemicals Co., Ltd.), IRGACURE™ 184, 369, 500, 651, 784, 819, 907, 1300, 1700, 1800, 1850 and 2959 (all are tradenames, Ciba Specialty Chemicals Co., Ltd.) and so on.

Preferred examples of the initiator useful to thermo-radical polymerization causing radical polymerization by heating include benzoyl peroxide, diisopropyl peroxydicarbonate, t-butyl peroxy2-ethylhexanoate, t-butyl peroxypivalate, t-butyl peroxydiisobutyrate, lauroyl peroxide, dimethyl 2,2'-azobisisobutyrate (MAIB), di-t-butyl peroxide (DTBPO), azobisisobutyronitrile (AIBN) and azobiscyclohexane-carbonitrile (ACN), etc.

Examples of the polymerization initiator useful to photo-cationic polymerization include diaryliodonium salt (referred to as "DAS", hereinafter) and triarylsulfonium (referred to as "TAS", hereinafter), etc.

Examples of DAS include diphenyliodonium tetrafluoroborate, diphenyliodonium hexafluorophosphonate, diphenyliodonium hexafluoroarsenate, diphenyliodonium trifluoromethylsulfonate, diphenyliodonium trifluoroacetate, diphenyliodonium p-toluenesulfonate, diphenyliodonium tetrakis(pentafluorophenyl)borate, 4-methoxyphenylphenyliodonium tetrafluoroborate, 4-methoxyphenylphenliodonium hexafluorophosphonate, 4-methoxyphenylphenliodonium hexafluoroarsenate, 4-methoxyphenylphenyliodonium trifluoromethylsulfonate, 4-methoxyphenylphenyliodonium trifluoroacetate and 4-methoxyphenylphenyliodonium p-toluenesulfonate, etc.

DAS may be sensitized by addition of a photosensitizer, such as thioxanthone, phenothiazine, chlorothioxanthone, xanthone, anthracene, diphenyl anthracene or rubrene, etc.

Examples of TAS include triphenylsulfonium tetrafluoroborate, triphenylsulfonium hexafluorophosphonate, triphenylsulfonium hexafluoroarsenate, triphenylsulfonium trifluoromethylsulfonate, triphenylsulfonium trifluoroacetate, triphenylsulfonium p-toluenesulfonate, triphenylsulfonium tetrakis(pentafluorophenyl)borate, 4-methoxyphenyldiphenylsulfonium tetrafluoroborate, 4-methoxy phenyldiphenylsulfonium hexafluorophosphonate, 4-methoxyphenyldiphenylsulfonium hexafluoroarsenate, 4-methoxyphenyldiphenylsulfonium trifluoromethylsulfonate, 4-methoxyphenyldiphenylsulfonium trifluoroacetate and 4-methoxyphenyldiphenylsulfonium p-toluenesulfonate, etc.

Specific examples of the photo-cationic polymerization initiator include those under the tradenames of Cyracure™ UVI-6990, Cyracure™ UVI-6974 and Cyracure™ UVI-6992 (tradenames, UCC Co., Ltd.), ADEKA OPTOMER™ SP-150, SP-152, SP-170 and SP-172 (tradenames, ADEKA Co., Ltd.), Rhodorsil Photoinitiator™ 2074 (tradename, Rhodia Japan Co., Ltd.), IRGACURE™ 250 (tradename, Ciba Specialty Chemicals Co., Ltd.), UV-9380C (tradename, GE TOSHIBA Silicone Co., Ltd.), etc.

5-2-4. Curing Agent and Additives

In the preparation of the polymer in the composite material of the invention, in addition to the aforementioned monomers and the polymerization initiator, other suitable components may be added alone or in combination, such as a curing agent, a catalyst and a stabilizer, etc.

The curing agent may be a latent curing agent well known and commonly used as an epoxy resin curing agent. Examples of the latent curing agent for epoxy resin include amine curing agents, Novalac curing agents, imidazole curing agents and acid-anhydride curing agents, etc. Examples of the amine curing agent include: aliphatic polyamines, such as diethylenetriamine, triethylenetetramine, tetraethylenepentaamine, m-xylenediamine, trimethyl hexamethylene diamine, 2-methyl-pentamethylene diamine and diethylamino propylamine, etc.; alicyclic polyamines, such as isophorone diamine, 1,3-diaminomethyl cyclohexane, bis(4-aminocyclohexyl)methane, norbornane diamine, 1,2-diamino-cyclohexane and Laromin, etc.; aromatic polyamines, such as diaminodiphenylmethane, diaminodiphenylethane and m-phenylene diamine, etc.

Examples of the Novalac curing agents include phenol-Novalac resin and bisphenol-Novalac resin, etc. Examples of the imidazole curing agents include 2-methylimidazol, 2-ethylhexylimidazole, 2-phenylimidazole and 1-cyanoethyl-2-phenylimidazolium trimellitate, etc.

Examples of the acid anhydride curing agents include tetrahydrophthalic anhydride, hexahydrophthalic anhydride, methyl tetrahydrophthalic anhydride, methyl hexahydrophthalic anhydride, methylcyclohexene tetraformic dianhydride, phthalic anhydride, trimellitic anhydride, pyromellitic anhydride and benzophenone tetraformic dianhydride, etc.

In addition, a curing promoter may also be used to promote the curing reaction of a polymerizable compound having glycidyl, epoxy or oxetanyl with the curing agent. Examples of the curing promoter include: tertiary amines, such as benzyl dimethylamine, tris(dimethylaminomethyl)phenol and dimethyl cyclohexylamine, etc.; imidazoles, such as 1-cyanoethyl-2-ethyl-4-methylimidazole and 2-ethyl-4-methylimidazole, etc.; organo-phosphorus compounds, such as triphenylphosphine, etc.; quaternary phosphonium salts, such as tetraphenyl phosphonium bromide, etc.; diazabicyclic alkenes, such as 1,8-diazabicyclo[5.4.0]undec-7-ene and organic acid salts thereof; quaternary ammonium salts, such as tetraethyl ammonium bromide and tetrabutyl ammonium bromide, etc.; boron compounds, such as boron trifluoride and triphenyl borate, etc. These curing promoters may be used alone or in combination of two or more.

In addition, it is preferred to add a stabilizer in order to, for example, prevent undesirable polymerization during storage. All the compounds well known as stabilizera to the practitioners may be used as the stabilizers. Typical examples of the stabilizer are 4-ethoxy phenol, hydroquinone and butylated hydroxytoluene (BHT), etc.

5-3. Content of Liquid Crystal Composition

The content of the liquid crystal composition in the polymer/liquid crystal composite of the invention is preferably as high as possible, so long as it is in the range in which the composite material exhibits an optically isotropic liquid crystal phase. This is because the higher the content of the liquid crystal composition is, the greater the electric-birefringence of the composite material of the invention.

In the polymer/liquid crystal composite of the invention, the content of the liquid crystal composition is preferably 60-99 wt %, more preferably 60-95 wt % and particularly preferably 65-95 wt %, relative to the composite material. In addition, the content of the polymer is preferably 1-40 wt %, more preferably 5-40 wt % and particularly preferably 5-35 wt %, relative to the composite material.

5-4. Other Components

The polymer/liquid crystal composite of the invention may include other components, such as a dichroic dye or a photochromic compound, so long as the effects of the invention are not affected. The invention will be described in more details below in reference of the embodiments, but is not limited to the embodiments. Furthermore, the symbol "%" denotes "wt %" hereafter, unless specifically indicated.

6. Optical Devices

A sixth aspect of the invention relates to an optical device containing a liquid crystal composition or a polymer/liquid crystal composite (the liquid crystal composition and the polymer/liquid crystal composite of the invention are generally called "liquid crystal medium", hereinafter), which is driven in an optically isotropic liquid crystal phase. The liquid crystal medium is optically isotropic without application of an electric field but exhibits optical anisotropy with application of an electric field; therefore light modulation based on an electric field is possible. An exemplary structure of the LCD device is shown in FIG. 1, wherein on the comb-like electrode substrate, the electrodes 1 extending from the left side and the electrodes 2 extending from the left side are alternately disposed. When a potential difference is present between the electrodes 1 and the electrodes 2, the comb-like electrode substrate is provided with an electric field having two directions (upward direction and downward direction), as shown in FIG. 1.

EXAMPLES

The compounds obtained are characterized by nuclear magnetic resonance spectra obtained with $^1$H-NMR analyses and gas chromatograms obtained with gas chromatography (GC) analyses. The analysis methods are firstly described below.

$^1$H-NMR Analyses:

The $^1$H-NMR analyses were done in DRX-500 manufactured by Bruker BioSpin Co., Ltd. In the measurement, a sample produced in an example or the like was dissolved in a deuterated solvent capable of dissolving the sample, such as CDCl$_3$, and measured at room temperature and 500 MHz with 24 times of integration. In the descriptions of the NMR spectra, "s" denotes a singlet, "d" denotes a doublet, "t" denotes a triplet, "q" denotes a quartet and "m" denotes a multiplet. Tetramethylsilane (TMS) was used as a standard material of the zero point of the chemical shift ($\delta$).

GC Analyses:

The gas chromatography analyses were done in a gas chromatography apparatus "GC-14B" manufactured by Shimadzu Corp. The chromatographic column was a capillary column "CBP1-M25-025" with a length of 25 m, an inner diameter of 0.22 mm and a membrane thickness of 0.25 μm that was manufactured by Shimadzu Corp. The stationary phase was dimethylpolysiloxane without polarity. The carrier gas was helium adjust to have a flow rate of 1 ml/min. The temperature of the sample evaporation chamber was set at 300° C., and that of the detector as a flame ionization detector (FID) was set at 300° C.

In the GC measurement, a sample was dissolved in toluene to give a 1 wt % solution, and 1 μL of the same was injected into the sample evaporation chamber. The data recorder was Chromatopac C-R6A produced by Shimadzu Corp., or an equivalent thereof. The resulting gas chromatogram exhibited peak retention times and peak areas corresponding to the component compounds.

The solvent for diluting the sample may be chloroform or hexane. The capillary column used may be DB-1 with a length of 30 m, an inner diameter of 0.32 mm and a membrane thickness of 0.25 μm produced by Aligent Technologies, Inc., HP-1 with a length of 30 m, an inner diameter of 0.32 mm and a membrane thickness of 0.25 μm produced by Aligent Technologies, Inc., Rtx-1 with a length of 30 m, an inner diameter of 0.32 mm and a membrane thickness of 0.25 μm produced by Restek Corporation or BP-1 with a length of 30 m, an inner diameter of 0.32 mm and a membrane thickness of 0.25 μm produced by SGE International Pty. Ltd., etc.

The area percentages of the peaks in a gas chromatogram correspond to the percentages of the component compounds. The weight percentage of a component compound does not completely agree with the area percentage of the corresponding peak. In the invention, however, the correction coefficient is approximately 1, and thus the weight percentage of a component compound can be considered the same as the area percentage of the corresponding peak upon the use of an aforementioned capillary column. This is because there is little difference between the correction coefficients of the component compounds. The internal standard method of gas chromatography may be used, in order to more accurately calculate the composition ratio of the liquid crystal compounds in the liquid crystal composition in the GC analysis. The liquid crystal compound component (detected component) and the standard liquid crystal compound (standard material) were measured simultaneously with GC, and a relative intensity as the area ratio of the peak of the detected component to that of the standard material was calculated. With a compensation based on the relative intensity as peak area ratio of each component to the standard material, the composition ratio of the liquid crystal compounds in the liquid crystal composition may be more accurately derived through GC analysis.

Samples for Determining Physical Properties of Liquid Crystal Compound or the Like There are two types of samples upon measuring the physical properties of a compound, wherein one type of sample is the compound itself and the other type of sample is obtained by mixing the compound with a mother liquid crystal.

In the latter case where the compound is added to a mother liquid crystal, the measurement is based on the following method. At first, 15 wt % of the liquid crystal compound obtained was mixed with 85 wt % of the mother liquid crystal to prepare a sample. The physical characteristic values of the compound were calculated from the measured value of the sample through the following extrapolation equation:

Extrapolated value=(100×(Measured value of sample)−(weight percentage of mother liquid crystal)×(Measured value of mother liquid crystal))/(weight percentage of liquid crystal compound)

In cases where a smectic phase (or a crystal) is separated at 25° C. at the ratio of the compound to the mother liquid crystal, the ratio is varied in turn to 10 wt %:90 wt %, 5 wt %:95 wt % and 1 wt %:99 wt %. In cases where a smectic phase (or a crystal) is not separated at 25° C., the physical characteristic value of the liquid crystal compound is calculated by the extrapolation method based on the above equation.

There are various kinds of mother liquid crystals useful to the measurement. For example, the mother liquid crystal A has the following composition (wt %).

Mother Liquid Crystal A:

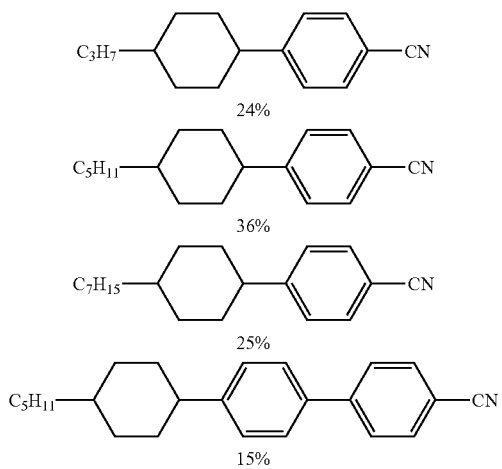

Methods for Measuring Physical Characteristic Values of Liquid Crystal Compound or the Like The measurements of the physical characteristic values were carried out by the following methods. Most of them are methods described in EIAJ ED-2521A of the Standard of Electric Industrial Association of Japan or methods obtained by modifying the same. The TN device used in the measurement was not equipped with TFT.

Among the values obtained by the measurement, the values obtained from a sample consisting of the compound were directly recorded as experimental data, and those obtained from a sample as a mixture of the compound with a mother liquid crystal were converted using the extrapolation method and then the converted values were recorded as experimental data.

The phase structure and the phase transition temperature (° C.) were determined in one of the following methods.

(1) A sample was placed on a hot plate in a melting point measuring apparatus (Hot Stage FP-52 produced by Mettler, Corp.) equipped with a polarizing microscope. The phase state and its change were observed by the polarizing microscope while the sample was heated at a rate of 3° C./min to determine the type of the liquid crystal phase.

(2) The onset temperature of the endothermic peak or the exothermic peak accompanied by phase change of the sample was determined by the extrapolation method, using a Scanning Calorimeter DSC-7 system or Diamond DSC system manufactured by Perkin Elmer Corp. at a heating or cooling rate of 3° C./min, to determine the temperature of phase transition.

In the following descriptions, a crystal phase is represented by "K". In a case where two crystal phases are distinguished from each other, they are represented by $K_1$ and $K_2$ respectively. A smectic phase is represented by "Sm". A nematic phase is represented by "N". In a case where a smectic B phase and a smectic A phase are distinguished from each other in the smectic phases, they are represented by "SmB" and "SmA". "BP" represents a blue phase or an optically isotropic liquid crystal phase. A bi-phase coexistence is sometimes represented by (N*+I) or (N*+BP). Specifically, (N*+I) represents a phase of an isotropic phase coexisting with a chiral nematic phase, and (N*+BP) represents a phase of a BP phase or an optically isotropic liquid crystal phase coexisting with a chiral nematic phase. "Un" represents an unidentified phase without optical isotropy. As for the expression of the transition temperatures, for example, "K 50.0 N 100.0 I" means that the transition temperature (KN) from a crystal phase to a nematic phase is 50.0° C. and the transition temperature (NI) from a nematic phase to a liquid phase is 100.0° C. The cases of other expressions are similar.

Upper-Limit Temperature of Nematic Phase ($T_{NI}$:° C.):

A sample as a mixture of a liquid crystal compound and a mother liquid crystal was placed on a hot plate in a melting point measuring apparatus (Hot Stage FP-52 made by Mettler Corp.) equipped with a polarizing microscope, and was observed by the polarizing microscope as heated at a rate of 1° C./min. The temperature at which a part of the sample started to change from a nematic phase to an isotropic liquid was recorded as the upper-limit temperature of the nematic phase, which is abbreviated to "upper-limit temperature" below.

Low-Temperature Compatibility:

Samples were prepared by mixing a liquid crystal compound with a mother liquid crystal in amounts of 20 wt %, 15 wt %, 10 wt %, 5 wt %, 3 wt % and 1 wt % respectively, and were placed in glass bottles. The samples were kept in a freezer set at −10° C. or −20° C. for a certain period, and were observed for separation of a crystal phase or a smectic phase.

Viscosity ($\eta$, Measured at 20° C., mPa·s):

The viscosity of a mixture of a liquid crystal compound and a mother liquid crystal was measured using an E-type rotary viscometer.

Optical Anisotropy ($\Delta n$):

The optical anisotropy was measured using an Abbe refractometer equipped with a polarizing plate attached to the ocular lens with light of 589 nm in wavelength at 25° C. After rubbing the surface of the main prism in one direction, a sample as a mixture of a liquid crystal compound and a mother liquid crystal was dropped on the main prism. The refractive index $n_\parallel$ was measured when the polarizing direction was parallel to the rubbing direction. The refractive index $n_\perp$ was measured when the polarizing direction was perpendicular to the rubbing direction. The optical anisotropy was calculated with the equation "$\Delta n = n_\parallel - n_\perp$".

Dielectric Anisotropy ($\Delta \epsilon$, Measured at 25° C.):

A sample as a mixture of a liquid crystal compound and a mother liquid crystal was injected into a liquid crystal cell having a distance (cell gap) of 9 μm between two glass substrates and a twist angle of 80°. A voltage of 20 V was applied to the liquid crystal cell, and the dielectric constant ($\epsilon_\parallel$) in the major-axis direction of the liquid crystal molecule was measured. Then, a voltage of 0.5 V was applied, and a dielectric constant ($\epsilon_\perp$) in the minor-axis direction of the liquid crystal molecule was measured. The dielectric anisotropy was calculated from the equation "$\Delta \epsilon = \epsilon_\parallel - \epsilon_\perp$".

Pitch (p, Measured at 25° C., nm)

The pitch length was measured by selective reflection (Liquid Crystal Manual, p. 196, issued in 2000 by MARUZEN). The selective reflection wavelength λ satisfies the equation "$<n> p/\lambda = 1$", wherein $<n>$ denotes the average refractive index defined by the equation "$<n> = \{(n_\parallel^2 + n_\perp^2)/2\}^{1/2}$". The selective reflection wavelength was measured with a microspectrophotometer MSV-350 made by Japan Electronics Co., Ltd. The pitch was calculated by dividing the reflection wavelength by the average refractive index. When the concentration of the optically active compound was low, the pitch of a cholesteric liquid crystal having a reflection wavelength at the long wavelength side of visible light was proportional to the reciprocal of the concentration. Therefore, multiple points were measured for the pitch length of the liquid crystal having a selective reflection wavelength in the region of visible light, and the pitch was calculated through linear extrapolation. Furthermore, the "optically active compound" corresponds to the chiral dopant of the invention.

Synthesis Example 1

Synthesis of 1-chloro-6-(4-pentylphenyl)-2-(3,4,5-trifluoro-phenyl)naphthalene (S1-7)

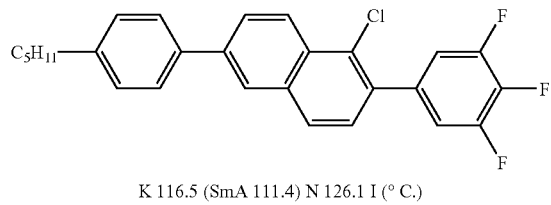

K 116.5 (SmA 111.4) N 126.1 I (° C.)

(S1-7)

The synthesis scheme is as follows.

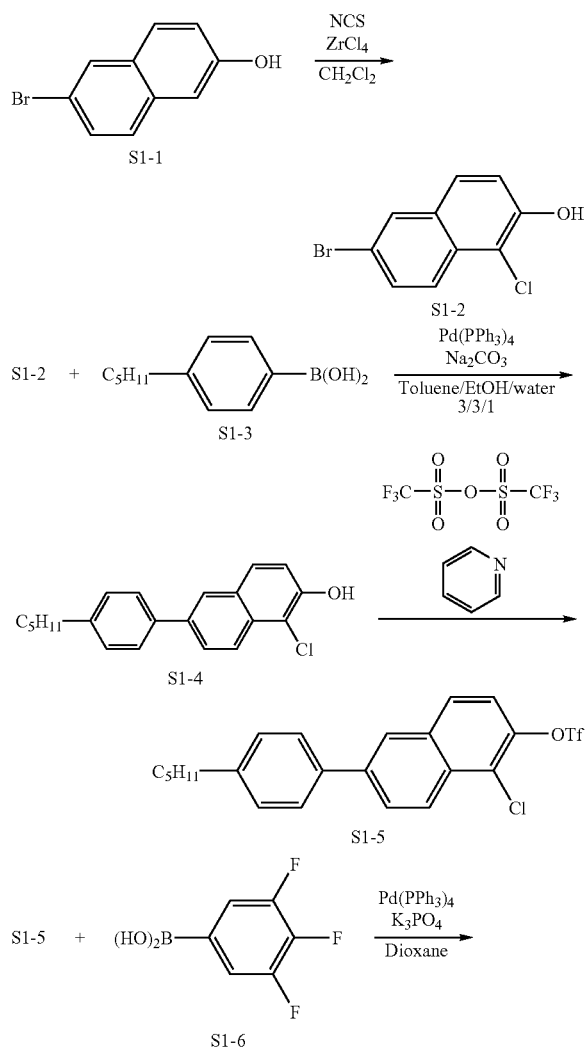

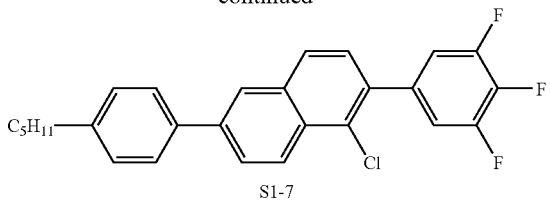

S1-7

Synthesis of Compound (S1-2)

The synthesis of (S1-2) was carried out following the method described in *Synlett*, No. 18, 2837 (2005), wherein 29.9 g of N-chlorosuccinimide and 600 ml of dichloromethane were added to a reactor in nitrogen atmosphere and cooled to 0° C., 2.6 g of zirconium (IV) chloride was added, and then 50 g of 6-bromo-2-naphthol (S1-1) was added slowly. The reaction solution was heated to room temperature and stirred for 10 hours, then washed with saturated sodium bicarbonate solution and water, dried over magnesium sulfate, and distilled under a reduced pressure to remove the solvent. Recrystallization was carried out using a mixed solvent of toluene/heptane=1/1 (volumetric ratio) to obtain 55 g of 6-bromo-1-chloro-2-naphthol (S1-2).

Synthesis of Compound (S1-4)

At first, 55 g of 6-bromo-1-chloro-2-naphthol (S1-2), 12.3 g of 4-pentyl-phenylboric acid (S1-3), 1.0 g of tetrakis(triphenylphosphine) palladium, 13.6 g of sodium carbonate and 100 ml of a mixed solvent of toluene/ethanol/water=3/3/1 were added to a reactor in nitrogen atmosphere and refluxed for 10 hours. The reaction solution was cooled to room temperature, added with toluene, and then washed with 1N HCl$_{(aq)}$ and water, dried over magnesium sulfate and distilled under a reduced pressure to remove the solvent. The residue was purified by silica gel column chromatography using toluene as an eluting solvent, and then dried under a reduced pressure to obtain 15 g of 6-(4-pentylphenyl)-1-chloro-2-naphthol (S1-4).

Synthesis of Compound (S1-5)

At first, 15 g of 6-(4-pentylphenyl)-1-chloro-2-naphthol (S1-4), 14 ml of pyridine and 200 ml of dichloromethane were added to a reactor in nitrogen atmosphere and cooled to 0° C., and then 14.3 g of trifluoromethanesulfonic anhydride was added drop-wise. The reaction solution was stirred for 4 hours at this temperature, and then washed with sodium bicarbonate solution and water, dried over magnesium sulfate and distilled under a reduced pressure to remove the solvent. The residue was purified by silica gel column chromatography using a mixed solvent of heptane/toluene=1/1 as an eluting solvent, and then dried under a reduced pressure to obtain 13.3 g of (S1-5).

Synthesis of Compound (S1-7)

At first, 5.0 g of (S1-5), 2.9 g of 3,4,5-trifluorophenylboric acid (S1-6), 2.0 g of tetrakis(triphenylphosphine) palladium, 4.2 g of potassium phosphate ($K_3PO_4$) and 100 ml of dioxane were added to a reactor in nitrogen atmosphere and refluxed for 12 hours. Toluene was then added to the reaction solution. The reaction solution was washed with 1N HCl$_{(aq)}$ and water, dried over magnesium sulfate and distilled under a reduced pressure to remove the solvent. The residue was purified by silica gel column chromatography using a mixed solvent of heptane/toluene=9/1 as an eluting solvent, and then subjected to recrystallization using a mixed solvent of ethanol/ethyl acetate=4/1 and dried in under reduced pressure to obtain 1.8 g of 1-chloro-6-(4-pentylphenyl)-2-(3,4,5-trifluorophenyl)naphthalene (S1-7).

The phase transition temperature of compound (S1-7) obtained is as follows:
Phase transition temperature (° C.): K 116.5 (SmA 111.4) N 126.1 I.

The compound obtained can be characterized as 1-chloro-6-(4-pentylphenyl)-2-(3,4,5-trifluorophenyl)naphthalene (S1-7) base on the following chemical shift (δ, ppm) data of $^1$H-NMR analysis using CDCl$_3$ as a solvent: 8.42 (d, 1H), 8.06 (d, 1H), 7.93-7.91 (dd, 1H), 7.85 (d, 1H), 7.66 (d, 2H), 7.38 (d, 1H), 7.33 (d, 2H), 7.17-7.14 (m, 2H), 2.68 (t, 2H), 1.69-1.66 (m, 2H), 1.38-1.35 (m, 4H) and 0.92 (t, 3H).

Physical Properties of Liquid Crystal Compound (S1-7)

A mother liquid crystal A having nematic phase was prepared by mixing four compounds described above. The physical properties of the mother liquid crystal A is as follows:
Upper-limit temperature (T$_{NI}$)=71.7° C.; dielectric anisotropy (Δε)=11.0; optical anisotropy (Δn)=0.137.

A liquid crystal composition B including 85 wt % of the mother liquid crystal A and 15 wt % of 1-chloro-6-(4-pentylphenyl)-2-(3,4,5-trifluorophenyl)naphthalene (S1-7) obtained in Synthesis Example 1 was prepared. The physical characteristic values of the liquid crystal compound (S1-7) were calculated from the measured physical characteristic values of the liquid crystal composition B through extrapolation. The extrapolated physical characteristic values of the liquid crystal compound (S1-7) are as follows:
Upper-limit temperature (T$_{NI}$)=104.4° C.; dielectric anisotropy (Δε)=22.7; optical anisotropy (Δn)=0.230.

Accordingly, the liquid crystal compound (S1-7) is a compound having good compatibility with other liquid crystal compounds, a high upper-limit temperature (T$_{NI}$), a large dielectric anisotropy (Δε) and a large optical anisotropy (Δn).

Synthesis Example 2

Synthesis of 1-chloro-6-(4-propylphenyl)-2-(3,4,5-trifluoro-phenyl)naphthalene (S-3)

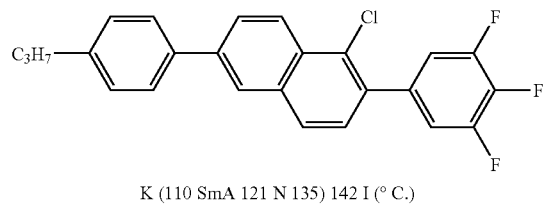

K (110 SmA 121 N 135) 142 I (° C.)

(S-3)
Synthesis of Compound (S-3)

Here, 1-chloro-6-(4-propylphenyl)-2-(3,4,5-trifluorophenyl)naphthalene (S-3) was synthesized in the same manner of Synthesis Example 1, wherein 3.1 g of (S-3) was obtained from 11.4 g of (S1-2). The phase transition temperatures of the compound (S-3) obtained are as follows:
Phase transition temperatures (° C.): K (110 SmA 121 N 135) 142 I.

The compound obtained can be characterized as 1-chloro-6-(4-propylphenyl)-2-(3,4,5-trifluorophenyl)naphthalene (S-3) based on the following chemical shift (δ, ppm) of $^1$H-NMR analysis using CDCl$_3$ as a solvent: 8.43 (d, 1H), 8.07 (d, 1H), 7.94-7.92 (dd, 1H), 7.86 (d, 1H), 7.67 (d, 2H), 7.39 (d, 1H), 7.33 (d, 2H), 7.18-7.15 (m, 2H), 2.67 (t, 2H), 1.74-1.69 (m, 2H) and 1.00 (t, 3H).

Physical Properties of Liquid Crystal Compound (S-3)

A mother liquid crystal A having nematic phase was prepared by mixing four compounds described above. The physical properties of the mother liquid crystal A are as follows:
Upper-limit temperature (T$_{NI}$)=71.7° C.; dielectric anisotropy (Δε)=11.0; optical anisotropy (Δn)=0.137.

A liquid crystal composition C including 85 wt % of the mother liquid crystal A and 15 wt % of 1-chloro-6-(4-propylphenyl)-2-(3,4,5-trifluorophenyl)naphthalene (S-3) obtained in Synthesis Example 3 was prepared. The physical characteristic values of the liquid crystal compound (S-3) are calculated from the measured physical characteristic values of the liquid crystal composition C through extrapolation. The extrapolated physical characteristic values of the liquid crystal compound (S-3) are as follows:
Upper-limit temperature (T$_{NI}$)=100.7° C.; dielectric anisotropy (Δε)=25.7; optical anisotropy (Δn)=0.237.

Accordingly, the liquid crystal compound (S-3) is a compound having a high upper-limit temperature (T$_{NI}$), a large dielectric anisotropy (Δε) and a large optical anisotropy (Δn).

Synthesis Example 3

Synthesis of 1-chloro-6-(4-propylphenyl)-2-[4-difluoro(3,4,5-trifluorophenoxy)methyl-3,5-difluorophenyl]naphthalene (S5-4)

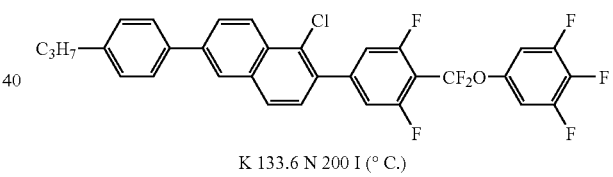

K 133.6 N 200 I (° C.)

(S5-4)
The synthesis scheme is as follows.

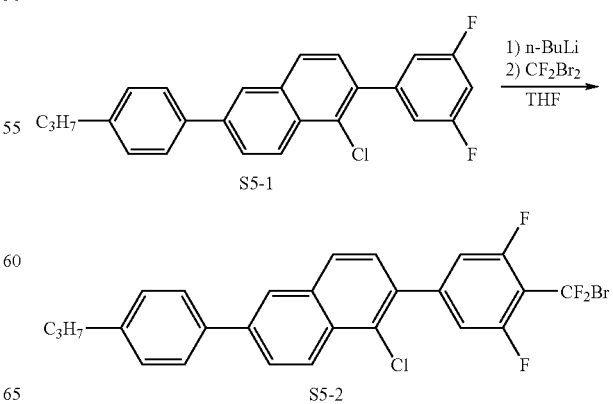

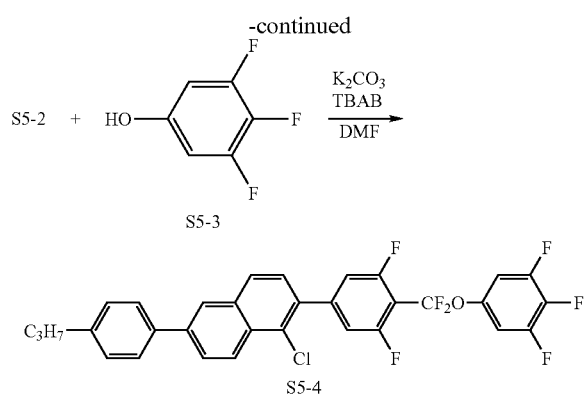

Synthesis of Compound (S5-1)

The synthesis of 1-chloro-6-(4-propylphenyl)-2-(3,5-difluorophenyl)-naphthalene (S5-1) was carried out following the method of Synthesis Example 1, wherein 9.3 g of (S5-1) was obtained from 26.5 g of (S1-2).

Synthesis of Compound (S5-2)

At first, 9.3 g of the compound (S5-1) and 100 ml of THF were added to a reactor in nitrogen atmosphere and cooled to −74° C. Then, a 1.60M solution of n-butyl lithium in 18 ml of n-hexane was added drop-wise in a temperature range from −74° C. to −60° C., and then the reaction solution was stirred for 60 minutes. A solution of 6.95 g of dibromodifluoromethane in 20.0 ml of THF was added drop-wise in a temperature range from −75° C. to −70° C., and then the reaction solution was stirred for 60 minutes while the temperature returned to 25° C. The resulting reaction mixture was added to 150 ml of ice water and mixed, the mixture was extracted with 100 ml of toluene, and the organic layer was separated from the aqueous layer. The organic layer was washed with a saline solution and dried over anhydrous magnesium sulfate. The resulting solution was concentrated under a reduced pressure, and the residue was purified by silica gel column chromatography using a mixed solvent of heptane/toluene=4/1 as an eluting solvent. The fraction was distilled to remove the solvent and dried to obtain 10.4 g of 1-chloro-6-(4-propylphenyl)-2-[4-bromodifluoromethyl-3,5-difluorophenyl]-naphthalene (S5-2).

Synthesis of Compound (S5-4)

At first, 2.7 g of the compound (S5-2), 0.8 g of 3,4,5-trifluorophenol, 3.5 g of potassium carbonate and 50 ml of N,N-dimethylformamide (DMF) were added to a reactor in nitrogen atmosphere and stirred for 120 minutes at 90° C. The reaction mixture was returned to 25° C., and added to 50 ml of ice water and mixed. The mixture was extracted with 100 ml of toluene, and the organic layer is separated from the aqueous layer. The organic layer was washed sequentially with saturated aqueous sodium bicarbonate, 0.5 N NaOH aqueous solution and saline solution, and was dried over anhydrous magnesium sulfate. The resulting solution was concentrated under a reduced pressure, and the residue was purified by silica gel column chromatography using a mixed solvent of heptane/ethyl acetate as an eluting solvent. The product was further purified by recrystallization from a mixed solvent of heptane/Solmix A-11, and dried to obtain 1.8 g of 1-chloro-6-(4-propylphenyl)-2-[4-difluoro(3,4,5-trifluoro-phenoxy)methyl-3,5-difluorophenyl]naphthalene (S5-4).

The phase transition temperatures of the compound (S5-4) obtained are as follows:

Phase transition temperatures: K 133.6 N 200.0 I.

The compound obtained can be characterized as 1-chloro-6-(4-propylphenyl)-2-[4-difluoro(3,4,5-trifluorophenoxy)methyl-3,5-difluorophenyl]naphthalene (S5-4) based on the following chemical shift (δ, ppm) data of $^1$H-NMR analysis using $CDCl_3$ as a solvent: 8.44 (d, 1H), 8.08 (d, 1H), 7.95-7.93 (dd, 1H), 7.89 (d, 1H), 7.67 (d, 2H), 7.39 (d, 1H), 7.33 (d, 2H), 7.20 (d, 2H), 7.04-7.01 (m, 2H), 2.67 (t, 2H), 1.73-1.69 (m, 2H) and 1.00 (t, 3H).

Physical Properties of Liquid Crystal Compound (S5-4)

A liquid crystal composition D including 95 wt % of the mother liquid crystal A and 5 wt % of 1-chloro-6-(4-propylphenyl)-2-[4-difluoro(3,4,5-trifluorophenoxy)methyl-3,5-difluorophenyl]naphthalene (S5-4) obtained in Synthesis Example 3 was prepared. The physical characteristic values of the liquid crystal compound (S5-4) was calculated from the measured physical characteristic values of the liquid crystal composition D through extrapolation. The extrapolated physical characteristic values of the liquid crystal compound (S5-4) are as follows:

Upper-limit temperature $(T_{NI})$=133.7° C.; dielectric anisotropy $(\Delta\epsilon)$=39.7; optical anisotropy $(\Delta n)$=0.237.

Accordingly, the liquid crystal compound (S5-4) is a compound having a high upper-limit temperature $(T_{NI})$, a large dielectric anisotropy $(\Delta\epsilon)$ and a large optical anisotropy $(\Delta n)$.

Synthesis Example 4

Synthesis of 1-chloro-6-(1-pentynyl)-2-[4-difluoro(3,4,5-trifluorophenoxy)methyl-3,5-difluorophenyl]naphthalene (S7-8)

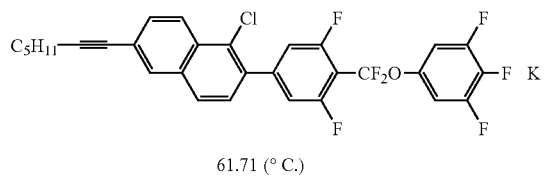

61.71 (° C.)

(S7-8)

The synthesis scheme is as follows.

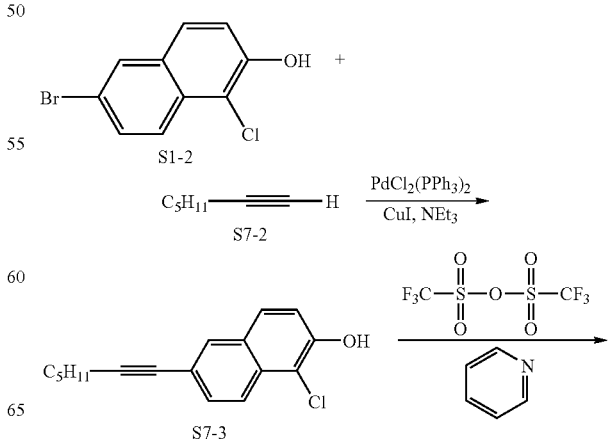

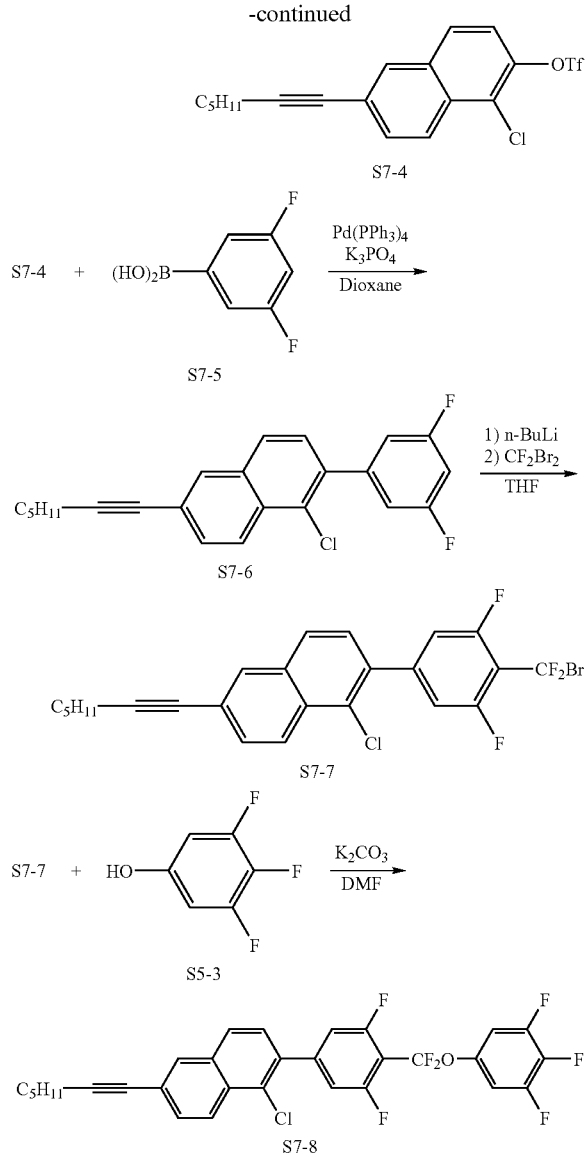

described in Synthesis Example 1, wherein 1.8 g of (S7-6) was obtained from 32.3 g of (S7-3).

Synthesis of Compound (S7-8)

The synthesis of (S7-8) from (S7-6) synthesis was carried out following the method for synthesizing (S5-4) from (S5-1) described in Synthesis Example 3, wherein 0.4 g of (S7-8) was obtained from 1.7 g of (S7-6).

The phase transition temperatures of the compound (S7-8) obtained are as follows:

Phase transition temperature (° C.): K 61.7 I.

The compound obtained can be characterized as 1-chloro-6-(1-pentynyl)-2-[4-difluoro(3,4,5-trifluorophenoxy)methyl-3,5-difluorophenyl]naphthalene (S7-8) based on the chemical shift (δ, ppm) of $^1$H-NMR analysis using $CDCl_3$ as a solvent: 8.29 (d, 1H), 7.94 (S, 1H), 7.77 (d, 1H), 7.65-7.62 (dd, 1H), 7.37 (d, 1H), 7.17 (d, 2H), 7.03-7.00 (m, 2H), 2.48 (t, 2H), 1.68-1.65 (m, 2H), 1.49-1.45 (m, 2H), 1.42-1.37 (m, 2H) and 0.95 (t, 3H).

Physical Properties of Liquid Crystal Compound (S7-8)

A liquid crystal composition E including 85 wt % of the mother liquid crystal A and 15 wt % of 1-chloro-6-(1-pentynyl)-2-[4-difluoro(3,4,5-trifluorophenoxy)methyl-3,5-difluorophenyl]naphthalene (S7-8) obtained in Synthesis Example 4 was prepared. The physical characteristic values of the liquid crystal compound (S7-8) were calculated from the measured physical characteristic values of the liquid crystal composition E through extrapolation. The extrapolated physical characteristic values of the liquid crystal compound (S7-8) are as follows.

Upper-limit temperature ($T_{NI}$)=47.0° C.; dielectric anisotropy (Δε)=34.7; optical anisotropy (Δn)=0.20.

Accordingly, the liquid crystal compound (S7-8) is a compound having good compatibility with other liquid crystal compounds, and having a large dielectric anisotropy (Δε) and a large optical anisotropy (Δn) even though having a low upper-limit temperature ($T_{NI}$).

Composition of the Invention

In the invention, the characteristic values of the liquid crystal composition were measured based on the methods below. Most of the methods are methods described in EIAJ ED-2521A of the Standard of Electric Industrial Association of Japan or methods obtained by modifying the same. The TN device used in the measurement was not equipped with TFTs.

Upper-Limit Temperature of Nematic Phase (NI, ° C.):

The sample was placed on a hot plate in a melting point measuring apparatus equipped with a polarizing microscope, and was heated at a rate of 1° C./min. The temperature at which a part of the sample started to change from a nematic phase to an isotropic liquid was recorded as the upper-limit temperature of the nematic phase, which is abbreviated to "upper-limit temperature" below.

Lower-Limit Temperature of Nematic Phase ($T_C$, ° C.):

Samples having a nematic phase were stored in freezers respectively set at 0° C., −10° C., −20° C., −30° C. and −40° C. for 10 days, and were observed for the liquid crystal phase. For example, in a case where a sample exhibits a nematic phase at −20° C. and is changed to a crystal phase (or smectic phase) at −30° C., the $T_C$ is recorded as "$T_C$≦−20° C.". The lower-limit temperature of a nematic phase is sometimes abbreviated to "lower-limit temperature".

Transition Temperature of an Optically Isotropic Liquid Crystal Phase:

The sample was placed on a hot plate in a melting point measuring apparatus equipped with a polarizing microscope Synthesis of Compound (S7-3)

The synthesis of (S7-3) was carried out following the method described in *Synthesis*, No. 9, 1439 (2004). At first, 38.3 g of 1-chloro-6-bromo-2-naphthol (S1-2), 5.2 g of $PdCl_2(PPh_3)_2$, 0.71 g of copper iodide and 400 ml of triethylamine were added to a reactor in nitrogen atmosphere, stirred at room temperature, added with 35.8 g of 1-heptyne (S7-2) and then refluxed for 6 hours. The reaction solution was cooled to room temperature and distilled under a reduced pressure to remove the solvent, and then the residue was added with ethyl acetate and filtered by celite. The resulting solution was washed with 1N $HCl_{(aq)}$ and water, and dried over anhydrous magnesium sulfate. The solvent was removed by distillation under a reduced pressure. The residue was purified by silica gel column chromatography using heptane/ethyl acetate=3/1 as an eluting solvent and dried under a reduced pressure to obtain 32.3 g of 1-chloro-6-(1-pentynyl)-2-naphthol (S7-3).

Synthesis of Compound (S7-6)

The synthesis of (S7-6) from (S7-3) was carried out following the method for synthesizing (S1-7) from (S1-4)

with crossed Nicols. The sample was initially heated to a temperature allowing formation of an isotropic phase and then cooled in a rate of 1° C./min to form a chiral nematic phase or an optically isotropic liquid crystal phase entirely. A phase transition temperature was measured during the cooling-down process, and then the temperature was raised in a rate of 1° C./min. A phase transition temperature is measured again during the heating-up process. In the invention, a phase transition temperature in the heating-up process is regarded as the phase transition temperature, unless specifically indicated. For an optically isotropic liquid crystal phase, if the phase transition temperature is difficult to determine in the dark field at the crossed Nicols state, the polarizing plate may be shifted by 1-10° from the crossed Nicol state before the phase transition temperature was determined.

Viscosity ($\eta$, Measured at 20° C., mPa·s):

The viscosity was measured with an E-type rotary viscometer.

Rotation Viscosity ($\gamma 1$, Measured at 25° C., mPa·s):

1) For a sample having a positive dielectric anisotropy, the rotation viscosity was measured based on the method disclosed in M. Imai, et al., *Molecular Crystals and Liquid Crystals*, vol. 259, p. 37 (1995). The sample was placed in a TN device having a twist angle of 0° and a distance (gap) of 5 µm between two glass substrates. The TN device was applied with a voltage in a range from 16 V to 19.5 V stepwise by 0.5 V. After a voltage-free period of 0.2 second, a rectangular wave (rectangular pulse of 0.2 second) and a voltage-free period of 2 seconds were applied repeatedly. The peak current and the peak time of the transient current generated by the voltage application were measured. The rotation viscosity was calculated from the measured values based on Equation (8) in page 40 of the literature of M. Imai, et al. The value of the dielectric anisotropy, which was necessary for the calculation, was obtained based on the following measuring method of dielectric anisotropy using the device for measuring the rotation viscosity.

2) For samples having negative dielectric anisotropy: The rotation viscosity was measured based on the method disclosed in M. Imai, et al., *Molecular Crystals and Liquid Crystals*, vol. 259, p. 37 (1995). The sample was placed in a VA device having a distance (gap) of 20 µm between two glass substrates. The VA device was applied with a voltage in a range from 30 V to 50 V stepwise by 1 V. After a voltage-free period of 0.2 second, a rectangular wave (rectangular pulse of 0.2 second) and a voltage-free period of 2 seconds were applied repeatedly. The peak current and the peak time of the transient current generated by the voltage application were measured. The rotation viscosity was calculated from the measured values and Equation (8) in page 40 of the literature of M. Imai, et al. The value of the dielectric anisotropy, which was necessary for the calculation, was obtained based on the following measuring method of the dielectric anisotropy.

Optical Anisotropy ($\Delta n$, Measured at 25° C.):

The optical anisotropy was measured using an Abbe refractometer having a polarizing plate attached to the eye lens with light of 589 nm. After rubbing the surface of the main prism in one direction, the sample was dropped on the main prism. The refractive index $n_\parallel$ was measured when the polarizing direction was parallel to the rubbing direction, the refractive index $n_\perp$ was measured when the polarizing direction was perpendicular to the rubbing direction, and the optical anisotropy was calculated from the equation "$\Delta n = n_\parallel - n_\perp$". In a case where the sample was a composition, the optical anisotropy was measured by this method. In a case where the sample was a compound, the compound was mixed in a suitable composition for the measurement of the optical anisotropy, wherein the optical anisotropy of the compound was obtained through extrapolation.

Dielectric Anisotropy ($\Delta\epsilon$, Measured at 25° C.):

In a case where the sample was a compound, the compound was mixed in a suitable composition for the measurement of the dielectric anisotropy, wherein the dielectric anisotropy of the compound was obtained through extrapolation.

1) For a composition having a positive dielectric anisotropy: A sample was injected into a liquid crystal cell having a distance (cell gap) of 9 µm between two glass substrates and a twist angle of 80°. A voltage of 20 V was applied to the liquid crystal cell to measure the dielectric constant ($\epsilon_\parallel$) in the major-axis direction of the liquid crystal molecule. Then, a voltage of 0.5 V was applied to measure the dielectric constant ($\epsilon_\perp$) in the minor-axis direction of the liquid crystal molecule. The dielectric anisotropy was calculated from the equation "$\Delta\epsilon = \epsilon_\parallel - \epsilon_\perp$".

2) For a composition having a negative dielectric anisotropy: A sample was injected into a liquid crystal cell having been processed to a homeotropic alignment, and a voltage of 0.5 V was applied to measure the dielectric constant $\epsilon_\parallel$. Next, the sample was injected into a liquid crystal cell having been processed to a homogeneous alignment, and a voltage of 0.5 V was applied to measure the dielectric constant $\epsilon_\perp$. The dielectric anisotropy was calculated from the equation "$\Delta\epsilon = \epsilon_\parallel - \epsilon_\perp$".

Threshold Voltage (Vth, Measured at 25° C., V):

In a case where the sample was a compound, the compound was mixed in a suitable composition for measurement of its threshold voltage. The threshold voltage of the compound was obtained through extrapolation.

1) For a composition having a positive dielectric anisotropy: A sample was injected into a liquid crystal display device of a normally white mode having a distance (gap) of $(0.5/\Delta n)$ µm between two glass substrates and a twist angle of 80°. The optical anisotropy ($\Delta n$) was measured with the aforementioned method. A rectangular wave with a frequency of 32 Hz was applied to the device. Then, the voltage of the rectangular wave was increased, and the voltage value at which the light transmittance through the device reached 90% was recorded as the threshold voltage.

2) For a composition having a negative dielectric anisotropy: A sample was injected into a liquid crystal display device of a normally black mode having a distance (gap) of 9 µm between two glass substrates and processed to a homeotropic alignment. A rectangular wave with a frequency of 32 Hz was applied to the device. Then, the voltage of the rectangular wave was increased, and the voltage value at which the light transmittance through the device reached 10% was recorded as the threshold voltage.

Voltage Holding Ratio (VHR, Measured at 25° C., %):

The TN device used for the measurement had a polyimide alignment film and had a distance (cell gap) of 6 µm between two glass substrates. A sample was injected into the device, which was then sealed with a UV-polymerized adhesive. Then, the TN device was charged by applying a pulse voltage of 5 V for 60 microseconds. The voltage attenuation was measured with a high-speed voltmeter for 16.7 milliseconds, and the area A between the voltage curve and the abscissa per unit cycle was obtained. The voltage holding ratio was the ratio of the area A to an area B that is the area where the voltage does not attenuate.

Helical Pitch (Measured at 20° C., μm):

The helical pitch was measured by a Cano-wedge cell. The sample was injected into a Cano-wedge cell, and the distance (a, μm) between the disclination lines observed from the cell was measured. The helical pitch (p) was calculated from the equation "p=2·a·tan θ", wherein θ indicates the angle between the two glass substrates of the Cano-wedge cell.

Alternatively, the pitch length may be measured with selective reflection (Liquid Crystal Manual, p. 196, issued in 2000 by MARUZEN). The selective reflection wavelength λ satisfies the equation "<n>p/λ=1", wherein <n> denotes the average refractive index calculated with the equation "<n>={$(n_\parallel^2+n_\perp^2)/2\}^{1/2}$". The selective reflection wavelength was measured with a micro-spectrophotometer MSV-350 made by Japan Electronics Co., Ltd. The pitch was calculated by dividing the obtained reflection wavelength by the average refractive index. When the concentration of the chiral dopant was low, the pitch of a cholesteric liquid crystal having a reflection wavelength at the long wavelength side of visible light was proportional to the reciprocal of the concentration. Therefore, multiple points were measured for the pitch length of a liquid crystal having a selective reflection wavelength in the visible light region, and the pitch was calculated through linear extrapolation.

The content (percentage) of the component or liquid crystal compound is expressed as "wt %" relative to the total weight of the liquid crystal composition below. Each composition was prepared by weighting and mixing the components including the liquid crystal compound, so that the weight percentages thereof can be easily calculated.

Example 1

A nematic phase liquid crystal composition A-1 was prepared by mixing the compounds respectively represented by formulae (a), (b), (c) and (d) (hereafter as "compound a" and so on) in the following weight ratio.

(a)

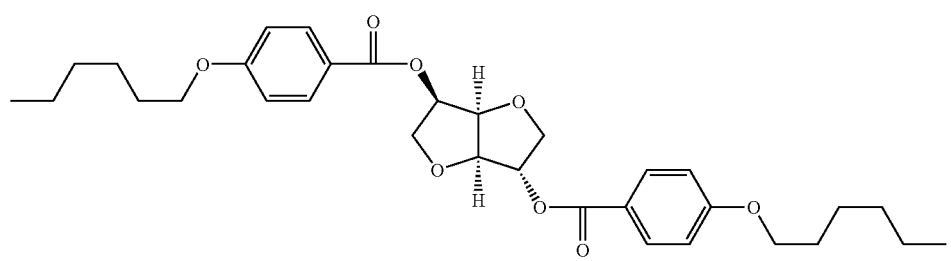

35 wt %

-continued (b)

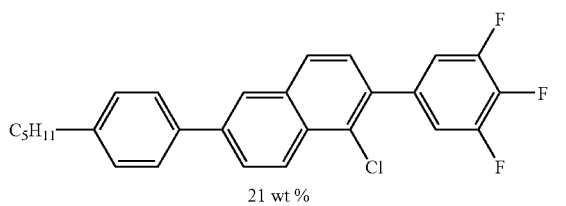

21 wt %

(c)

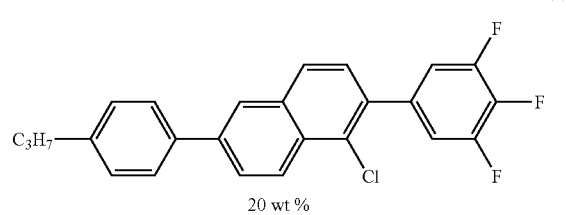

20 wt %

(d)

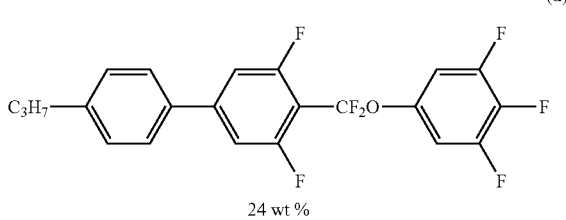

24 wt %

Next, a liquid crystal composition B-1 including 92 wt % of the liquid crystal composition A-1 and 8 wt % of a chiral dopant ISO-60BA2 represented by the formula below was obtained. The liquid crystal composition B-1 exhibits an optically isotropic liquid crystal phase at 27° C. ISO-60BA2 was obtained by esterification reaction from isosorbide and 4-hexyloxy benzoic acid in the presence of dicyclohexylcarbodiimide (DCC) and 4-dimethylamino pyridine.

ISO-60BA2

Example 2

A liquid crystal composition B-1 of Example 1 was held between a comb electrode plate (FIG. 1) not subjected to alignment treatment and an opposed glass substrate without electrodes thereon, wherein the liquid crystal cell has a thickness of 10 μm. The substrates containing the composition, i.e., the comb electrode cell, was setup in the optical system shown in FIG. 2 for measurement of the electrooptical properties.

The comb electrode cell was configured with a laser in a manner that the incident angle to the electrode cell was perpendicular to the surface of the electrode cell and the line direction of the comb electrodes was at an angle of 45° to the polarizer and the analyzer, respectively. The transmittance was saturated by applying a rectangular wave with an amplitude of 70 V. Then, an electric field was similarly applied in a polarizing microscope with crossed Nicols, and no afterimage was identified. The measurement was conducted at room temperature of 27° C.

Accordingly, the liquid crystal composition B-1 can have a bright or dark state by turning on or turning off an electric field, and a rapid response can be made even when the electric field is applied until the transmittance was saturated.

Example 3

Preparation of a Mixture of a Monomer and a Liquid Crystal Composition

A liquid crystal composition B-1M was prepared by mixing 84.4 wt % of the liquid crystal composition B-1 as a mixture of a liquid crystal composition and monomers, 6.4 wt % of trimethylolpropane triacrylate, 8.6 wt % of 1,4-di(4-(6-(acryloyloxy)hexyloxy)benzoyloxy)-2-methyl benzene and 0.6 wt % of 2,2'-dimethoxyphenylacetophenone as a photopolymerization initiator.

Preparation of a Polymer/Liquid Crystal Composite

The liquid crystal composition B-1M was held between a comb-like electrode substrate not subjected to alignment treatment and an opposed glass substrate without electrodes thereon, wherein the liquid crystal cell has a thickness of 10 μm. The liquid crystal cell obtained was heated until an isotropic phase was formed at 35.0° C. and, in such a state, irradiated with 365 nm UV-light in an intensity of 10 mW·cm$^{-2}$ for 5 minutes for polymerization.

The polymer/liquid crystal composite B-1P thus obtained can maintain an optically isotropic liquid crystal phase as being cooled to a temperature of 0° C. or lower. That is, as compared with the liquid crystal composition B-1M, the polymer/liquid crystal composite B-1P has a wider temperature range of optically isotropic liquid crystal phase.

Moreover, as shown in FIG. 1, the electrodes 1 extending from the left side and the electrodes 2 extending from the right side on the comb-like electrode substrate are alternately disposed. Therefore, when a voltage difference is present between the electrodes 1 and the electrodes 2, the comb-like electrode substrate is provided with an electric field having two directions (upward and downward), as shown in FIG. 1.

Example 4

Figure 2:
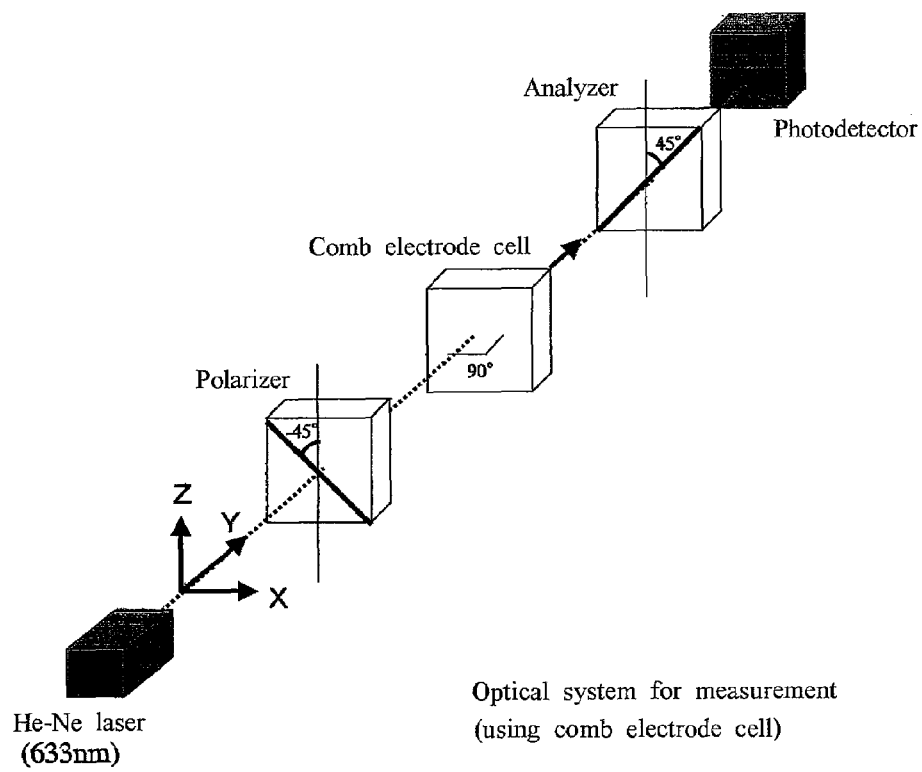
FIG. 2 shows an optical system used in an embodiment of the invention.

A liquid crystal cell containing the polymer/liquid crystal composite B-1P obtained in Example 3 was set in an optical system shown in FIG. 2 for measuring the electrooptical properties. The optical system was setup with a laser in a manner that the incident angle to the cell was perpendicular to the surface of the cell and the line direction of the comb electrodes was at an angle of 45° to the polarizer and the analyzer, respectively. When the temperature for measurement was set at 20° C. and a rectangular wave with an amplitude of 90 V was applied, the transmittance was up to 88% and the transmitted light intensity was saturated.

UTILITY OF THE INVENTION

The invention is applicable to, for example, optical devices, such as a display device using a liquid crystal medium, etc.

It will be apparent to those skilled in the art that various modifications and variations can be made to the structure of the invention without departing from the scope or spirit of the invention. In view of the foregoing, it is intended that the invention cover modifications and variations of the invention provided they fall within the scope of the following claims and their equivalents.

What is claimed is:

1. A liquid crystal composition, comprising a compound represented by formula (1) and a chiral dopant and exhibiting an optically isotropic liquid crystal phase,

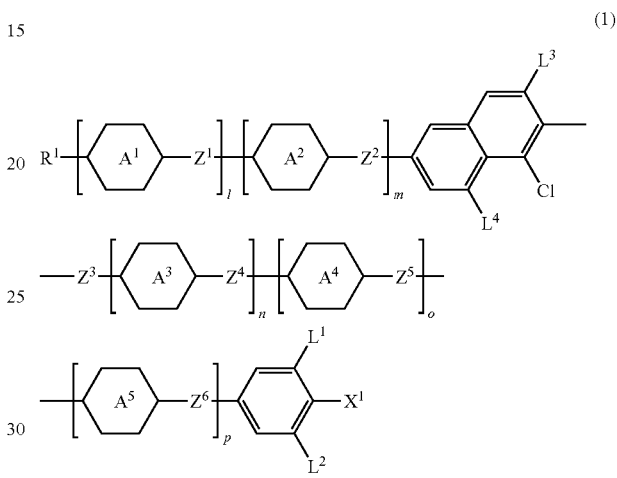

(1)

wherein $R^1$ is a hydrogen atom, or $C_1$-$C_{20}$ alkyl wherein arbitrary —$CH_2$— may be replaced by —O—, —S—, —COO—, —OCO—, —CH=CH—, —CF=CF— or —C≡C— and arbitrary hydrogen atom may be replaced by a halogen atom or $C_1$-$C_3$ alkyl; the rings $A^1$, $A^2$, $A^3$, $A^4$ and $A^5$ are each independently a benzene ring, a naphthalene ring, a thiophene ring, a piperidine ring, a cyclohexene ring, a bicyclooctane ring, a tetrahydronaphthalene ring or a cyclohexane ring, wherein arbitrary hydrogen atom may be replaced by a halogen atom, or alkyl, alkoxy or haloalkyl of 1-3 carbon atoms, —$CH_2$— may be replaced by —O— or —S— and —CH= may be replaced by —N=; $Z^1$, $Z^2$, $Z^3$, $Z^4$, $Z^5$ and $Z^6$ are each independently a single bond, or $C_1$-$C_4$ alkylene wherein arbitrary —$CH_2$— may be replaced by —O—, —S—, —COO—, —OCO—, —CSO—, —OCS—, —CH=CH—, —CF=CF— or —C≡C— and arbitrary hydrogen atom may be replaced by a halogen atom; $L^1$, $L^2$, $L^3$ and $L^4$ are each independently a hydrogen atom or a halogen atom; $X^1$ is a hydrogen atom, a halogen atom, —C≡N, —N=C=S, —C≡C—C≡N, —$SF_5$, or $C_1$-$C_{10}$ alkyl wherein arbitrary —$CH_2$— may be replaced by —O—, —S—, —CH=CH— or —C≡C— and arbitrary hydrogen atom may be replaced by a halogen atom; l, m, n, o and p are each independently 0 or 1, and l+m+n+o+p≦4.

2. The liquid crystal composition of claim 1, wherein $R^1$ is $C_1$-$C_{20}$ alkyl, $C_2$-$C_{21}$ alkenyl, $C_2$-$C_{21}$ difluoroalkenyl, $C_2$-$C_{21}$ alkynyl, $C_1$-$C_{19}$ alkoxy, $C_2$-$C_{20}$ alkenyloxy, $C_1$-$C_{19}$ alkylthio or $C_1$-$C_{19}$ alkenylthio; $X^1$ is a hydrogen atom, a halogen atom, —C≡N, —N=C=S, —$SF_5$, —$CH_2F$, —$CHF_2$, —$CF_3$, —$(CH_2)_2$—F, —$CF_2CH_2F$, —$CF_2CHF_2$, —$CH_2CF_3$, —$CF_2CF_3$, —$(CH_2)_3$—F, —$(CF_2)_3$—F, —$CF_2CHFCF_3$, —$CHFCF_2CF_3$, —$(CH_2)_4$—F, —$(CF_2)_4$—F, —$(CH_2)_5$—F, —$(CF_2)_5$—F, —$OCH_2F$, —$OCHF_2$, —$OCF_3$, —O—$(CH_2)_2$—F, —$OCF_2CH_2F$, —$OCF_2CHF_2$, —$OCH_2CF_3$, —O—

(CH₂)₃—F, —O—(CF₂)₃—F, —OCF₂CHFCF₃, —OCHFCF₂CF₃, —O(CH₂)₄—F, —O—(CF₂)₄—F, —O—(CH₂)₅—F, —O—(CF₂)₅—F, —CH═CHF, —CH═CF₂, —CF═CHF, —CH═CHCH₂F, —CH═CHCF₃, —(CH₂)₂—CH═CF₂, —CH₂CH═CHCF₃ or —CH═CHCF₂CF₃.

3. The liquid crystal composition of claim 1, wherein $Z^1$, $Z^2$, $Z^3$, $Z^4$, $Z^5$ and $Z^6$ are each independently a single bond, —CH₂CH₂—, —CH═CH—, —C≡C—, —COO—, —CF₂O—, —CH₂O— or —OCH₂—.

4. The liquid crystal composition of claim 1, wherein the rings $A^1$, $A^2$, $A^3$, $A^4$ and $A^5$ are each independently one of formulae (RG-1)-(RG-15), $Y^1$, $Y^2$, $Y^3$ and $Y^4$ are each independently a hydrogen atom or a halogen atom, and fn1, fn2, fn3 and fn4 are each independently 0, 1, 2 or 3:

 (RG-1)

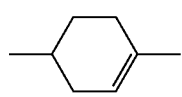 (RG-2)

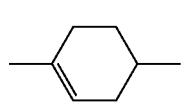 (RG-3)

 (RG-4)

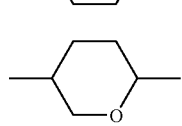 (RG-5)

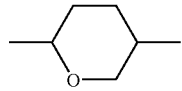 (RG-6)

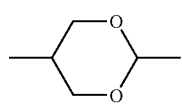 (RG-7)

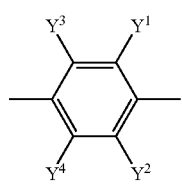 (RG-8)

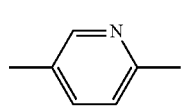 (RG-9)

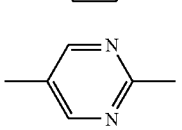 (RG-10)

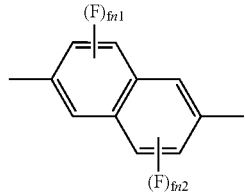 (RG-11)

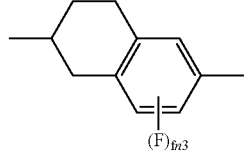 (RG-12)

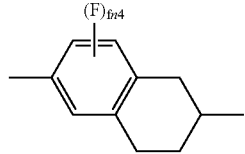 (RG-13)

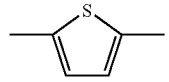 (RG-14)

 (RG-15)

5. The liquid crystal composition of claim 1, wherein $R^1$ is any one of formulae (CHN-1)-(CHN-19) and $R^{1a}$ is a hydrogen atom or C₁-C₂₀ alkyl:

$R^{1a}$— (CHN-1)

 (CHN-2)

 (CHN-3)

 (CHN-4)

 (CHN-5)

 (CHN-6)

 (CHN-7)

$R^{1a}$—≡— (CHN-8)

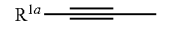 (CHN-9)

 (CHN-10)

$R^{1a}$—O— (CHN-11)

-continued
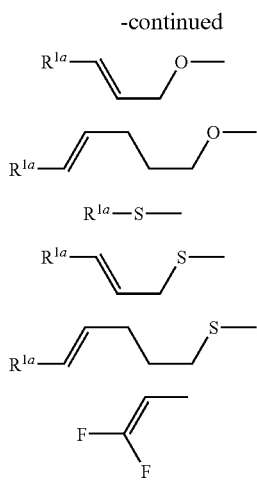
(CHN-12)
(CHN-13)
(CHN-14)
(CHN-15)
(CHN-16)
(CHN-17)
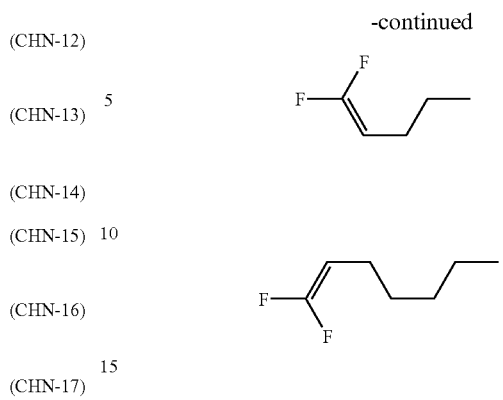
(CHN-18)
(CHN-19)
6. The liquid crystal composition of claim 1, which comprises at least one compound selected from the group consisting of compounds respectively represented by formulae (1-1)-(1-9):
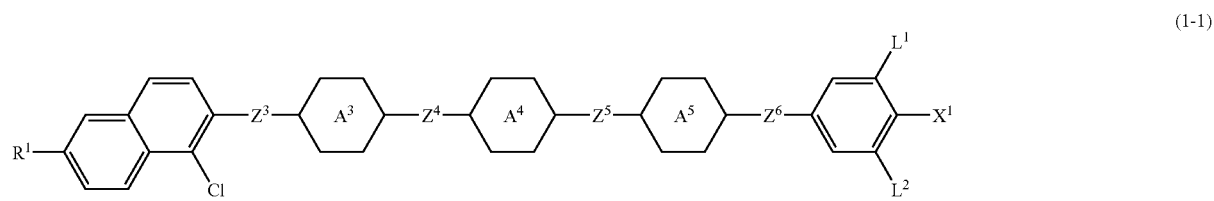
(1-1)
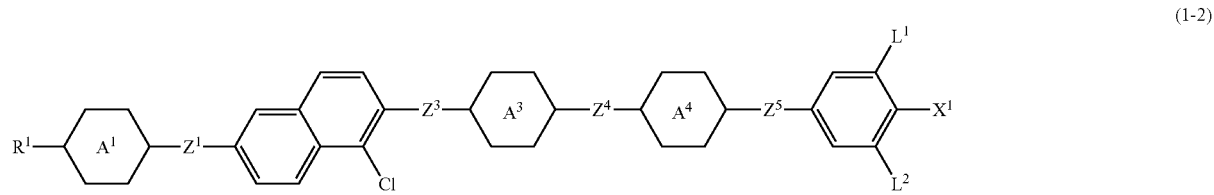
(1-2)
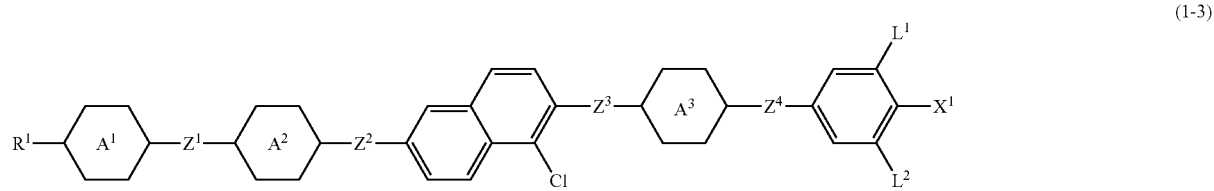
(1-3)
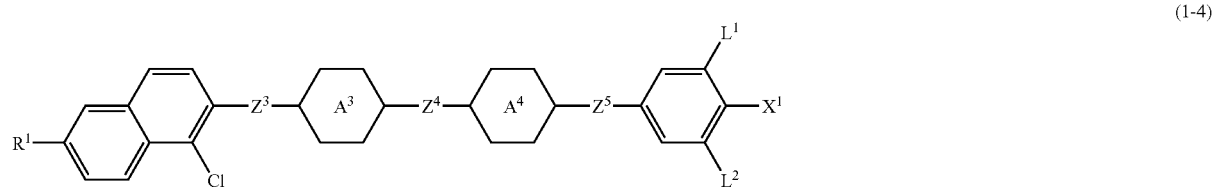
(1-4)
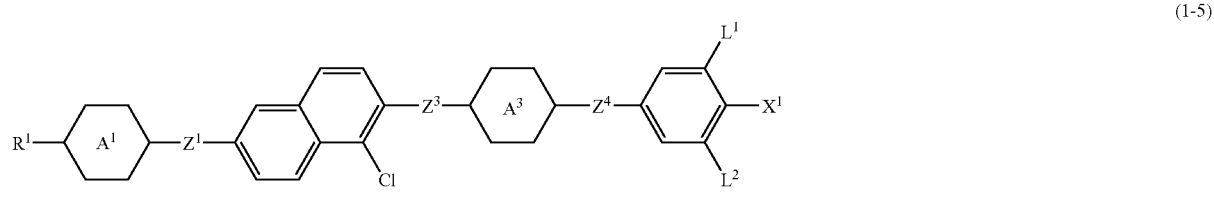
(1-5)
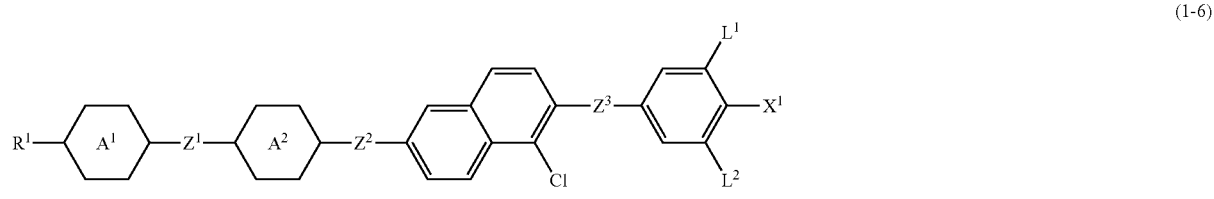
(1-6)

-continued (1-7)
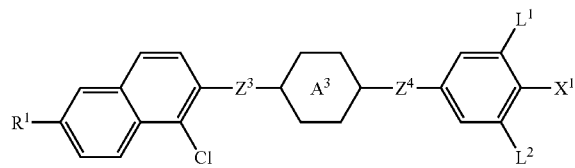

(1-8)
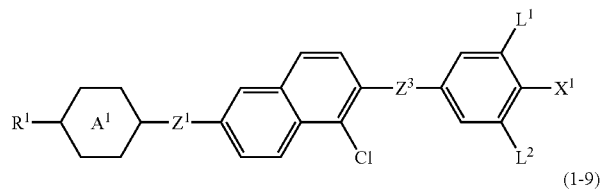

(1-9)
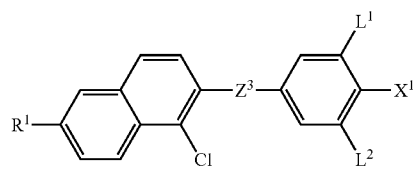

wherein in these formulae, $R^1$ is any one of formulae (CHN-1)-(CHN-19); $R^{1a}$ is a hydrogen atom or $C_1$-$C_{20}$ alkyl; the rings $A^1$, $A^2$, $A^3$, $A^4$ and A are each independently one of formulae (RG-1), (RG-5), (RG-7), (RG-8-1)-(RG-8-5), (RG-9), (RG-10) and (RG-15); $Z^1$, $Z^2$, $Z^3$, $Z^4$, $Z^5$ and $Z^6$ are each independently a single bond, —CH$_2$CH$_2$—, —CH=CH—, —C≡C—, —COO—, —CF$_2$O—, —CH$_2$O—, or —OCH$_2$—; $L^1$ and $L^2$ are each independently a hydrogen atom, a fluorine atom or a chlorine atom; $X^1$ is a fluorine atom, a chlorine atom, —C≡N, —CF$_3$, —CHF$_2$, —CH$_2$F, —OCF$_3$, —OCHF$_2$, —OCH$_2$F or —C≡C—CF$_3$:

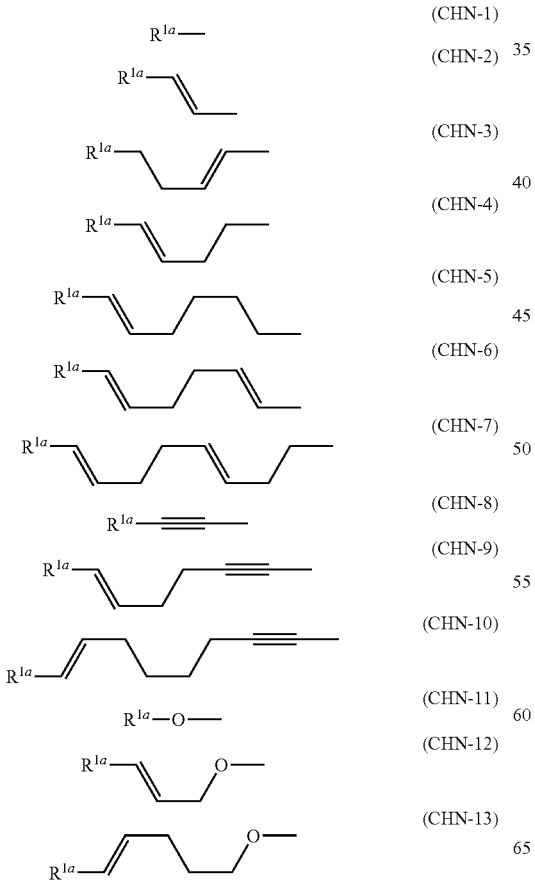

-continued

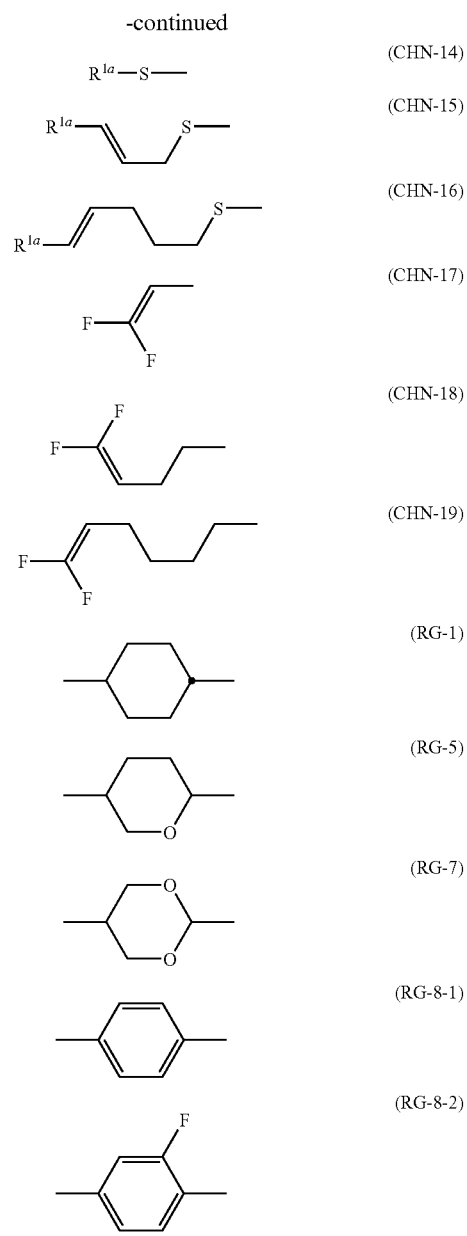

-continued

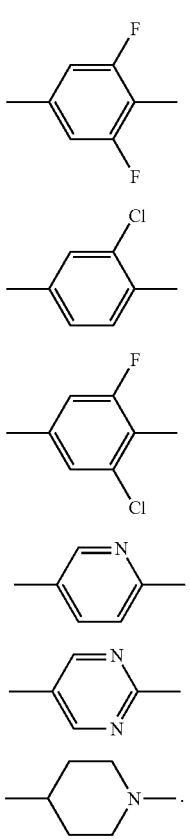

(RG-8-3)

(RG-8-4)

(RG-8-5)

(RG-9)

(RG-10)

(RG-15)

7. The liquid crystal composition of claim 6, wherein in formulae (1-1)-(1-9), at least one of $Z^1, Z^2, Z^3, Z^4, Z^5$ and $Z^6$ is —CF$_2$O—.

8. The liquid crystal composition of claim 6, wherein in formulae (1-1)-(1-9), at least one of $Z^1, Z^2, Z^3, Z^4, Z^5$ and $Z^6$ is —COO—.

9. The liquid crystal composition of claim 6, wherein in formulae (1-1)-(1-9), $R^1$ is any one of formulae (CHN-1)-(CHN-4) and (CHN-6)-(CHN-8) and $R^{1a}$ is a hydrogen atom or C$_1$-C$_{20}$ alkyl:

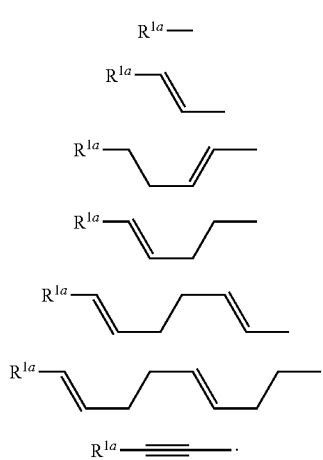

(CHN-1)
(CHN-2)
(CHN-3)
(CHN-4)
(CHN-6)
(CHN-7)
(CHN-8)

10. The liquid crystal composition of claim 1, further comprising at least one compound selected from the group consisting of compounds respectively represented by formulae (2), (3) and (4):

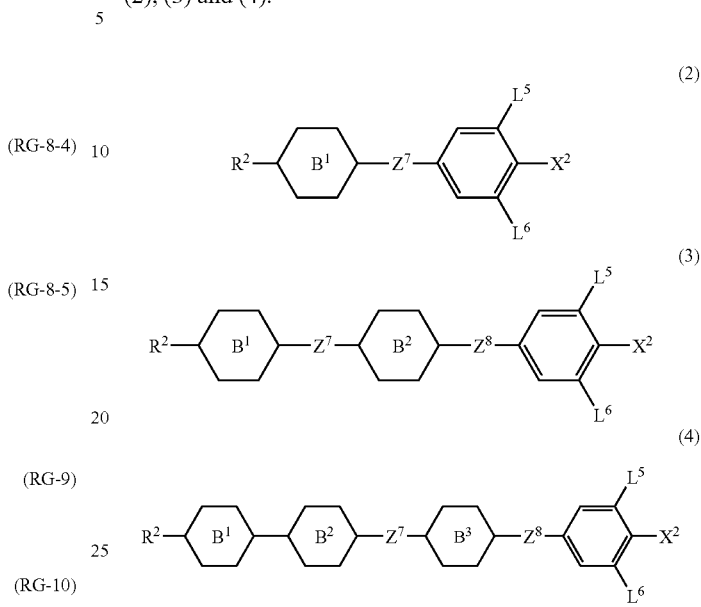

(2)

(3)

(4)

wherein in these formulae, $R^2$ is C$_1$-C$_{10}$ alkyl or C$_2$-C$_{10}$ alkenyl, wherein arbitrary hydrogen atom of $R^2$ may be replaced by a fluorine atom and arbitrary —CH$_2$— of $R^2$ may be replaced by —O—; $X^2$ is a fluorine atom, a chlorine atom, —OCF$_3$, —OCHF$_2$, —CF$_3$, —CHF$_2$, —CH$_2$F, —OCF$_2$CHF$_2$ or —OCF$_2$CHFCF$_3$; the rings $B^1$, $B^2$ and $B^3$ are each independently 1,4-cyclohexylene, 1,3-dioxan-2,5-diyl, pyrimidin-2,5-diyl, tetrahydropyran-2,5-diyl, 1,4-phenylene, or 1,4-phenylene with arbitrary hydrogen atom being replaced by a fluorine atom; $Z^7$ and $Z^8$ are each independently —(CH$_2$)$_2$—, —(CH$_2$)$_4$—, —COO—, —CF$_2$O—, —OCF$_2$—, —CH═CH—, —C≡C—, —CH$_2$O— or a single bond; and $L^5$ and $L^6$ are each independently a hydrogen atom or a fluorine atom.

11. The liquid crystal composition of claim 1, further comprises at least one compound selected from the group consisting of compounds represented by formula (5):

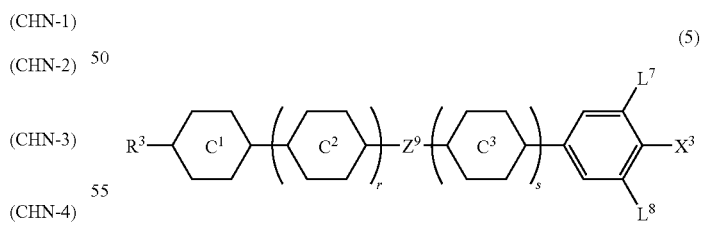

(5)

wherein in these formulae, $R^3$ is C$_1$-C$_{10}$ alkyl or C$_2$-C$_{10}$ alkenyl, wherein arbitrary hydrogen atom of $R^3$ may be replaced by a fluorine atom and arbitrary —CH$_2$— of $R^3$ may be replaced by —O—; $X^3$ is —C≡N or —C≡C—C≡N; the rings $C^1$, $C^2$ and $C^3$ are each independently 1,4-cyclohexylene, 1,4-phenylene, 1,4-phenylene with arbitrary hydrogen atom being replaced by a fluorine atom, 1,3-dioxan-2,5-diyl, tetrahydropyran-2,5-diyl or pyrimidin-2,5-diyl; $Z^9$ is —(CH$_2$)$_2$—, —COO—, —CF$_2$O—, —OCF$_2$—, —C≡C—, —CH$_2$O— or a single bond; L$^7$ and L$^8$ are each independently a hydrogen atom or a fluorine atom; and r is 1 or 2, s is 0 or 1 and r+s=0, 1 or 2.

12. The liquid crystal composition of claim 1, further comprising at least one compound selected from the group consisting of compounds respectively represented by formulae (6), (7), (8), (9) and (10):

atom of R$^6$ and R$^7$ may be replaced by a fluorine atom and arbitrary —CH$_2$— of R$^6$ and R$^7$ may be replaced by —O—; the rings E$^1$, E$^2$ and E$^3$ are each independently 1,4-cyclohexylene, pyrimidin-2,5-diyl, 1,4-phenylene, 2-fluoro-1,4-phenylene, 3-fluoro-1,4-phenylene or 2,5-difluoro-1,4-phenylene; and Z$^{14}$ and Z$^{15}$ are each independently —C≡C—, —COO—, —(CH$_2$)$_2$—, —CH═CH— or a single bond.

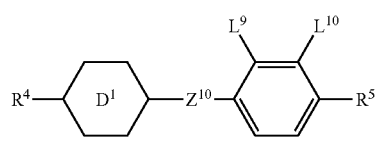
(6)

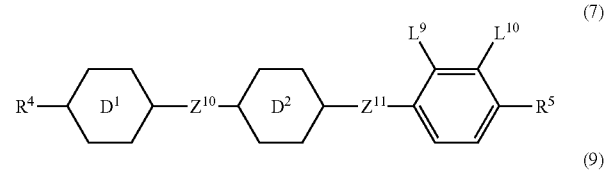
(7)

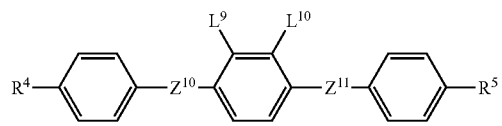
(8)

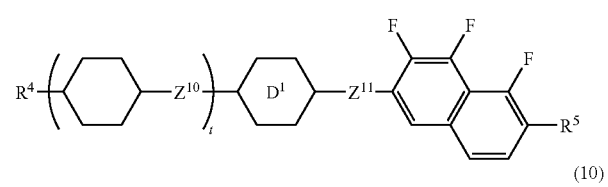
(9)

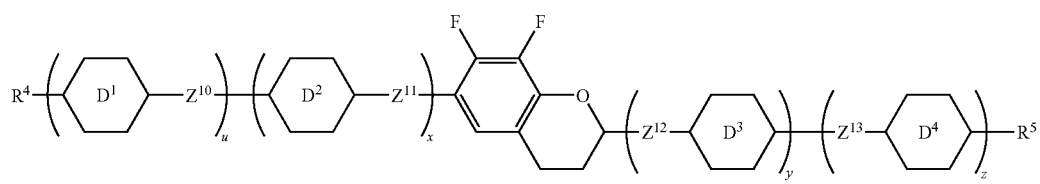
(10)

wherein in these formulae, R$^4$ and R$^5$ are each independently C$_1$-C$_{10}$ alkyl or C$_2$-C$_{10}$ alkenyl, wherein arbitrary hydrogen atom of R$^4$ and R$^5$ may be replaced by a fluorine atom and arbitrary —CH$_2$— of R$^4$ and R$^5$ may be replaced by —O—; the rings D$^1$, D$^2$, D$^3$ and D$^4$ are each independently 1,4-cyclohexylene, 1,4-cyclohexenylene, 1,4-phenylene, 1,4-phenylene with arbitrary hydrogen atom being replaced by a fluorine atom, tetrahydropyran-2,5-diyl or decahydronaphthalen-2,6-diyl; Z$^{10}$, Z$^{11}$, Z$^{12}$ and Z$^{13}$ are each independently —(CH$_2$)$_2$—, —COO—, —CH$_2$O—, —OCF$_2$—, —OCF$_2$(CH$_2$)$_2$— or a single bond; L$^9$ and L$^{10}$ are each independently a fluorine atom or a chlorine atom; t, u, x, y and z are each independently 0 or 1, and u+x+y+z is 1 or 2.

13. The liquid crystal composition of claim 1, further comprising at least one compound selected from the group consisting of compounds respectively represented by formulae (11), (12) and (13):

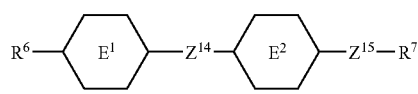
(11)

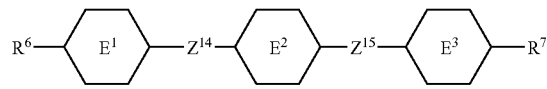
(12)

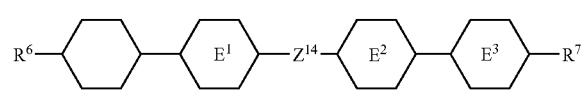
(13)

wherein in these formulae, R$^6$ and R$^7$ are each independently C$_1$-C$_{10}$ alkyl or C$_2$-C$_{10}$ alkenyl, wherein arbitrary hydrogen

14. The liquid crystal composition of claim 10, further comprising at least one compound selected from the group consisting of the compounds represented by formula (5):

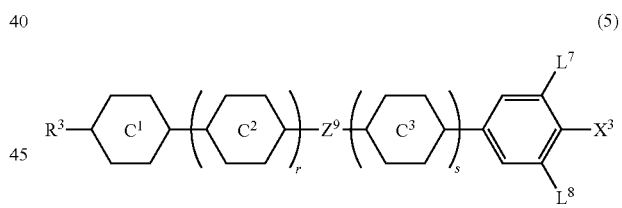
(5)

wherein in these formulae, R$^3$ is C$_1$-C$_{10}$ alkyl or C$_2$-C$_{10}$ alkenyl, wherein arbitrary hydrogen atom of R$^3$ may be replaced by a fluorine atom and arbitrary —CH$_2$— of R$^3$ may be replaced by —O—; X$^3$ is —C≡N or —C≡C—C≡N; the rings C$^1$, C$^2$ and C$^3$ are each independently 1,4-cyclohexylene, 1,4-phenylene, 1,4-phenylene with arbitrary hydrogen atom being replaced by a fluorine atom, 1,3-dioxan-2,5-diyl, tetrahydropyran-2,5-diyl or pyrimidin-2,5-diyl; Z$^9$ is —(CH$_2$)$_2$—, —COO—, —CF$_2$O—, —OCF$_2$—, —C≡C—, —CH$_2$O— or a single bond; L$^7$ and L$^8$ are each independently a hydrogen atom or a fluorine atom; and r is 1 or 2, s is 0 or 1 and r+s=0, 1 or 2.

15. The liquid crystal composition of claim 10, further comprising at least one compound selected from the group consisting of compounds respectively represented by formulae (11), (12) and (13):

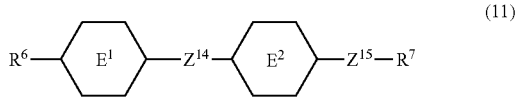
(11)

(12)

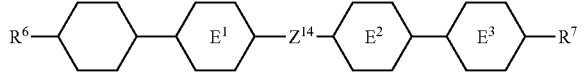
(13)

wherein in these formulae, $R^6$ and $R^7$ are each independently $C_1$-$C_{10}$ alkyl or $C_2$-$C_{10}$ alkenyl, wherein arbitrary hydrogen atom of $R^6$ and $R^7$ may be replaced by a fluorine atom and arbitrary —$CH_2$— of $R^6$ and $R^7$ may be replaced by —O—; the rings $E^1$, $E^2$ and $E^3$ are each independently 1,4-cyclohexylene, pyrimidin-2,5-diyl, 1,4-phenylene, 2-fluoro-1,4-phenylene, 3-fluoro-1,4-phenylene or 2,5-difluoro-1,4-phenylene; and $Z^{14}$ and $Z^{15}$ are each independently —C≡C—, —COO—, —(CH$_2$)$_2$—, —CH=CH— or a single bond.

16. The liquid crystal composition of claim 11, further comprising at least one compound selected from the group consisting of compounds respectively represented by formulae (11), (12) and (13):

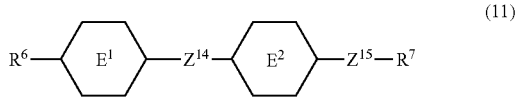
(11)

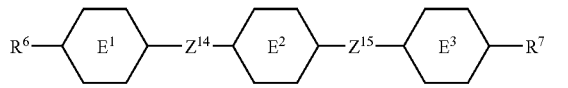
(12)

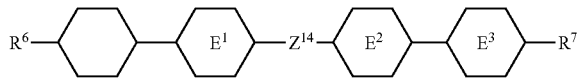
(13)

wherein in these formulae, $R^6$ and $R^7$ are each independently $C_1$-$C_{10}$ alkyl or $C_2$-$C_{10}$ alkenyl, wherein arbitrary hydrogen atom of $R^6$ and $R^7$ may be replaced by a fluorine atom and arbitrary —$CH_2$— of $R^6$ and $R^7$ may be replaced by —O—; the rings $E^1$, $E^2$ and $E^3$ are each independently 1,4-cyclohexylene, pyrimidin-2,5-diyl, 1,4-phenylene, 2-fluoro-1,4-phenylene, 3-fluoro-1,4-phenylene or 2,5-difluoro-1,4-phenylene; and $Z^{14}$ and $Z^{15}$ are each independently —C≡C—, —COO—, —(CH$_2$)$_2$—, —CH=CH— or a single bond.

17. The liquid crystal composition of claim 12, further comprising at least one compound selected from the group consisting of compounds respectively represented by formulae (11), (12) and (13):

wherein in these formulae, $R^6$ and $R^7$ are each independently $C_1$-$C_{10}$ alkyl or $C_2$-$C_{10}$ alkenyl, wherein arbitrary hydrogen atom of $R^6$ and $R^7$ may be replaced by a fluorine atom and arbitrary —$CH_2$— of $R^6$ and $R^7$ may be replaced by —O—; the rings $E^1$, $E^2$ and $E^3$ are each independently 1,4-cyclohexylene, pyrimidin-2,5-diyl, 1,4-phenylene, 2-fluoro-1,4-phenylene, 3-fluoro-1,4-phenylene or 2,5-difluoro-1,4-phenylene; and $Z^{14}$ and $Z^{15}$ are each independently —C≡C—, —COO—, —(CH$_2$)$_2$—, —CH=CH— or a single bond.

18. The liquid crystal composition of claim 1, further comprising at least one compound selected from the group consisting of compounds respectively represented by formulae (15), (16), (17) and (18):

(18)

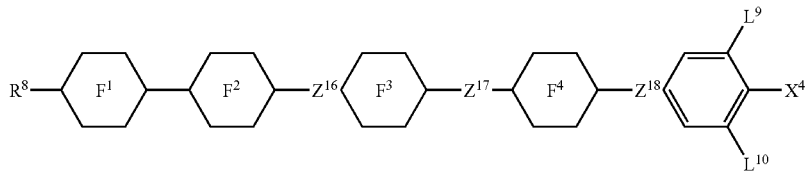

wherein in these formulae, $R^8$ is $C_1$-$C_{10}$ alkyl, $C_2$-$C_{10}$ alkenyl or $C_2$-$C_{10}$ alkynyl, wherein arbitrary hydrogen atom of $R^8$ may be replaced by a fluorine atom and arbitrary —$CH_2$— of $R^8$ may be replaced by —O—; $X^4$ is a fluorine atom, a chlorine atom, —$SF_5$, —$OCF_3$, —$OCHF_2$, —$CF_3$, —$CHF_2$, —$CH_2F$, —$OCF_2CHF_2$ or —$OCF_2CHFCF_3$; the rings $F^1$, $F^2$, $F^3$ and $F^4$ are each independently 1,4-cyclohexylene, 1,3-dioxan-2,5-diyl, pyrimidin-2,5-diyl, tetrahydropyran-2,5-diyl, 1,4-phenylene, or 1,4-phenylene with arbitrary hydrogen atom being replaced by a fluorine atom or a chlorine atom; $Z^{16}$, $Z^{17}$ and $Z^{18}$ are each independently —$(CH_2)_2$—, —$(CH_2)_4$—, —COO—, —$CF_2O$—, —$OCF_2$—, —CH=CH—, —C≡C—, —$CH_2O$— or a single bond; $L^9$ and $L^{10}$ are each independently a hydrogen atom or a fluorine atom.

19. The liquid crystal composition of claim 1, further comprising at least one compound selected from the group consisting of compounds represented by formula (19):

(19)

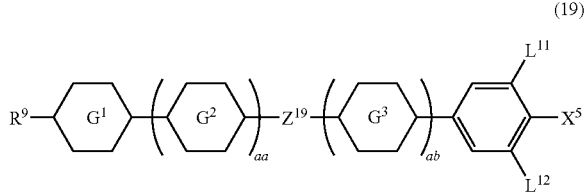

wherein $R^9$ is $C_1$-$C_{10}$ alkyl, $C_2$-$C_{10}$ alkenyl or $C_2$-$C_{10}$ alkynyl, wherein arbitrary hydrogen atom of $R^9$ may be replaced by a fluorine atom and arbitrary —$CH_2$— of $R^9$ may be replaced by —O—; $X^5$ is —C≡N, —N=C=S or —C≡C—C≡N; the rings $G^1$, $G^2$ and $G^3$ are each independently 1,4-cyclohexylene, 1,4-phenylene, 1,4-phenylene with arbitrary hydrogen atom being replaced by a fluorine atom or a chlorine atom, 1,3-dioxan-2,5-diyl, tetrahydropyran-2,5-diyl or pyrimidin-2,5-diyl; $Z^{19}$ is —$(CH_2)_2$—, —COO—, —$CF_2O$—, —$OCF_2$—, —C≡C—, —$CH_2O$— or a single bond; $L^{11}$ and $L^{12}$ are each independently a hydrogen atom or a fluorine atom; ann aa is 0, 1 or 2, ab is 0 or 1 and aa+ab is equal to 0, 1 or 2.

20. The liquid crystal composition of claim 1, further comprising at least one antioxidant, at least one ultraviolet absorbent, or at least one antioxidant and at least one ultraviolet absorbent.

21. The liquid crystal composition of claim 1, wherein the optically isotropic liquid crystal phase does not exhibit two or more colors of diffracted light.

22. The liquid crystal composition of claim 1, where the optically isotropic liquid crystal phase exhibits two or more colors of diffracted light.

23. The liquid crystal composition of claim 21, which is obtained by adding a chiral dopant in a composition with a difference of 3-150° C. between an upper-limit temperature and a lower-limit temperature of coexistence of a chiral nematic phase and an isotropic phase.

24. The liquid crystal composition of claim 22, which is obtained by adding a chiral dopant in a composition with a difference of 3-150° C. between an upper-limit temperature and a lower-limit temperature of coexistence of a chiral nematic phase and an isotropic phase.

25. The liquid crystal composition of claim 21, which is obtained by adding a chiral dopant in a composition with a difference of 5-150° C. between an upper-limit temperature and a lower-limit temperature of coexistence of a chiral nematic phase and an isotropic phase.

26. The liquid crystal composition of claim 22, which is obtained by adding a chiral dopant in a composition with a difference of 5-150° C. between an upper-limit temperature and a lower-limit temperature of coexistence of a chiral nematic phase and an isotropic phase.

27. The liquid crystal composition of claim 21, which is obtained by adding a chiral dopant in a composition with a difference of 3-150° C. between an upper limit temperature and a lower-limit temperature of coexistence of a nematic phase and an isotropic phase.

28. The liquid crystal composition of claim 22, which is obtained by adding a chiral dopant in a composition with a difference of 3-150° C. between an upper limit temperature and a lower-limit temperature of coexistence of a nematic phase and an isotropic phase.

29. The liquid crystal composition of claim 1, wherein a weight percentage of the chiral dopant is 1-40 wt % relative to a total weight of the liquid crystal composition.

30. The liquid crystal composition of claim 1, wherein a weight percentage of the chiral dopant is 5-15 wt % relative to a total weight of the liquid crystal composition.

31. The liquid crystal composition of claim 29, which exhibits a chiral nematic phase at any temperature in a range of 70 to −20° C. and has a pitch of 700 nm or less at a temperature within at least a part of the range of 70 to −20° C.

32. The liquid crystal composition of claim 29, wherein the chiral dopant comprises at least one compound selected from the group consisting of compounds respectively represented by formulae (K1)-(K5):

(K1)

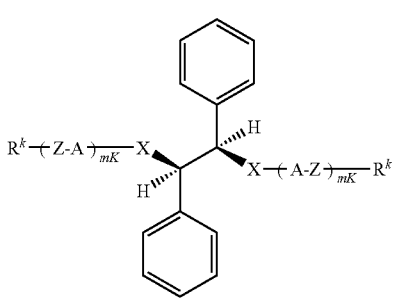

-continued

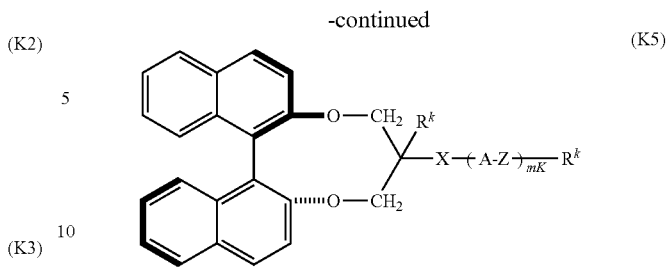
(K2)

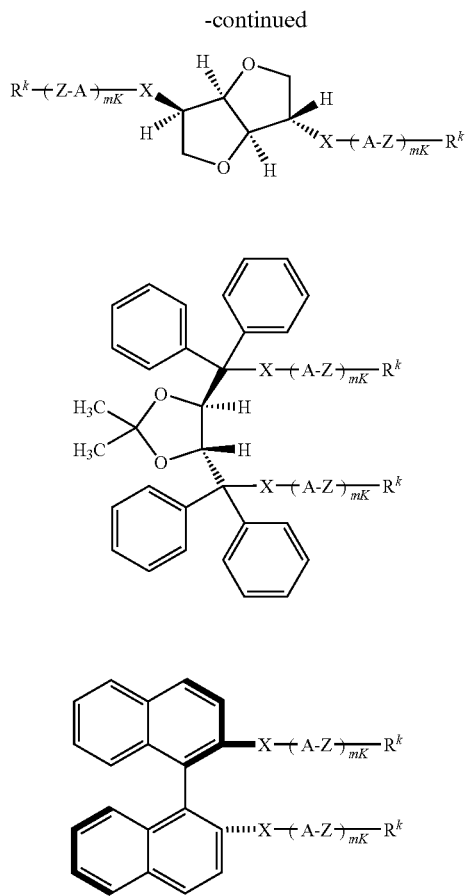

(K3)

(K4)

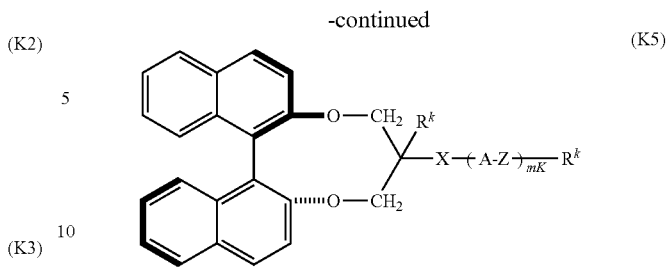
(K5)

wherein in the formulae (K1)-(K5), each $R^K$ is independently a hydrogen atom, a halogen atom, —C≡N, —N═C═O, —N═C═S, or $C_1$-$C_{20}$ alkyl wherein arbitrary —$CH_2$— may be replaced by —O—, —S—, —COO—, —OCO—, —CH═CH—, —CF═CF— or —C≡C— and arbitrary hydrogen atom may be replaced by a halogen atom; each A is independently an aromatic or non-aromatic 3- to 8-membered ring, or a fused ring of 9 or more carbon atoms, wherein arbitrary hydrogen atom may be replaced by a halogen atom, or alkyl or haloalkyl of 1-3 carbon atoms, —$CH_2$— may be replaced by —O—, —S— or —NH—, and —CH═ may be replaced by —N═; each Z is independently a single bond, or $C_1$-$C_8$ alkylene wherein arbitrary —$CH_2$— may be replaced by —O—, —S—, —COO—, —OCO—, —CSO—, —OCS—, —N═N—, —CH═N—, —N═CH—, —CH═CH—, —CF═CF— or —C≡C— and arbitrary hydrogen atom may be replaced by a halogen atom; X is a single bond, —COO—, —OCO—, —$CH_2$O—, —O$CH_2$—, —$CF_2$O—, —O$CF_2$— or —$CH_2CH_2$—; and mK is an integer of 1-4.

33. The liquid crystal composition of claim 29, wherein the chiral dopant comprises at least one compound selected from the group consisting of compounds respectively represented by formulae (K2-1)-(K2-8) and (K5-1)-(K5-3):

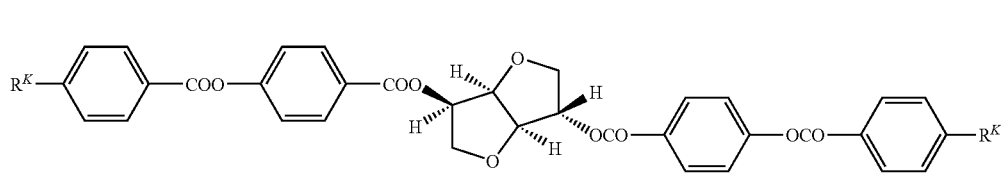
(K2-1)

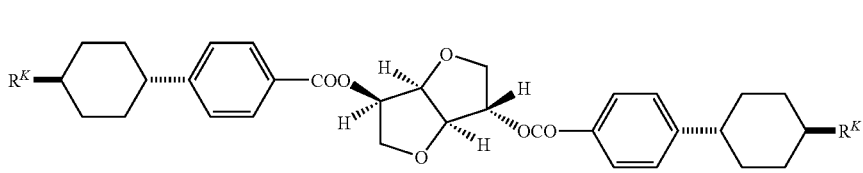
(K2-2)

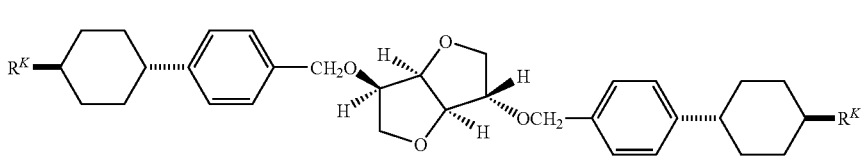
(K2-3)

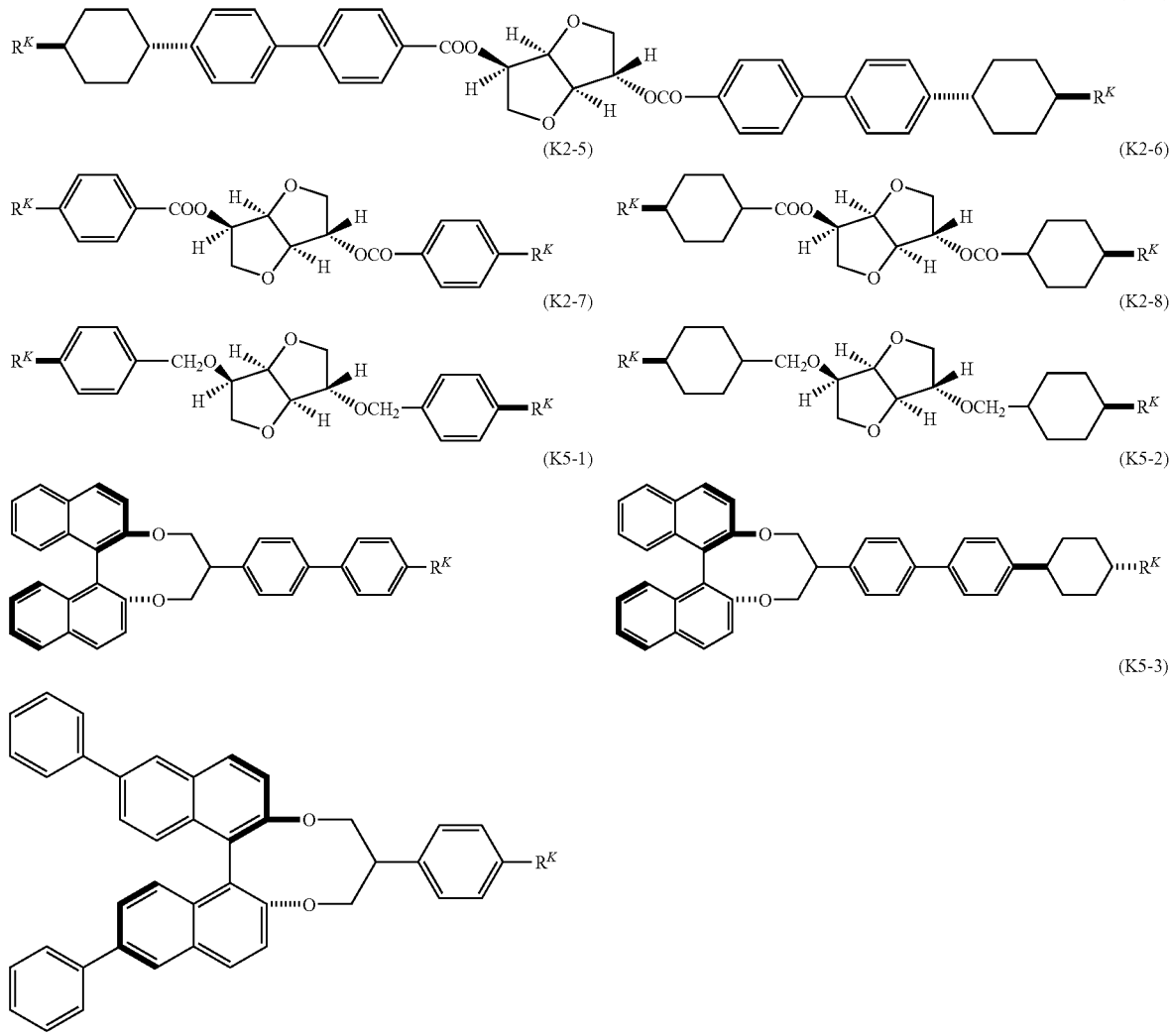

wherein in these formulae, each $R^K$ is independently $C_3$-$C_{10}$ alkyl wherein the —$CH_2$— directly bonded to the ring may be replaced by —O— and arbitrary —$CH_2$— may be replaced by —CH=CH—.

34. A mixture comprising a liquid crystal composition of claim 1 and a polymerizable monomer.

35. The mixture of claim 34, wherein the polymerizable monomer is a photo-polymerizable monomer or a thermo-polymerizable monomer.

36. A polymer/liquid crystal composite, which is obtained through polymerization of the mixture of claim 34 and is used in a device driven in an optically isotropic liquid crystal phase.

37. A polymer/liquid crystal composite, which is obtained through polymerization of the mixture of claim 34 in an isotropic phase or in an optically isotropic liquid crystal phase, and is used in a device driven in an optically isotropic liquid crystal phase.

38. The polymer/liquid crystal composite of claim 36, wherein the polymer has mesogenic moieties.

39. The polymer/liquid crystal composite of claim 36, wherein the polymer has a cross-linked structure.

40. The polymer/liquid crystal composite of claim 36, wherein a weight percentage of the liquid crystal composition is 60-99 wt % and a weight percentage of the polymer is 1-40 wt %.

41. An optical device, comprising: two substrates, electrodes disposed on a surface of one or both of the substrate, a liquid crystal medium disposed between the substrates and electric field application means for applying an electric field to the liquid crystal medium via the electrodes, wherein the liquid crystal medium is the liquid crystal composition of claim 29.

42. An optical device, comprising: two substrates, electrodes disposed on a surface of one or both of the substrate, a liquid crystal medium disposed between the substrates and electric field application means for applying an electric field to the liquid crystal medium via the electrodes, wherein the liquid crystal medium is the polymer/liquid crystal composite of claim 36.

43. An optical device, comprising: a pair of substrates with at least one thereof being transparent and one or both thereof disposed with electrodes thereon, a liquid crystal medium disposed between the substrates, a polarizer disposed on an outer side of the substrates, and electric field application means for applying an electric field to the liquid crystal medium via the electrodes, wherein the liquid crystal medium is the liquid crystal composition of claim 29.

44. An optical device, comprising: a pair of substrates with at least one thereof being transparent and one or both thereof disposed with electrodes thereon, a liquid crystal medium disposed between the substrates, a polarizer disposed on an outer side of the substrates, and electric field application means for applying an electric field to the liquid crystal medium via the electrodes, wherein the liquid crystal medium is the polymer/liquid crystal composite of claim 36.

45. The optical device of claim 43, wherein on at least one of the substrates, the electrodes are constructed in a manner such that the electric field is applied in at least two directions.

46. The optical device of claim 44, wherein on at least one of the substrates, the electrodes are constructed in a manner such that the electric field is applied in at least two directions.

47. The optical device of claim 43, wherein the substrates are arranged parallel to each other and on one or both of the substrates, the electrodes are constructed in a manner such that the electric field is applied in at least two directions.

48. The optical device of claim 44, wherein the substrates are arranged parallel to each other and on one or both of the substrates, the electrodes are constructed in a manner such that the electric field is applied in at least two directions.

49. The optical device of claim 41, wherein the electrodes are disposed in a matrix form to form pixel electrodes, and each pixel has an active device that is a thin film transistor (TFT).

50. The optical device of claim 42, wherein the electrodes are disposed in a matrix form to form pixel electrodes, and each pixel has an active device that is a thin film transistor (TFT).

* * * * *